(12) United States Patent
Asante

(10) Patent No.: US 10,837,594 B2
(45) Date of Patent: *Nov. 17, 2020

(54) MULTI FUNCTION TRAVEL-FRIENDLY WORKSTATION WITH COOLING AND VENTILATION

(71) Applicant: James N. Asante, Weatherford, OK (US)

(72) Inventor: James N. Asante, Weatherford, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,813

(22) Filed: Nov. 18, 2019

(65) Prior Publication Data

US 2020/0080684 A1 Mar. 12, 2020

Related U.S. Application Data

(63) Continuation of application No. 15/588,595, filed on May 6, 2017, now Pat. No. 10,514,126.

(Continued)

(51) Int. Cl.
*A47F 5/12* (2006.01)
*F16M 11/32* (2006.01)
(Continued)

(52) U.S. Cl.
CPC .......... *F16M 11/32* (2013.01); *A47B 13/023* (2013.01); *A47B 19/06* (2013.01); *A47B 21/04* (2013.01);
(Continued)

(58) Field of Classification Search
CPC ........ A47B 2200/06; A47B 2200/0022; A47B 2200/0023; A47B 2200/0025;
(Continued)

(56) References Cited

U.S. PATENT DOCUMENTS

| | | | |
|---|---|---|---|
| 1,203,659 A | | 11/1916 | Smith |
| 1,207,270 A | * | 12/1916 | Braithwaite ........ E05D 11/1078 16/329 |

(Continued)

FOREIGN PATENT DOCUMENTS

| | | |
|---|---|---|
| CH | 543255 | 10/1973 |
| DE | 202010014127 U1 | 1/2012 |
| FR | 2844165 A1 | 3/2004 |

*Primary Examiner* — Matthew W Ing
(74) *Attorney, Agent, or Firm* — Lewis Rice LLC

(57) ABSTRACT

An ergonomically designed space saving, collapsible multi-function travel-friendly modular workstation for supporting a broad range of electronic systems, reading materials and the like for users while standing, sitting or on-the-go, and fits in anywhere, anytime is presented. The workstation comprises a support unit, telescopic rod and tripod and is designed to provide needed cooling and ventilation for electronic systems, support healthy postures, and complete comfort and versatility of a multi-function workstation with all the important things needed when working at a desk, thereby improving a user's comfort when using the workstation. Further, the workstation is designed for easy transportation, storage and set up, as well as provide a versatile workspace for a user in many different environments, for everyday use such as note taking, writing, reading, presentations, performing arts and rehearsing while playing a musical instrument, music or conductor stand, etc.

15 Claims, 40 Drawing Sheets

Related U.S. Application Data

(60) Provisional application No. 62/333,812, filed on May 9, 2016.

(51) Int. Cl.
*A47B 13/02* (2006.01)
*A47B 21/04* (2006.01)
*A47B 19/06* (2006.01)
*F16M 11/28* (2006.01)
*F16M 11/10* (2006.01)
*F16M 11/42* (2006.01)
*A47B 9/14* (2006.01)
*A47B 21/03* (2006.01)
*A47B 21/06* (2006.01)
*A47B 23/04* (2006.01)

(52) U.S. Cl.
CPC .............. *F16M 11/10* (2013.01); *F16M 11/28* (2013.01); *F16M 11/42* (2013.01); *A47B 9/14* (2013.01); *A47B 21/0314* (2013.01); *A47B 2013/025* (2013.01); *A47B 2021/066* (2013.01); *A47B 2023/049* (2013.01); *A47B 2200/0054* (2013.01); *A47B 2200/0075* (2013.01); *A47B 2200/0081* (2013.01); *A47B 2200/0095* (2013.01); *A47B 2200/06* (2013.01); *F16M 2200/024* (2013.01); *F16M 2200/028* (2013.01); *F16M 2200/08* (2013.01)

(58) Field of Classification Search
CPC .... A47B 2200/0051; A47B 2200/0052; A47B 2201/0055; A47B 9/14; A47B 3/06; A47B 19/06; A47B 2013/025
USPC ...................................................... 108/57.25
See application file for complete search history.

(56) References Cited

U.S. PATENT DOCUMENTS

| | | | | |
|---|---|---|---|---|
| 2,188,237 A * | 1/1940 | Weaver | ............... | F16M 11/16 248/168 |
| 3,173,642 A * | 3/1965 | Greenspan | ............... | G10G 5/00 248/170 |
| 4,555,128 A * | 11/1985 | White | ............... | A47B 23/043 281/45 |
| 4,936,050 A * | 6/1990 | Lundgren | ............... | A47B 13/023 248/156 |
| 5,521,778 A * | 5/1996 | Boutaghou | ............... | G11B 5/5521 310/331 |
| 5,871,185 A * | 2/1999 | Phillips | ............... | F16M 11/16 248/165 |
| 6,003,446 A | 12/1999 | Leibowitz | | |
| 6,688,565 B1 * | 2/2004 | Chen | ............... | F16M 11/16 248/166 |
| 8,322,290 B1 * | 12/2012 | Mignano | ............... | A47B 23/043 108/157.1 |
| 2005/0040126 A1 * | 2/2005 | Gaster | ............... | A61M 5/1415 211/207 |
| 2006/0260516 A1 * | 11/2006 | Chow | ............... | A61G 13/009 108/14 |
| 2009/0178844 A1 * | 7/2009 | Derocher | ............... | A47B 97/00 174/500 |
| 2010/0259146 A1 | 10/2010 | Chen et al. | | |
| 2011/0253016 A1 | 10/2011 | Leakey | | |
| 2012/0199622 A1 * | 8/2012 | Palmer | ............... | A47B 23/002 224/577 |
| 2014/0099731 A1 | 4/2014 | Grela | | |
| 2015/0034793 A1 * | 2/2015 | Roth | ............... | A47B 19/06 248/456 |
| 2016/0047539 A1 * | 2/2016 | Cano | ............... | F21V 33/0012 362/133 |

* cited by examiner

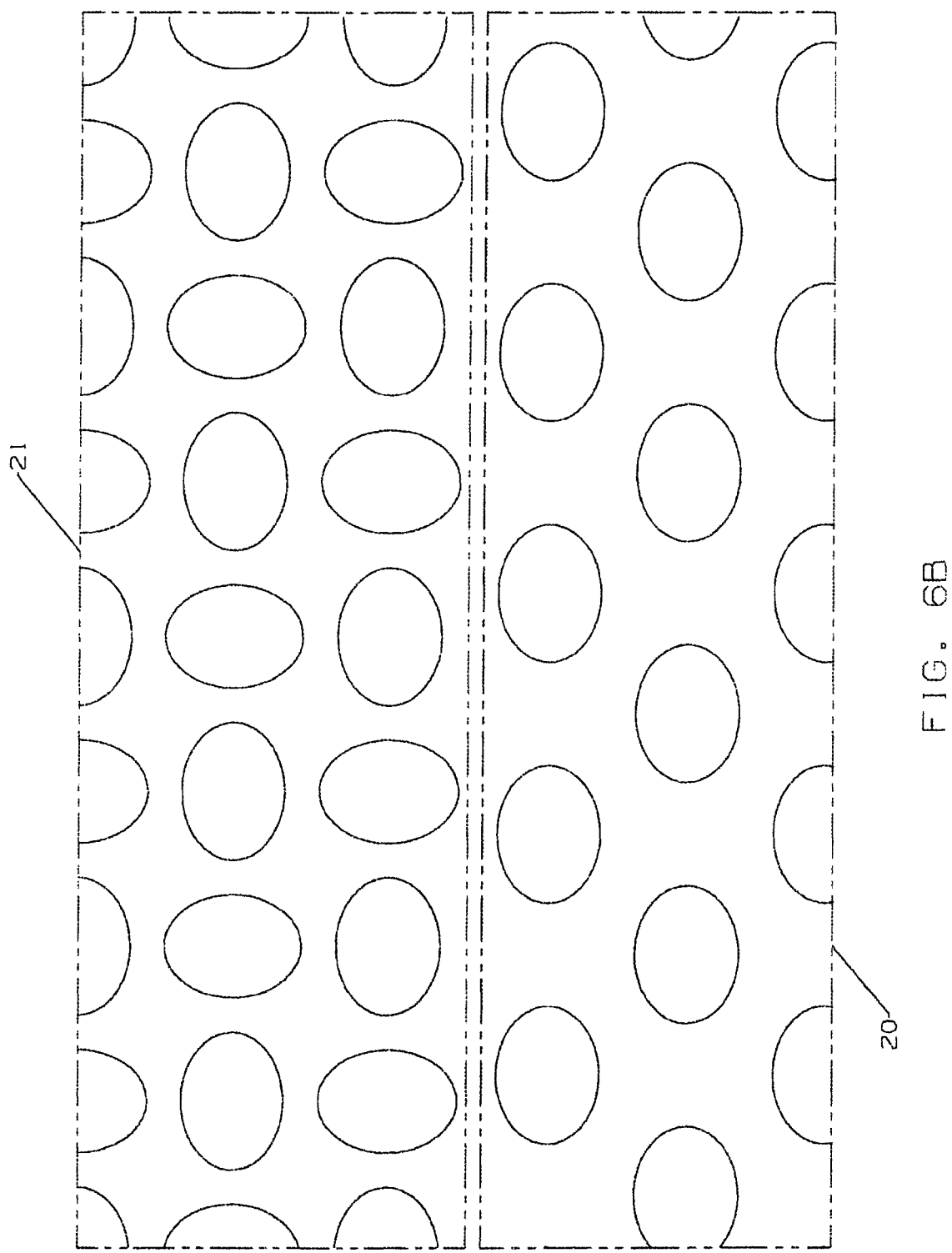

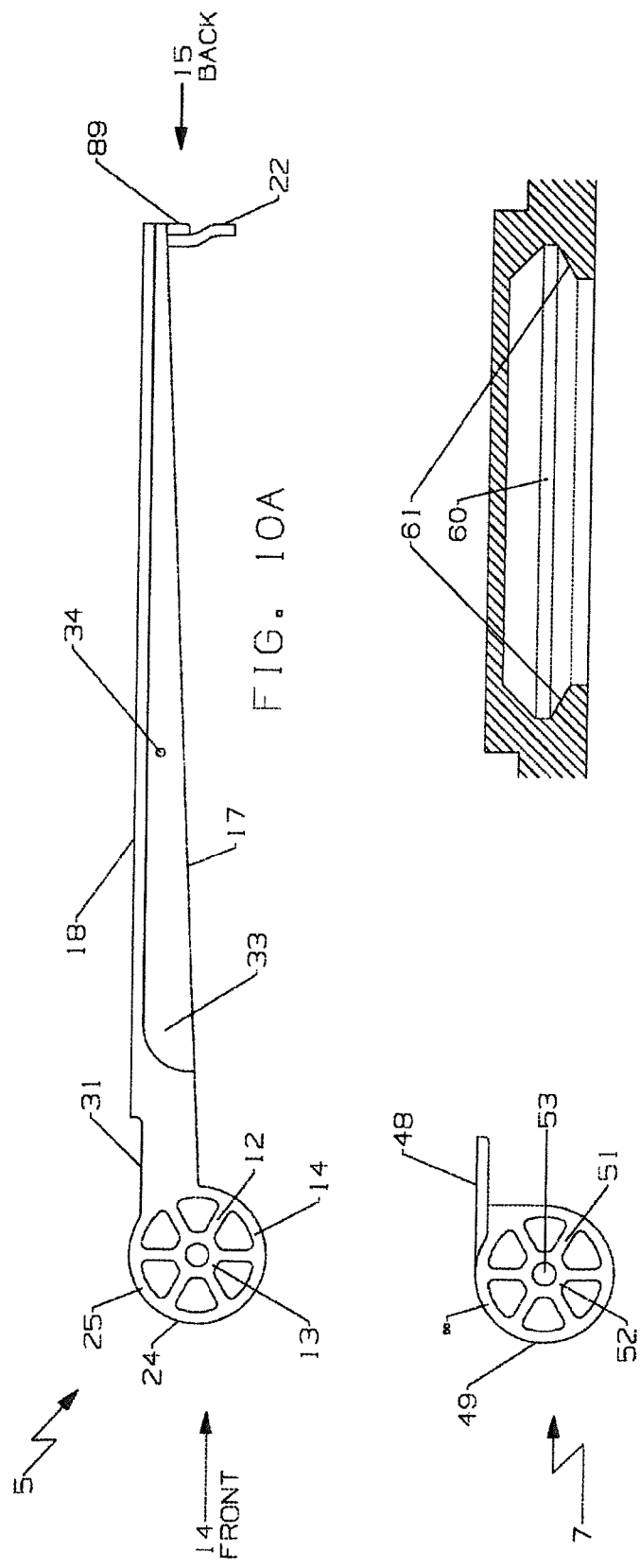

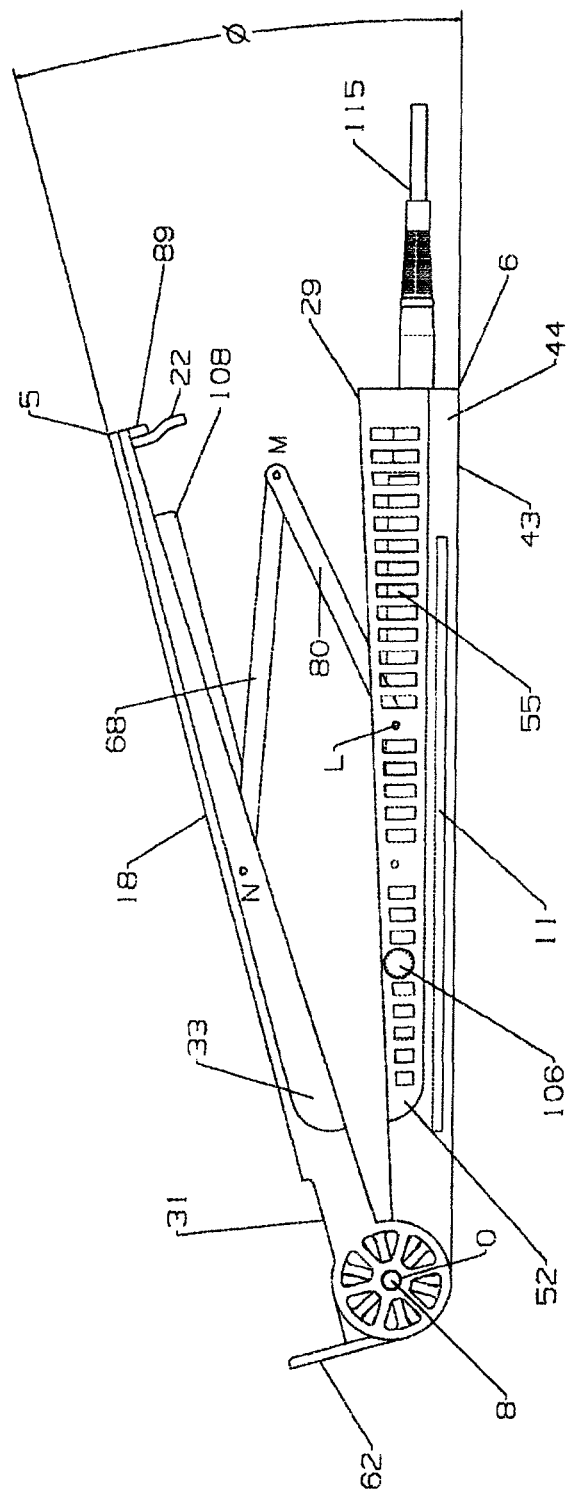
FIG. 11A     9 TILT MECHANISM

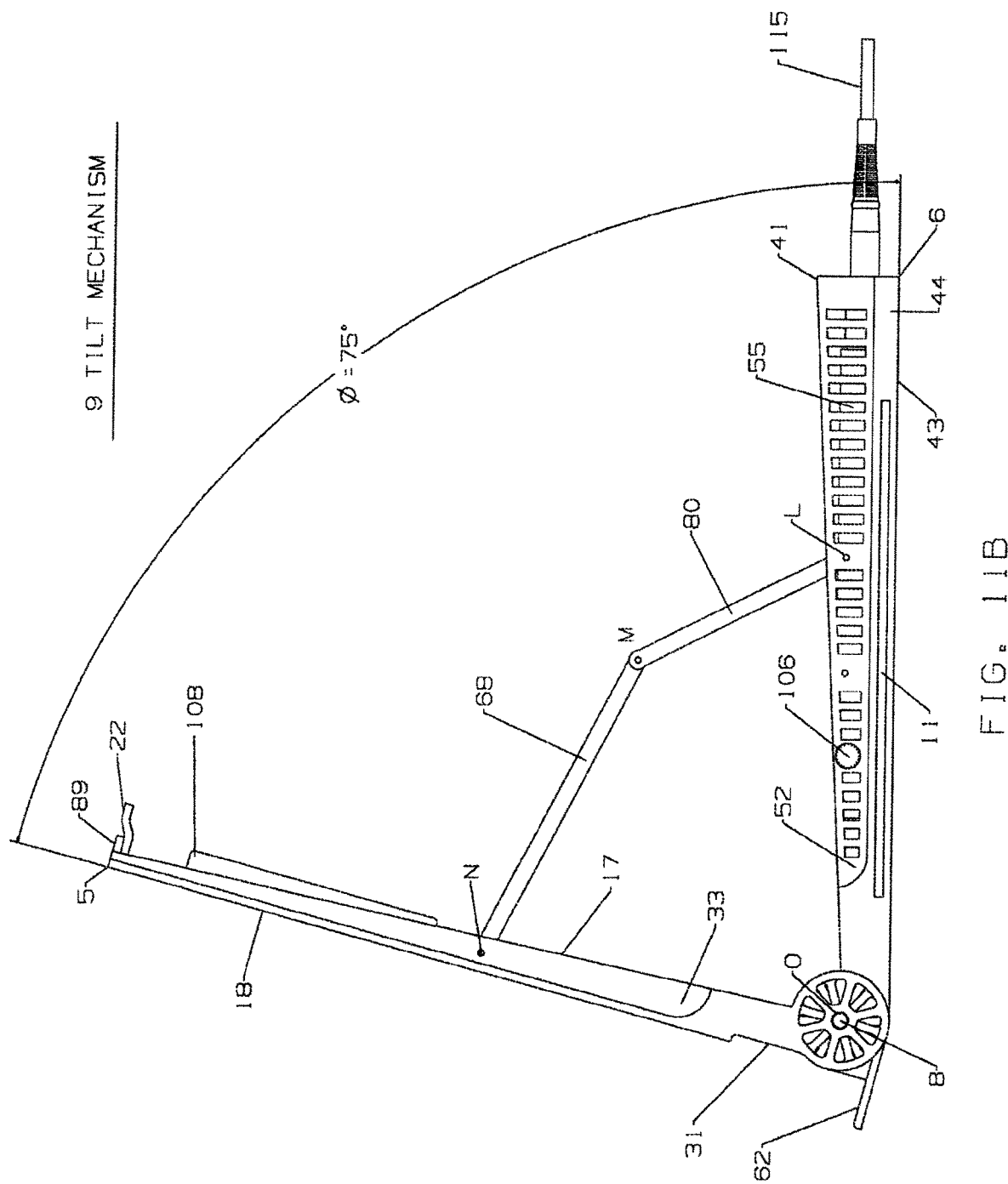

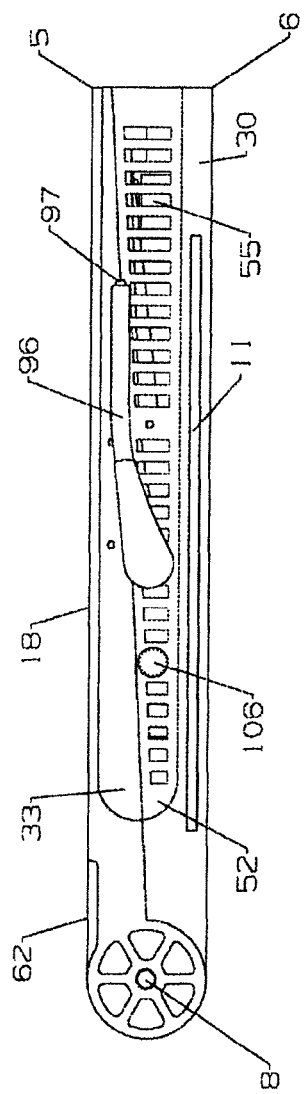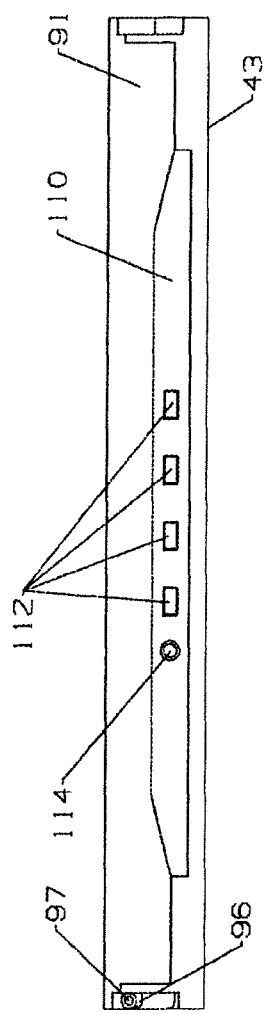
FIG. 16B
FIG. 16C

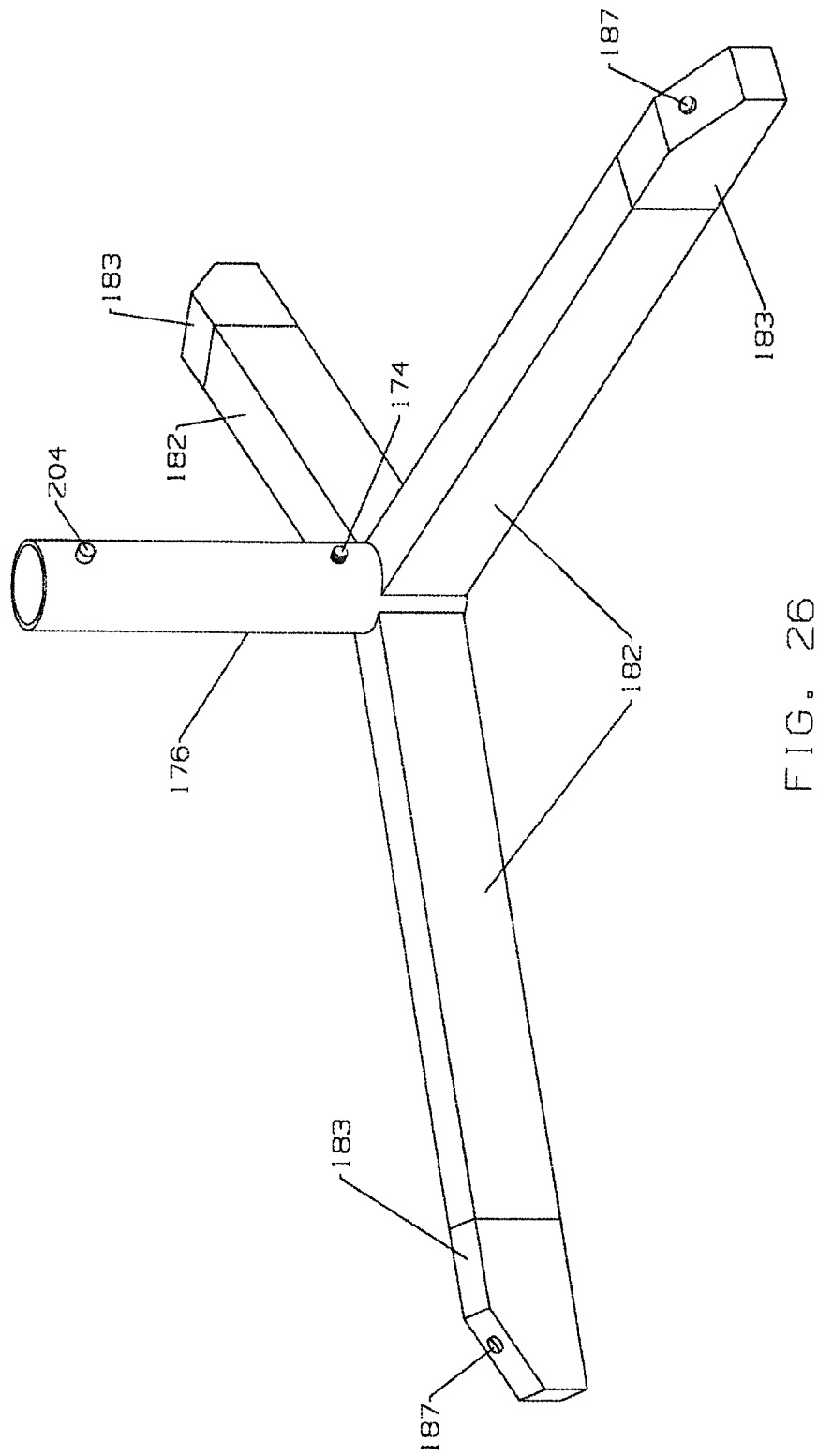

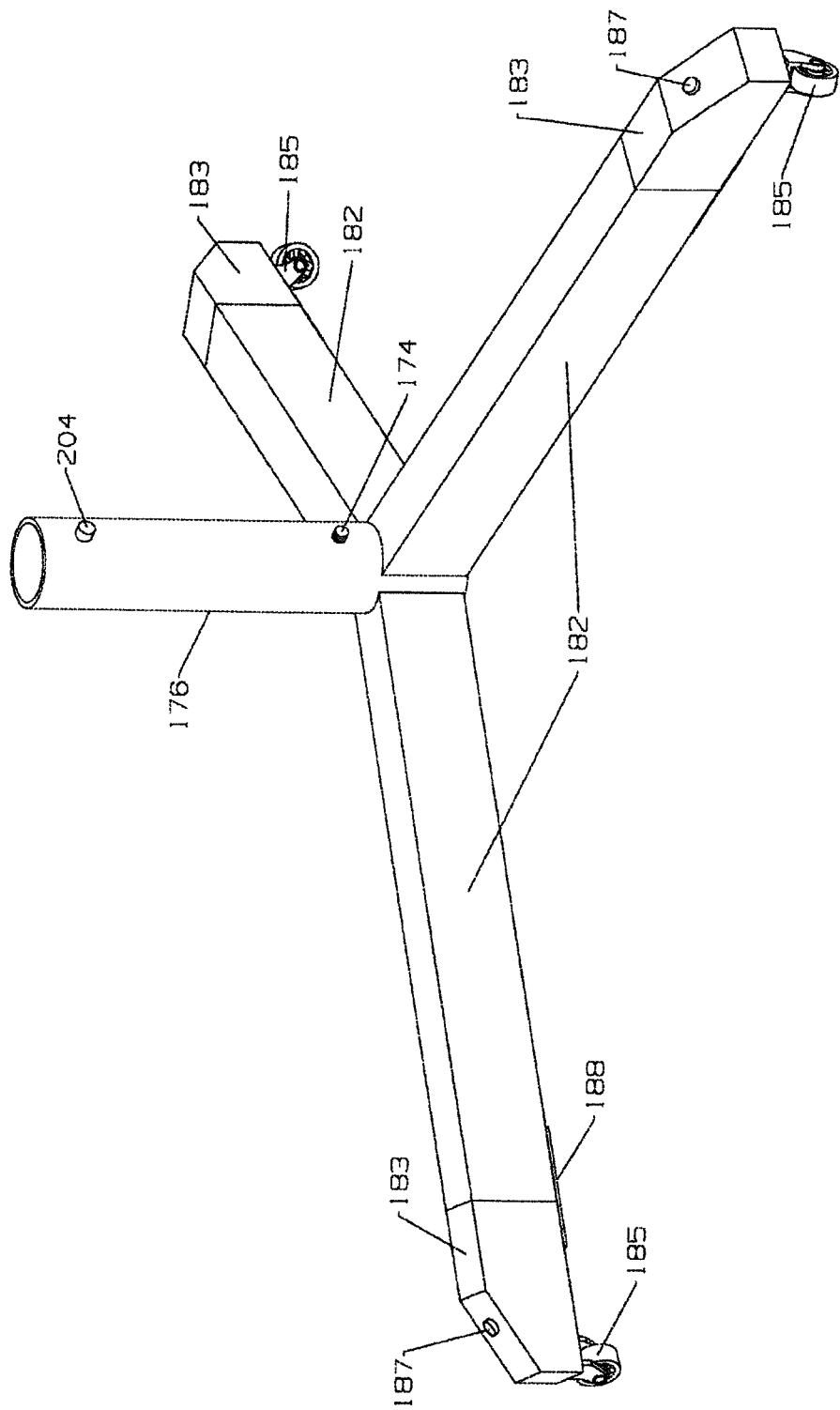

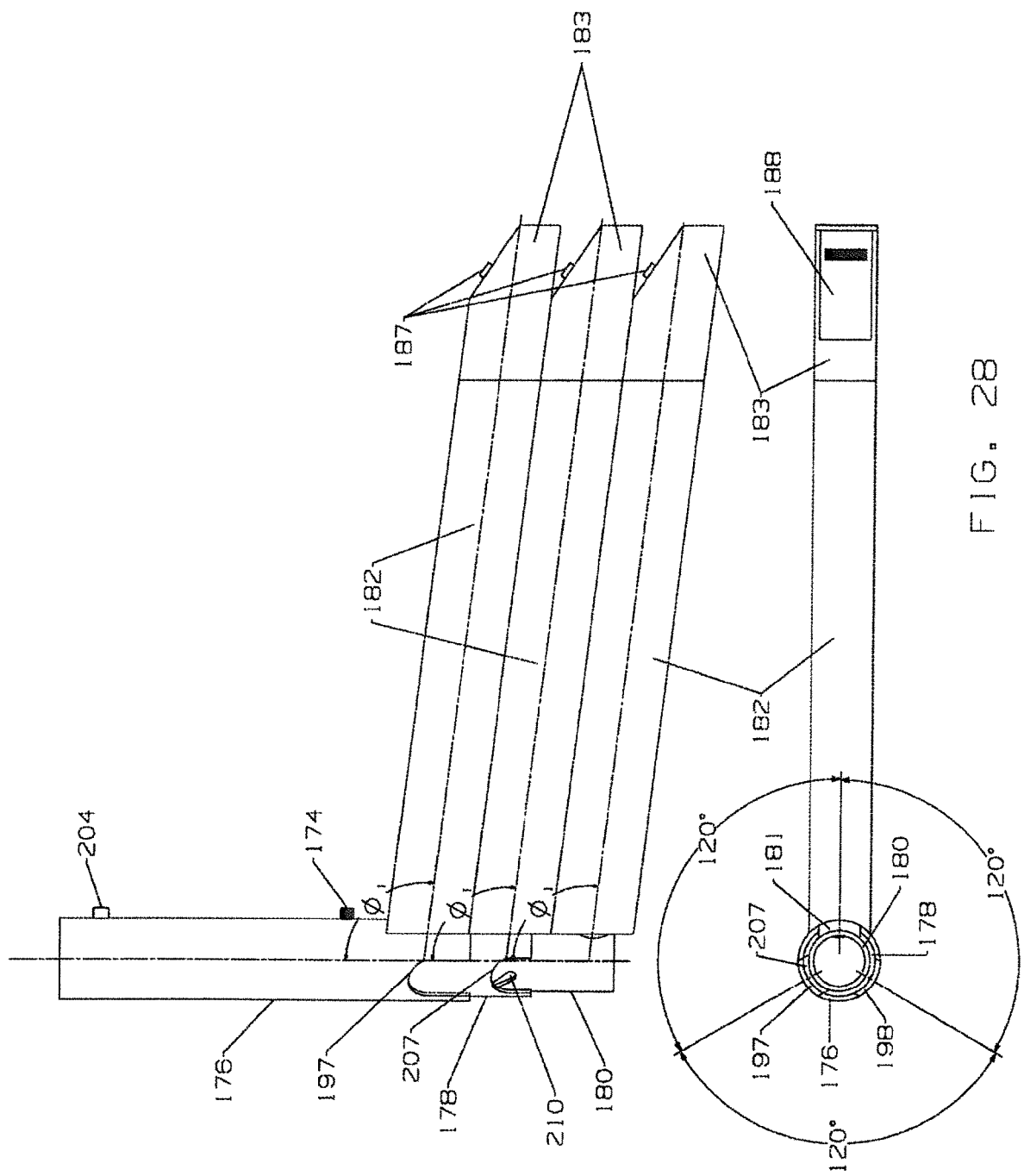

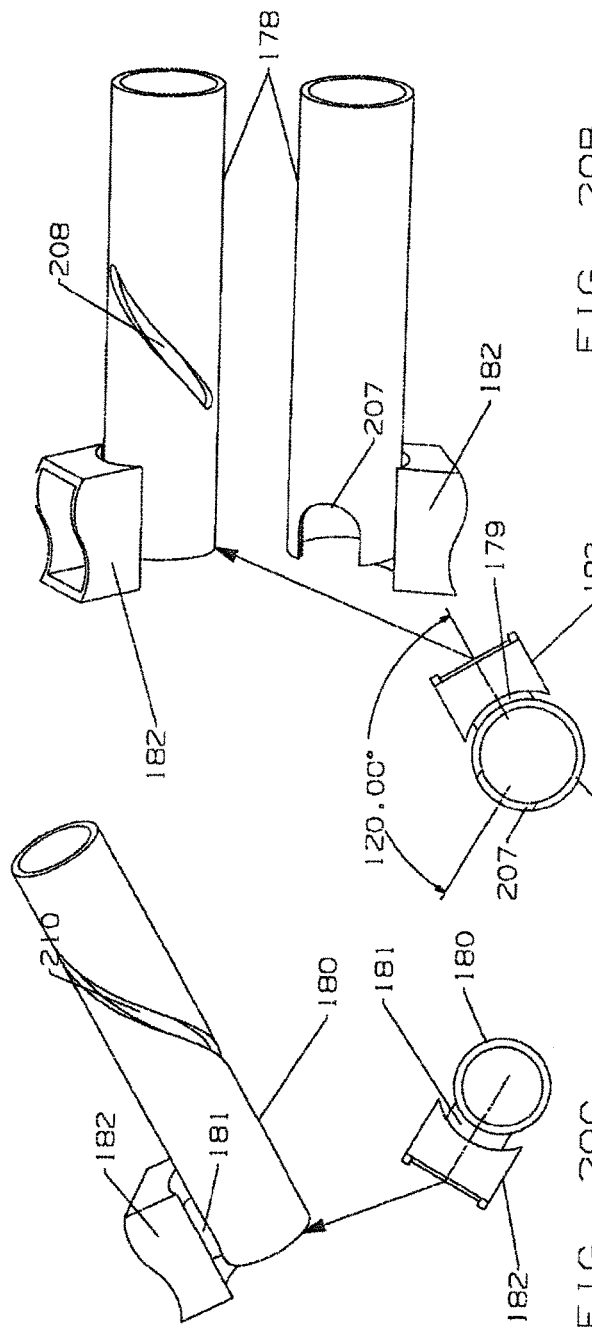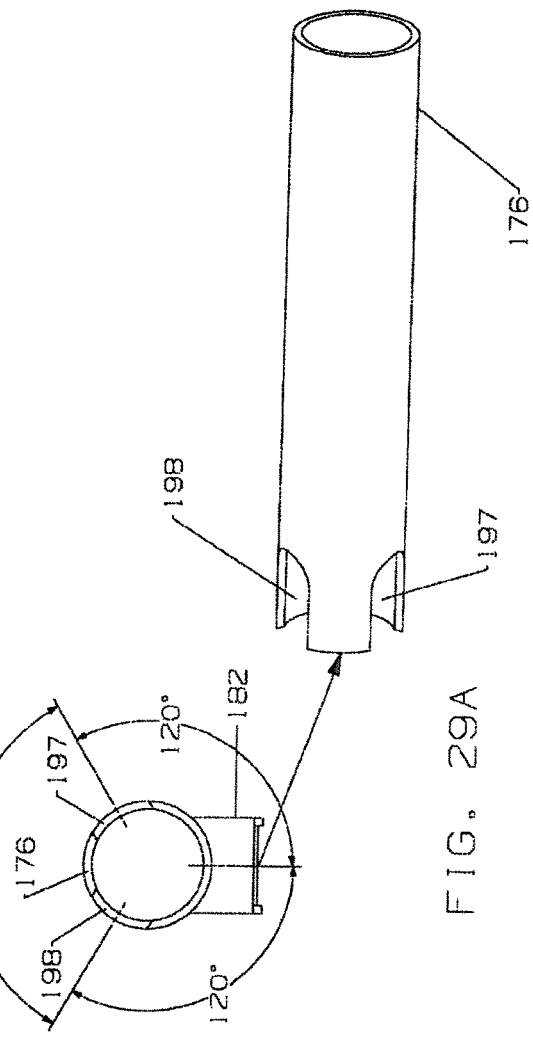

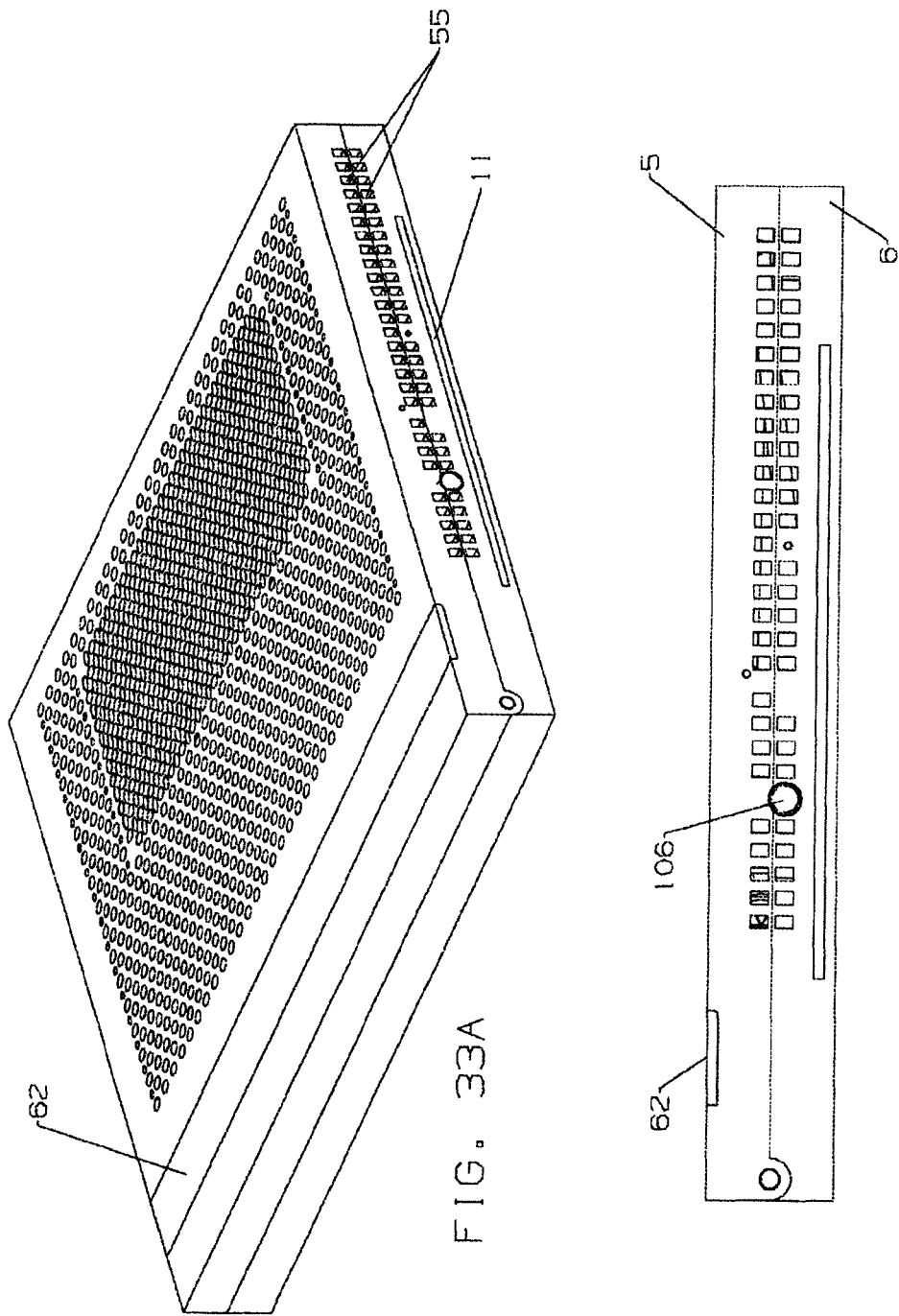

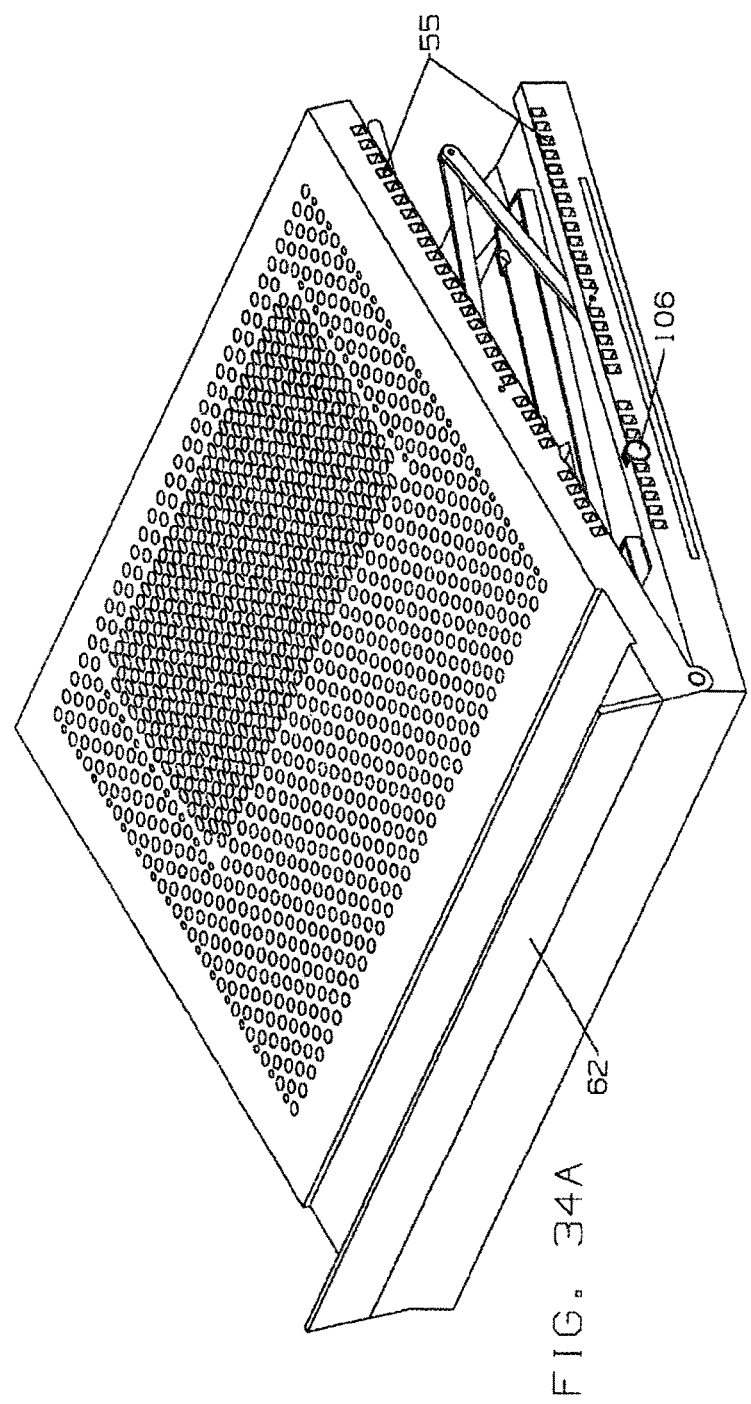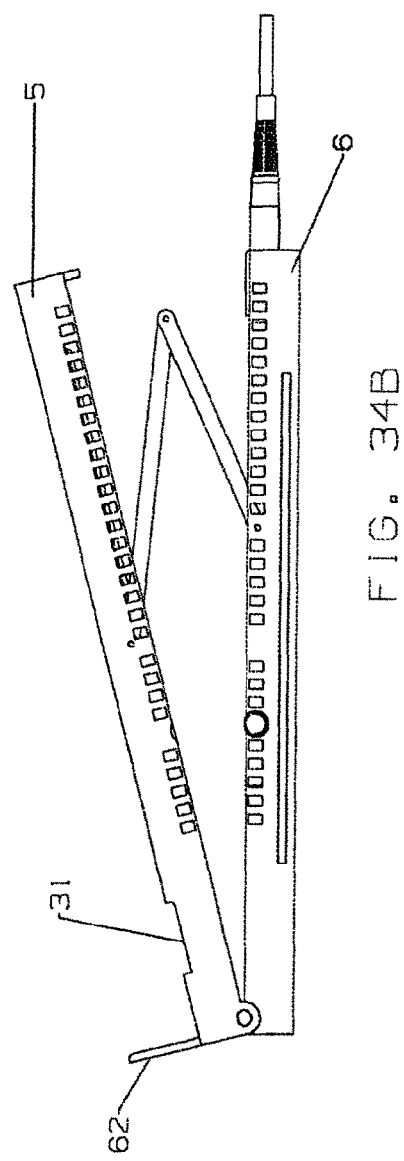

MULTI FUNCTION TRAVEL-FRIENDLY WORKSTATION WITH COOLING AND VENTILATION

CROSS-REFERENCE TO RELATED APPLICATIONS

This application is a Continuation of U.S. Utility patent application Ser. No. 15/588,595, filed May 6, 2017, which claims the benefit of U.S. Provisional Patent Application Ser. No. 62/333,812, filed May 9, 2016. The entire disclosure of both documents is hereby incorporated by reference.

BACKGROUND OF THE INVENTION

1. Field of the Invention

This invention relates to workstations. More particularly, this invention relates to collapsible space saving, multi-function travel-friendly workstation with cooling and ventilation for supporting electronic systems, written reading material and the like.

2. Description of the Related Art

Mobility is ingrained in our lives and has become central to both individuals and businesses to the extent it has changed the way we interact with our surroundings, and particularly equipment and devices. There's no denying that the portability of laptops, as an alternative to bulkier, space consuming electronic systems such as desktop computers which required computer workstations having flat horizontal surfaces upon which a desktop computer is placed for work, have made life on-the-go a lot easier and have become an indispensable part of the human experience, and ultimately a part of the home and work life. Generally, workstations are not portable and occupy a lot of space, often within the confines of a room or building. The use of this space by a workstation prevents the use of such space for other purposes and limits the available workspace. In spite of their portability, laptops require the use of peripherals. However, the numerous peripherals a laptop user must carry can be a part time job trying to keep up while on-the-go.

U.S. Pat. No. 8,225,724 to O'Brien shows a portable folding workstation having closed and operating positions that can easily be installed or removed by one person without tools. The workstation has two walls that are hingedly connected to either side of an elongated member with a foldable work surface, the work surface being shaped to provide a continuous work surface when unfolded. The workstation also has one or more foldable shelves. All of the components of the workstation remain connected to the workstation in the closed position and in the operating position, and no assembly is required.

U.S. Pat. No. 6,053,588 to Biggel et al shows a workstation that has work surfaces and especially desk surfaces in a body which can be opened up. To attain a spacious interior, two opposing side walls are connected via hinges to a transverse wall to allow the body to be unfolded as a workplace with a large area.

U.S. Pat. No. 6,048,044 to Biggel et al shows a collapsible workstation, a system for providing a work environment for multiple users and a system and method for providing work environments at multiple and varying remote locations. A transporting means transports the workstations.

U.S. Pat. No. 5,584,546 to Robert N. Gurin, Cynthia S. Gurin shows a transportable office work station enclosure with door and retractable casters, adequate interior room to stow a chair when closed, a desktop that is a level, full size, load bearing, wheelchair-accessible work surface but incorporates a front section that is alternatively vertically adjustable for use with a keyboard, overhead storage for major computer components with an elevator for raising and lowering them to user height, internal plug-in outlets prewired to external connectors for phone and power hook-ups, and interior cabinets for storage.

U.S. Pat. No. 5,607,214 to Pierce et al shows an improved portable workstation or office that is storable within a transportable trunk-like enclosure which functions as part of the workstation when in an open position and permits other office fixtures as stored in the enclosure to be opened outwardly or extended from the open enclosure to define an office-like workstation. A height-adjustable braking roller assembly mounted on a lower free corner of a door is adapted for load-bearing engagement with a floor.

U.S. Pat. No. 5,803,562 to Jacobs et al shows an improved self-contained portable workstation that is storable within a transportable trunk-like enclosure having covers and doors that open to stably support and function as part of the workstation when in an open position.

U.S. Pat. No. 6,578,708 to Barnett shows a suitcase-like portable laptop workstation that combines a carrying case and workstation for computer components and can be folded and transported as a carry-on luggage for aircraft in a retracted position. In workstation mode, shells extend perpendicularly from the stand in order to hold the laptop on a flat surface.

U.S. Pat. No. 8,172,077 to Gray shows a suitcase-like portable workstation. The unit includes a first half-shell pivotally connected to a second half-shell, each half shell having a rectangular portion. The first half-shell includes a cylindrical rod attached to a tripod, as well as an extension portion of the cylindrical rod with corresponding fastener openings so that a fastener device secures the portable container to the cylindrical rod. The portable container is rotatable upon the cylindrical rod.

U.S. Pat. No. 8,459,734 to Herschler shows an equipment case, briefcase sized or larger, for carrying a laptop computer or other equipment, that opens and separates into two compartments, one forming a seat, the other a table; said equipment case as seat and table stabilized by their coupling.

U.S. Pat. No. 7,314,248 to Mabon et al shows an enhanced version of a collapsible portable workstation apparatus having a scissors linkage lift mechanism allowing adjustment of the seating height, a collapsible frame, wheels, a seat, and work surface, whereby collapsing the frame and manipulating an articulated work surface attachment, permits the apparatus to be utilized as a hand truck.

U.S. Pat. No. 6,604,720 to Wilson shows a portable laptop computer work station comprising a first work space that includes a planar table of rectangular cross section having upper and lower surfaces. The upper surface receives a laptop computer and terminates in a lip along one of the long sides of the table. The lower surface is fitted as a Tee-shaped receiver having a pair of longitudinal legs parallel to the lip at the upper surface and a transverse leg normal to the lip. The planar table is threadably attached at its lower surface to a receiver pad of a conventional camera tripod and provides for additional work spaces to be mechanically supported via the Tee-shaped receiver.

U.S. Pat. No. 6,604,783 to Goodson shows a chair-like collapsible workstation that includes a seat and table. The table is connected to the seat and defines a working surface adapted for supporting articles above the lap of a user in an in-use position spaced apart from the seat. The table is movable from the in-use position to a non-use collapsed position adjacent the seat for storage and transport. An elongated connecting arm interconnects the seat and the table to enable movement of the table between the in-use position and the non-use collapsed position.

U.S. Pat. No. 6,098,936 to Birrell shows a portable ergonomic work station that allows for convenient computer component placement for an individual in a non-conventional work environment. The work station includes multiple adjustable support elements that can independently support the computer components including the keyboard, video monitor and CPU. The work station can be adjusted to position a pair of support arms on which the components are placed to be accessible to the user in a reclining chair or other non-conventional work environment.

U.S. Pat. No. 7,870,937 to Arnao shows a combination computer workstation, cosmetic desk, casual/open tote and luggage set device. The device is easily transported and the area to push or pull luggage may be expanded to stow various pieces of luggage. Luggage may be partially filled yet secured by the divider device.

U.S. Pat. No. 5,529,322 to Barton shows a combination transport device and portable work surface having a collapsible support member and base member. Essentially, it features a suitcase with wheels that can be configured into a workstation.

PCT International Application PCT/US1999/012546 Publication No. WO 1999062375 to Holbrook et al shows a height adjustable workstation which includes a vertical column adapted to be supported on a floor; a height adjustment mechanism adapted to travel up and down the height of the column and to be fixed at desired heights; and a horizontal work surface having a rear edge and a front edge, the work surface attached to the height adjustment mechanism so that the column is adjacent a point generally midway along the rear edge of the work surface. The workstation preferably includes a counterbalance system.

The comfort and well-being of users of workstations are concerns of much importance. While the prior art has attempted to provide portable workstations that can safely be set up or taken down, they fail to resolve major heating problems associated with electronic systems such as laptops, and positioning that permit user adjustments which ergonomically support healthy body postures that alleviate wrist, arm, neck and back pain while sitting or standing, especially for those who have to use them every day. Current workstations can only be used while sitting. Further, they are not space saving, and too bulky to fit into a backpack, purse or overnighter, and are not suitable for traveling business men and women or people on-the-go. Also, current workstations cannot be used in their folded or collapsed state, even briefly at the airport while waiting to board a plane, or while one is constantly on-the-go for business trips or for presentations. Further, they do not adequately address the sources and causes of the above described user problems. Thus, it is apparent that there exists a need for an ergonomically designed space saving, safe and easily portable, reasonably equipped, small office or collapsible multi-function travel-friendly modular workstation that compactly folds easily, can be set up or deployed instantly without the use of tools, can be used while standing or sitting or on-the-go, provide needed cooling and ventilation for electronic devices, support healthy postures that alleviate wrist, arm, neck and back pain, collapses and stores wherever and whenever it is needed such as at home, at the office, at the airport, on business trips, for presentations, support of written reading material, or use anywhere while on-the-go, or just stored in a backpack, a purse or an overnighter, and fits in anywhere, anytime. The present invention is directed toward providing such a workstation that is nonconventional, yet handy!

SUMMARY OF THE INVENTION

The collapsible space saving, multi-function travel-friendly workstation of the present invention provides a versatile workspace to a user in many different environments. The invention comprises three sub-assembly modules: a support unit, a telescopic rod and a tripod. Each sub-assembly comprises pre-equipped mating connectors. The three sub-assemblies are detachably coupled together via their pre-equipped mating connectors: the support unit detachably mounted on the telescopic rod, and the telescopic rod detachably mounted on the tripod. The invention supports a broad range of electronic systems, reading materials and the like which are to be held in a convenient position in a variety of environments for everyday use by individuals of every age with a view of ease of transportation, set up, provision of cooling and ventilation, comfortable usage while standing or sitting, storage and support of healthy postures that alleviates wrist, arm, neck and back pain while being used, and fitting in anywhere, anytime. Everyday use is myriad and not limited to note taking, writing, reading, presentations, performing arts and rehearsing while playing a musical instrument, or serve as a traveling music or conductor stand, or staying connected.

BRIEF DESCRIPTION OF THE DRAWINGS

FIG. 6B shows a section of first and second group of elliptically shaped ventilation cooling holes of the multi-function workstation of FIG. 5 according to an embodiment of the present invention;

FIG. 10A shows an exemplary right side view of the upper housing of the support unit according to the present invention;

FIG. 10B shows an exemplary right side view of the anti-skid mechanism of the support unit according to the present invention;

FIG. 10C shows an exemplary right side view of the lower housing of the support unit according to the present invention;

FIG. 10D shows a section view of showing the annular snap cavity in the lower housing of the support unit according to the present invention;

FIG. 11A shows an exemplary four-bar self-locking tilt mechanism of the support unit with the upper housing angularly oriented at 15° to the lower housing according to the present invention;

FIG. 11B shows the exemplary four-bar self-locking tilt mechanism of FIG. 11A with the upper housing angularly oriented at 75° to the lower housing according to the present invention;

FIG. 16B shows a right side view of a collapsed support unit having the six-bar linkage self-locking tilt mechanism of FIG. 16A;

FIG. 16C shows a back view of FIG. 16B showing the planar end flange;

FIG. 26 shows a perspective view of FIG. 25 showing a collapsed leg element 183 of telescopic leg assembly 177 with non-deployed swivel wheel according to the present invention;

FIG. 27 shows a perspective view of FIG. 26 showing a deployed swivel wheel assembly according to the present invention;

FIG. 28 shows a side view of an embodiment of a collapsed tripod according to the present invention;

FIG. 29A shows a perspective view of a cut away section of an exemplary circular tubular housing of the stationary leg assembly to expose first and second inverted U-shaped notches according to the present invention;

FIG. 29B show a perspective left and right views of a cut away section of an exemplary tubular barrel cam of the first moveable leg assembly to expose the first cam track, third inverted U-shaped notch, and a bottom view of the first tubular connector according to the present invention;

FIG. 29C show a perspective view of a cut away section of an exemplary tubular barrel cam of the second moveable leg assembly to expose the second cam track, and a bottom view of the second tubular connector according to the present invention;

FIG. 33A shows a perspective view of an alternative embodiment of a collapsed multi-function workstation;

FIG. 33B shows a right side view of FIG. 33A;

FIG. 34A shows a perspective view of an exemplary deployed support unit according to an embodiment of FIG. 33A;

FIG. 34B shows the four-bar self-locking tilt mechanism of the support unit of FIG. 34A;

Figure 1:
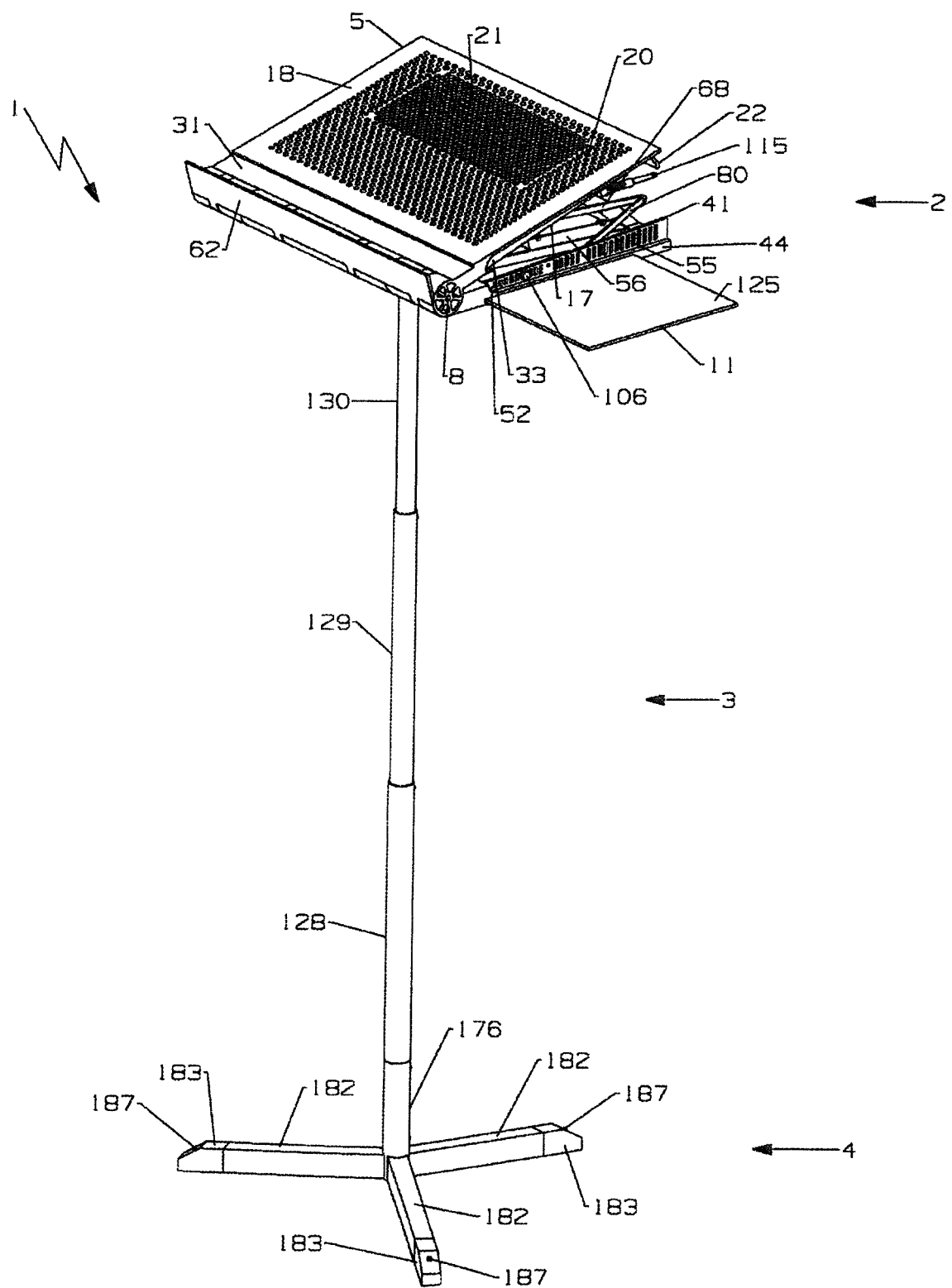
FIG. 1 shows a perspective view of an exemplary deployed multi-function workstation in a standing position according to an embodiment of the present invention.
Figure 2:
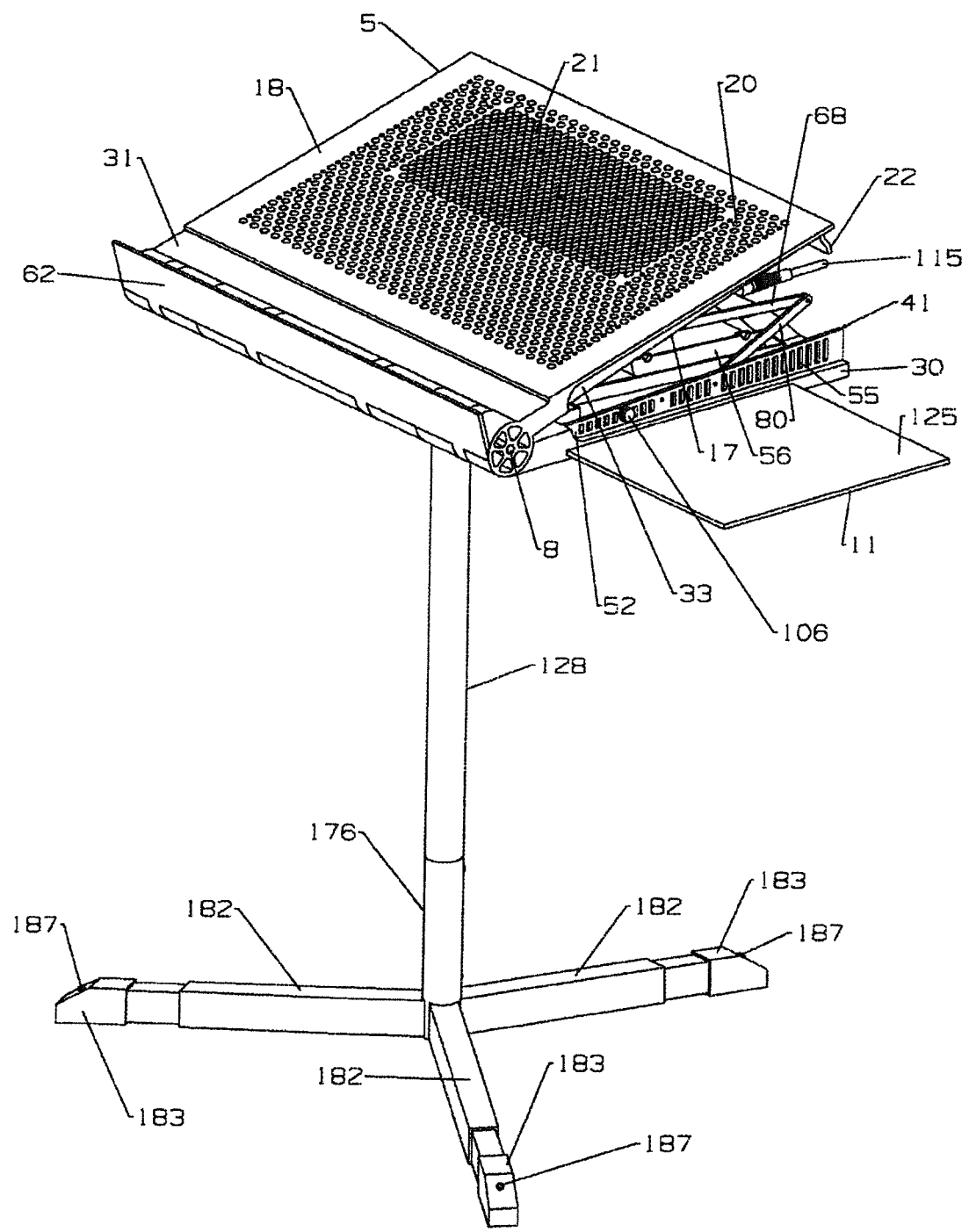
FIG. 2 shows a perspective view of FIG. 1 in a sitting position.
Figure 3:
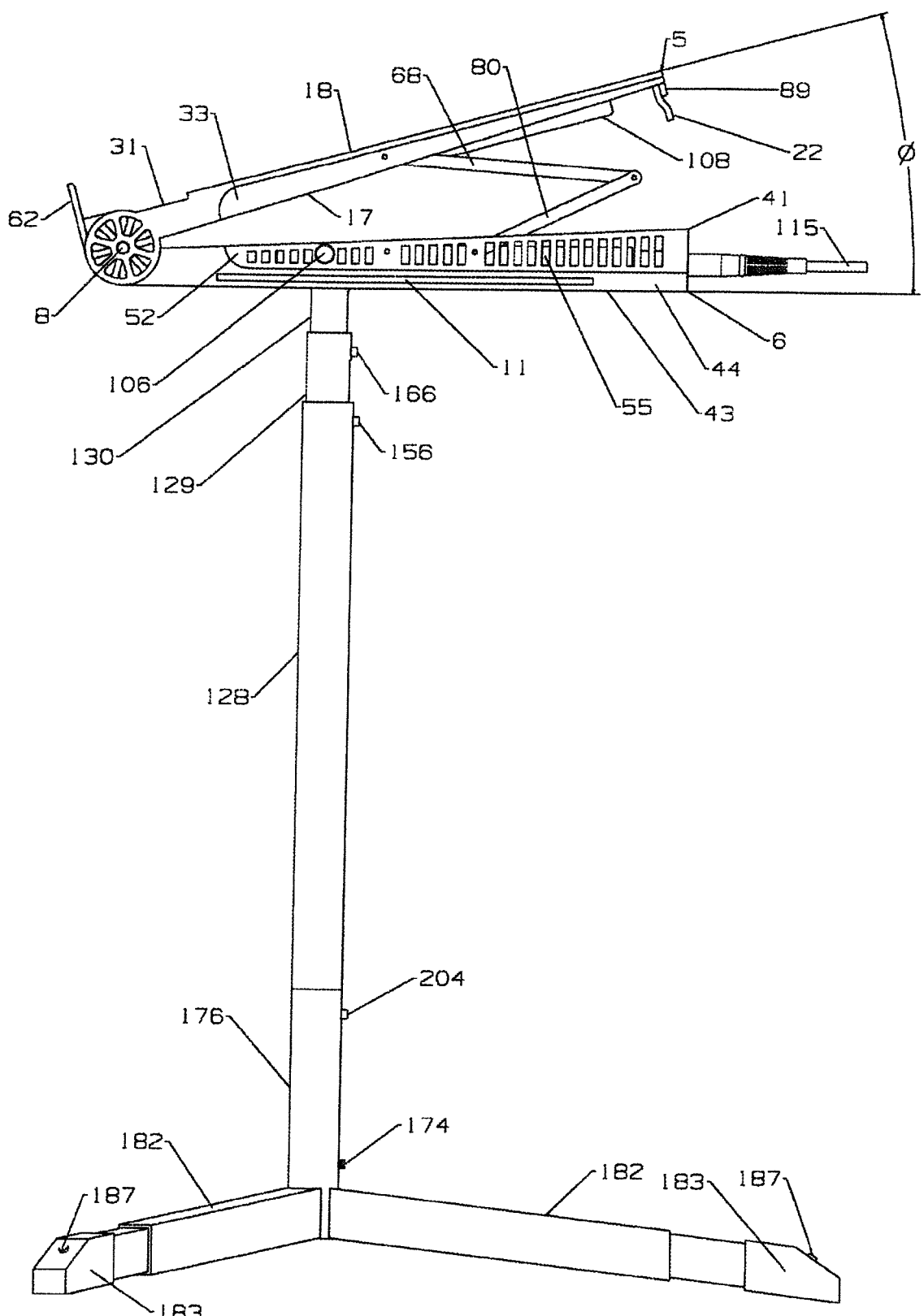
FIG. 3 shows a right side view of the deployed multi-function workstation of FIG. 2.
Figure 4:
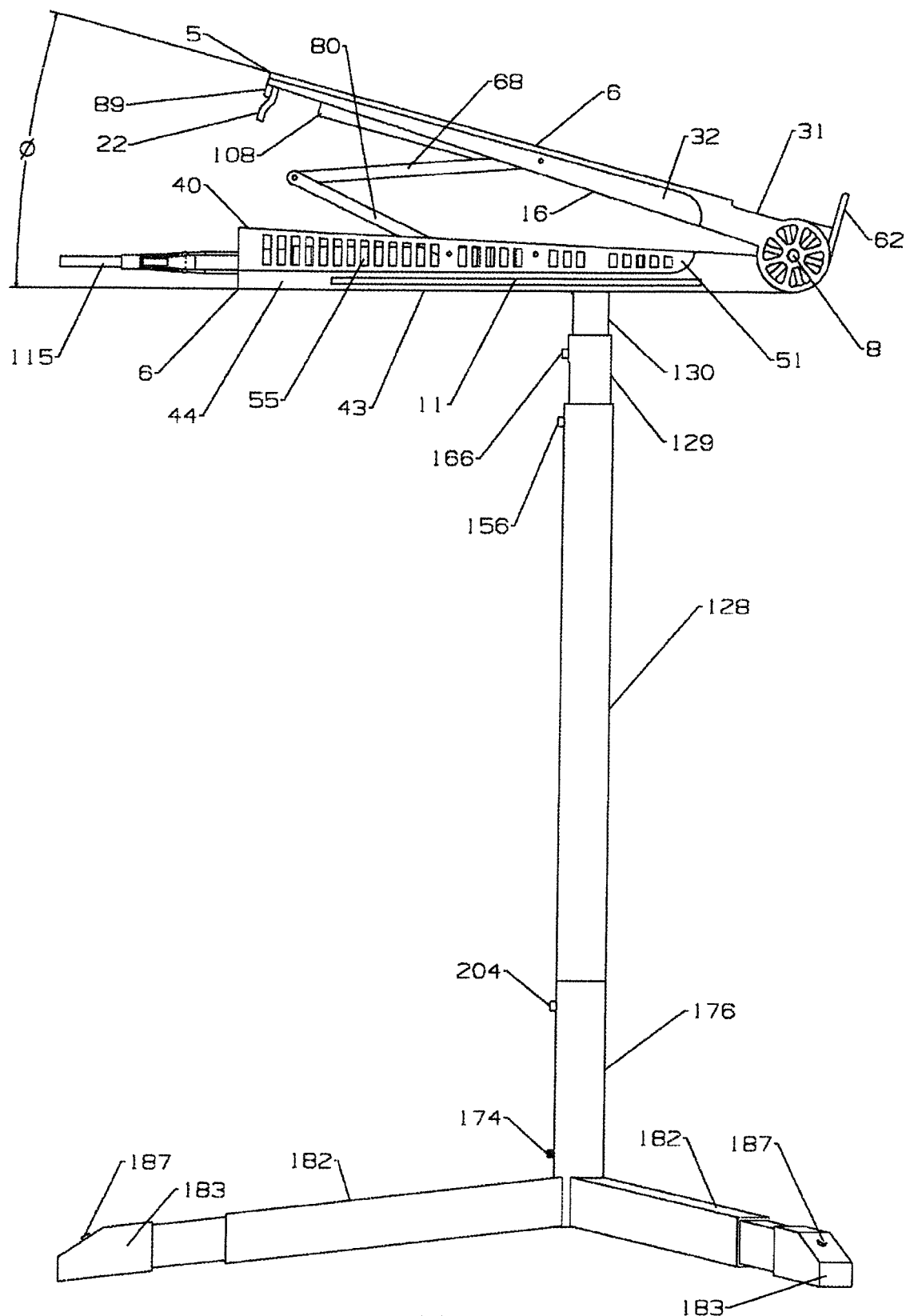
FIG. 4 shows a left side view of the deployed multi-function workstation of FIG. 2.

The exemplary embodiments set forth in the drawings are illustrative in nature and not intended to be limiting of the invention. Moreover, individual features of the drawings and the invention will be more fully apparent and understood in view of the detailed description.

DETAILED DESCRIPTION OF THE INVENTION

The summary of the invention does not necessarily describe all necessary features of the present invention. The embodiments of the present disclosure will best be understood by reference to the drawings. These drawings are provided for illustration purposes only and merely depict typical or example embodiments of the invention and to facilitate the reader's understanding of the invention. It will be readily understood that the components of the present disclosure, as generally described and illustrated in the drawings herein, could be arranged and designed in a wide variety of different configurations. It is also understood that the elements or components of the present invention may comprise any shape, length, and/or configuration and that the shapes, lengths, and/or configurations described and shown herein are for illustrations purposes only, and not a limitation. Thus, the following more detailed description of the embodiments of the invention is not intended to limit the scope of the disclosure or its applicability, but is merely representative of possible embodiments of the disclosure. It should be noted that for clarity and ease of illustration these drawings are not necessarily made to scale, the emphasis being placed upon clearly illustrating the principles of the present invention. In some cases, well-known structures, materials, or operations are not shown or described in detail. Also, certain features of illustrated embodiments have been enlarged or distorted relative to others to facilitate visualization and clear understanding. In particular, thin features may, for example, be thickened for clarity or illustration.

As used herein, the term electronic system can refer to any of a number of configurations of portable electronic devices including laptop computers, gaming laptops, tablets, laptop-tablet hybrids, notebook computers and other electronic devices or systems. Also, the term reading material can refer to any of a number of configurations of reading material such as books, magazines, loose sheets or sheet-like material and other similar articles. As used herein, arty term in the singular may be interpreted to be in the plural. Alternatively, any term in the plural may be interpreted to be in the singular. The singular and plural terms may be used interchangeably.

Also, it should also be understood that, unless expressly defined in this provisional patent using the sentence "As used herein, the term '_____' is hereby defined to mean . . . " or a similar sentence, there is no intent to limit the meaning of a term, either expressly or by implication, beyond its plain or ordinary meaning. As such the term should not be interpreted to be limited in scope based on any statement made in any section of this non-provisional patent (other than the language of the claim of the invention).

The following text provides a broad description of numerous different embodiments of the present invention that should be construed as exemplary only and does not describe every possible embodiment since it would be impractical to describe every possible embodiment, if not impossible. It should be understood that any feature, characteristic, component, product, step or methodology described herein can be deleted, combined with or substituted for, in whole or part, any other feature, characteristic, component, product, step or methodology described herein. Further, numerous alternative embodiments could be implemented, using either current technology or technology developed after the filing date of this non-provisional patent which would still fall within the scope of the claims of this invention.

Referring to FIGS. 1-4, an exemplary embodiment of a deployed multi-function workstation with cooling and ventilation of the present invention is generally shown as 1. Multi-function workstation with cooling and ventilation 1 ("workstation 1") may comprise a support unit assembly 2 ("support unit 2") pre-equipped with a mating connector, a telescopic rod assembly 3 ("telescopic rod 3") pre-equipped with a mating connectors, and a tripod assembly 4 ("tripod 4") pre-equipped with a mating connector. Workstation 1 is modular in design such that support unit 2, telescopic rod 3, and tripod 4 are detachably connected to each other, via their pre-equipped mating connectors, permitting multiple configurations/design changes and or component replacement without having to do a complete re-design of its entire configuration and/or components with every design change (FIGS. 1-4). In this exemplary embodiment, support unit 2 is detachably mounted on telescopic rod 3 via their pre-equipped mating connectors, and telescopic rod 3 is detachably mounted on the tripod 4 via their pre-equipped mating connector. Support unit 2, telescopic rod 3 and tripod 4 have pre-equipped mating connectors. Further, the modular design permits an individual modular unit to be used as a standalone device. For example, the support unit 2 may be used as a standalone laptop stand that may be placed on a user's lap, on a surface such as a table top, etc. or may be used coupled as shown in FIG. 1. Telescopic rod 3 may be used as a standalone fishing rod. Telescopic rod 3 may also be detachably connected to tripod 4 and used as a camera support device by connecting a camera mount, to the upper end of telescopic rod 3 to which a camera may be secured, the camera mount having a means for rotating the camera about the vertical axis of said telescopic rod 3, and about a horizontal axis for tilting a camera attached to the mount. The camera mount may also be stored in the support unit when not in use. Workstation 1 may be used for supporting an electronic device of any suitable variety or reading material, and may be adjusted for height and comfortable use while standing or sitting. It should be appreciated that workstation 1 may have different configurations and may be configured in a variety of sizes depending on the size and dimensions of the electronic device or reading material with which workstation 1 is to be used and/or on user preferences.

Figure 5:
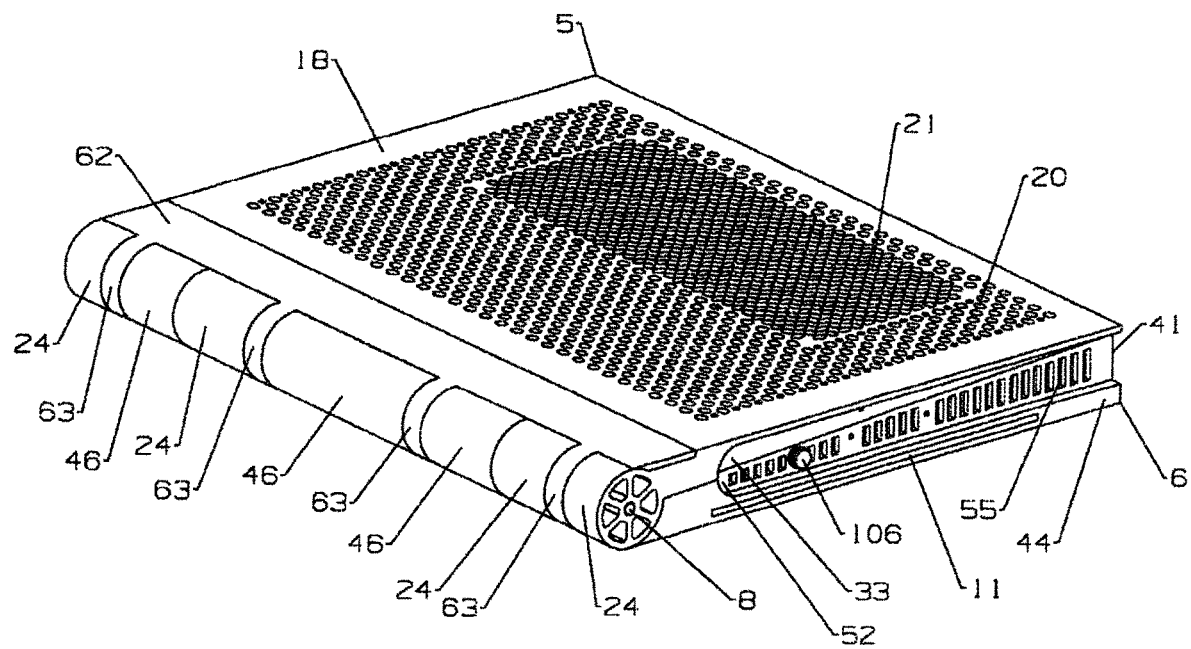
FIG. 5 shows a perspective view of an exemplary collapsed mufti-function workstation for storage or transportation according to an embodiment of the present invention.
Figure 6A:
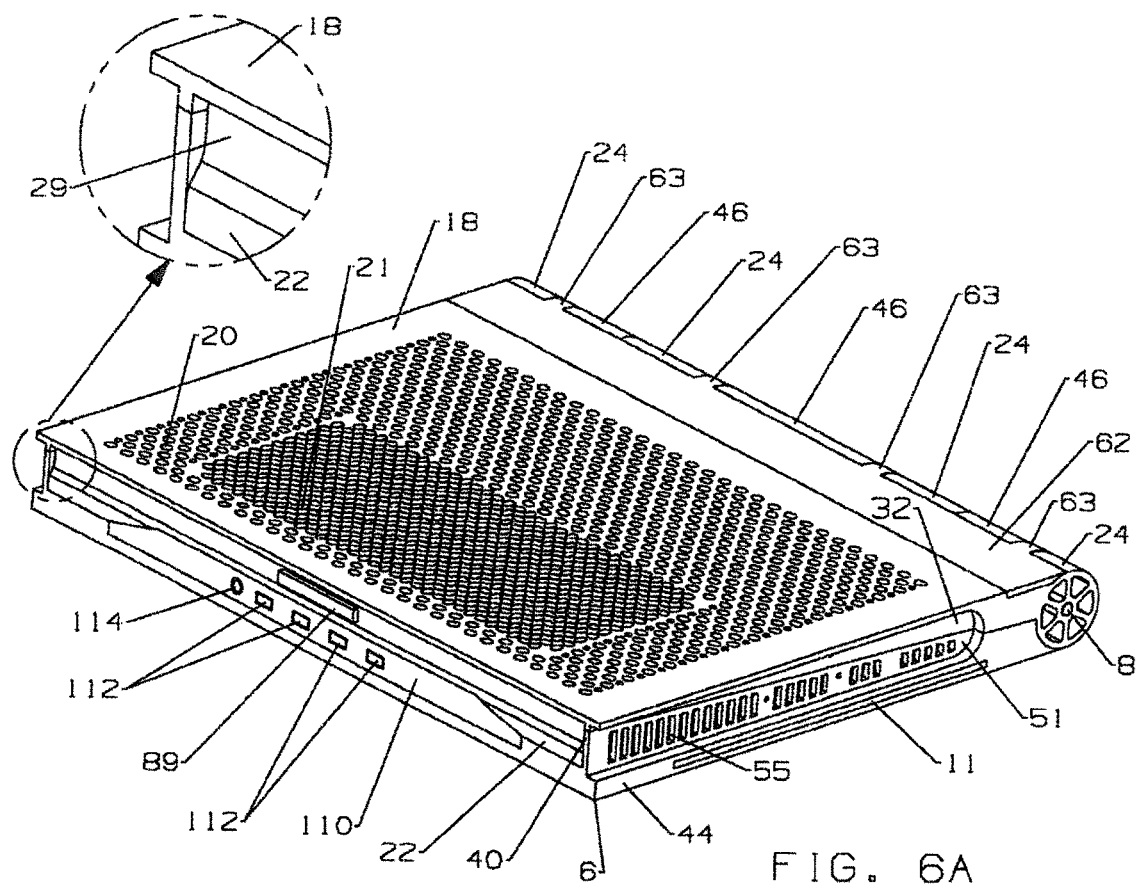
FIG. 6A shows another perspective view of the collapsed multi-function workstation of FIG. 5.
Figure 7:
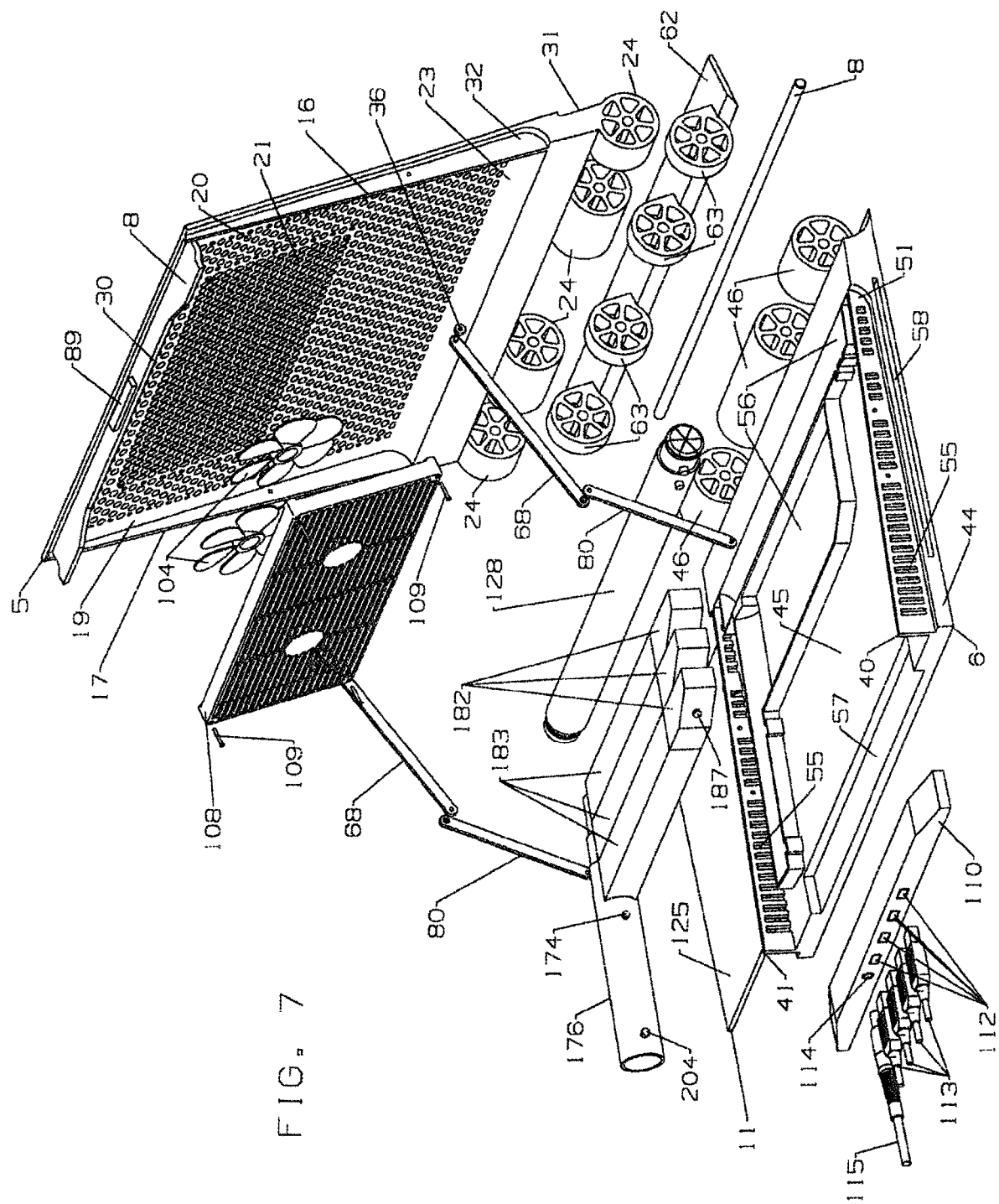
FIG. 7 shows a partial exploded perspective view of a collapsed multi-function workstation according to an embodiment of the present invention.

Referring to FIGS. 5-7, workstation 1 may be collapsed for storage or put away when not in use or transported in a purse, suitcase, laptop bag, backpack, carry-on luggage for aircraft or an overnighter for easy travel. In order to transport workstation 1, telescopic rod 3 and tripod 4 and/or other peripherals may be collapsed, stored and secured in form-fitted storage cavities 56 within support unit 2. In this way storage is provided for the respective components or component assemblies and/other peripherals in the collapsed configuration of support unit 2. Thus, workstation 1 is a sleek, slim and lightweight easy to transport, setup and store, perfect work and travel friendly space saving companion for any person to enjoy all the benefits of the ergonomic comfort of a permanent workstation regardless of locale or while traveling or on-the-go.

Figure 8:
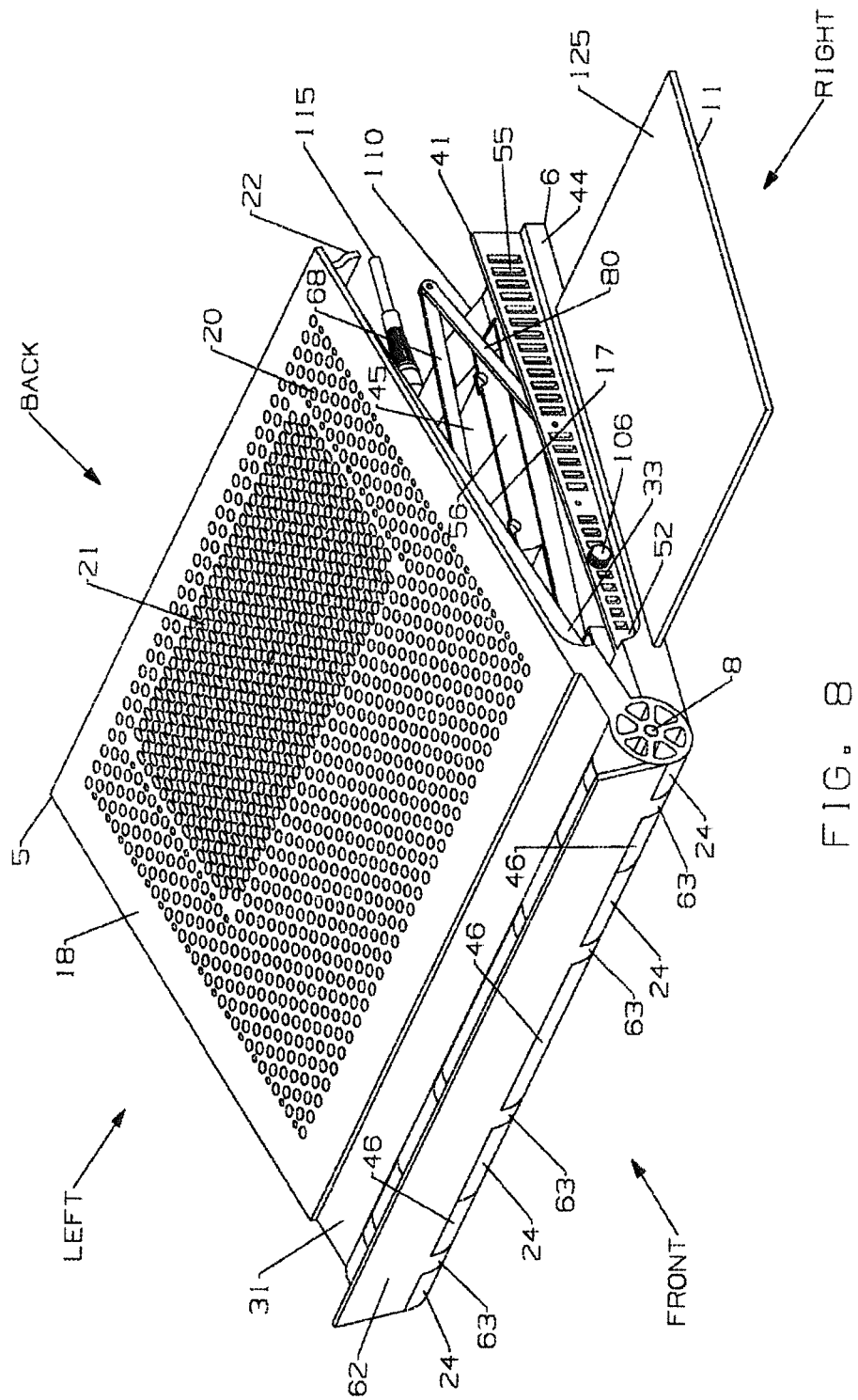
FIG. 8 shows a perspective view of an exemplary deployed support unit according to an embodiment of the present invention.

Referring to FIGS. 8-10, support unit 2 may comprise upper housing 5, lower housing 6, anti-skid mechanism 7, hinge mechanism 8, self-locking tilt mechanism 9, cooling and ventilation system 10, retractable mouse pad 11, power management system 12 and cable management system 13 (not shown). One or more of the components of support unit 2 may be modular in design (e.g., power management block 12) such that they may be removably connected to support unit 2, permitting multiple configurations/design changes and or component replacement without having to do a complete re-design of its entire configuration and/or components with every design change. Also, upper housing 5, lower housing 6 and anti-skid mechanism 7 provide an aesthetic appearance. As such, upper and lower housings 5 and 6, and anti-skid mechanism 7 permit the outer appearance (e.g., color, shape, etc.) of support unit 2 to be simply and efficiently changed without having to change its function. In addition, upper and lower housings 5 and 6 provide protection to self-locking tilt mechanism 9, cooling fans 104, retractable mouse pad 11, power management block 12 and cable management system 13 from foreign elements that may cause damage, etc.

Figure 9A:
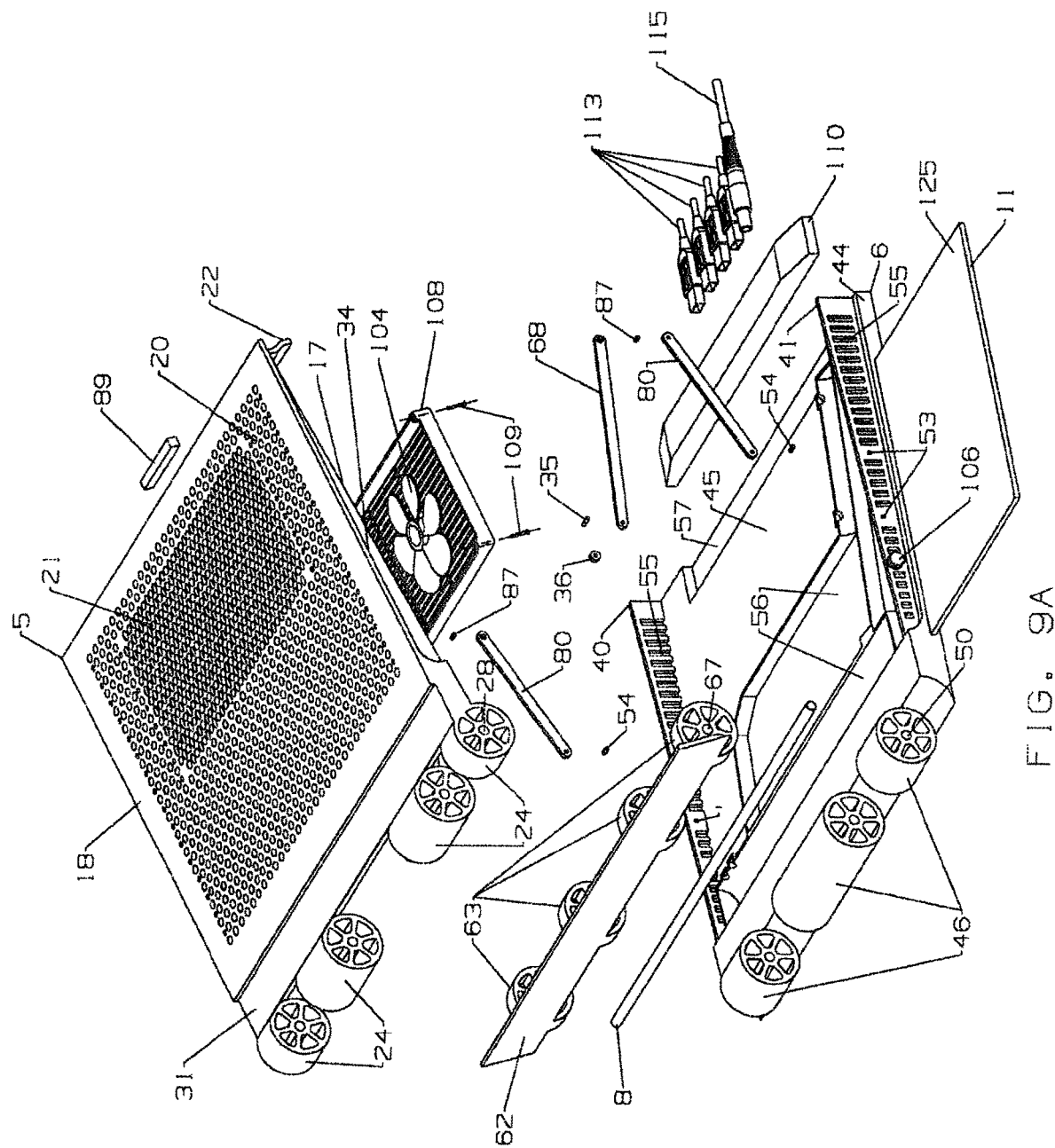
FIG. 9A shows a partial exploded perspective view of FIG. 8.
Figure 9B:
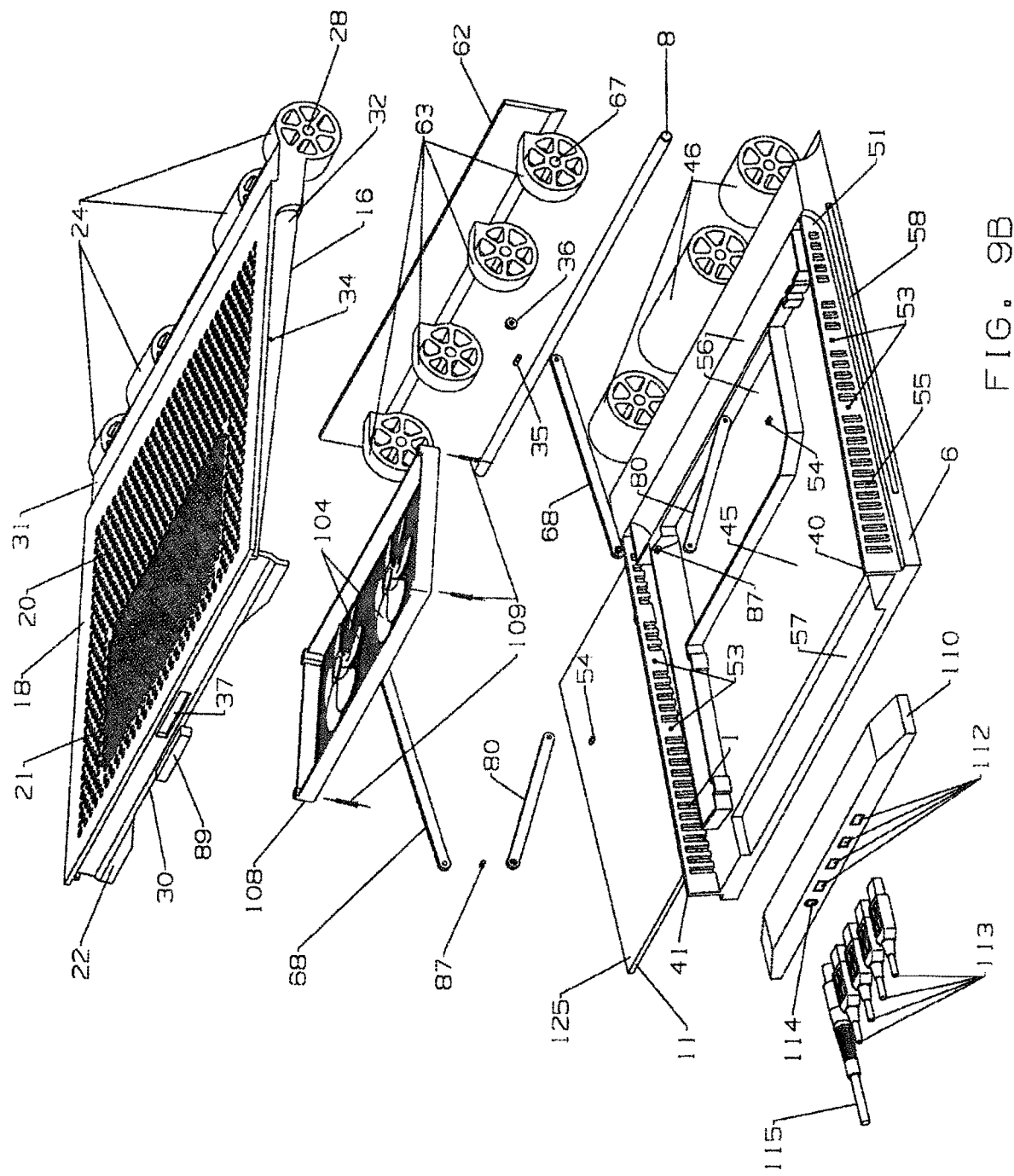
FIG. 9B shows another partial exploded perspective view of FIG. 8.
Figure 9C:
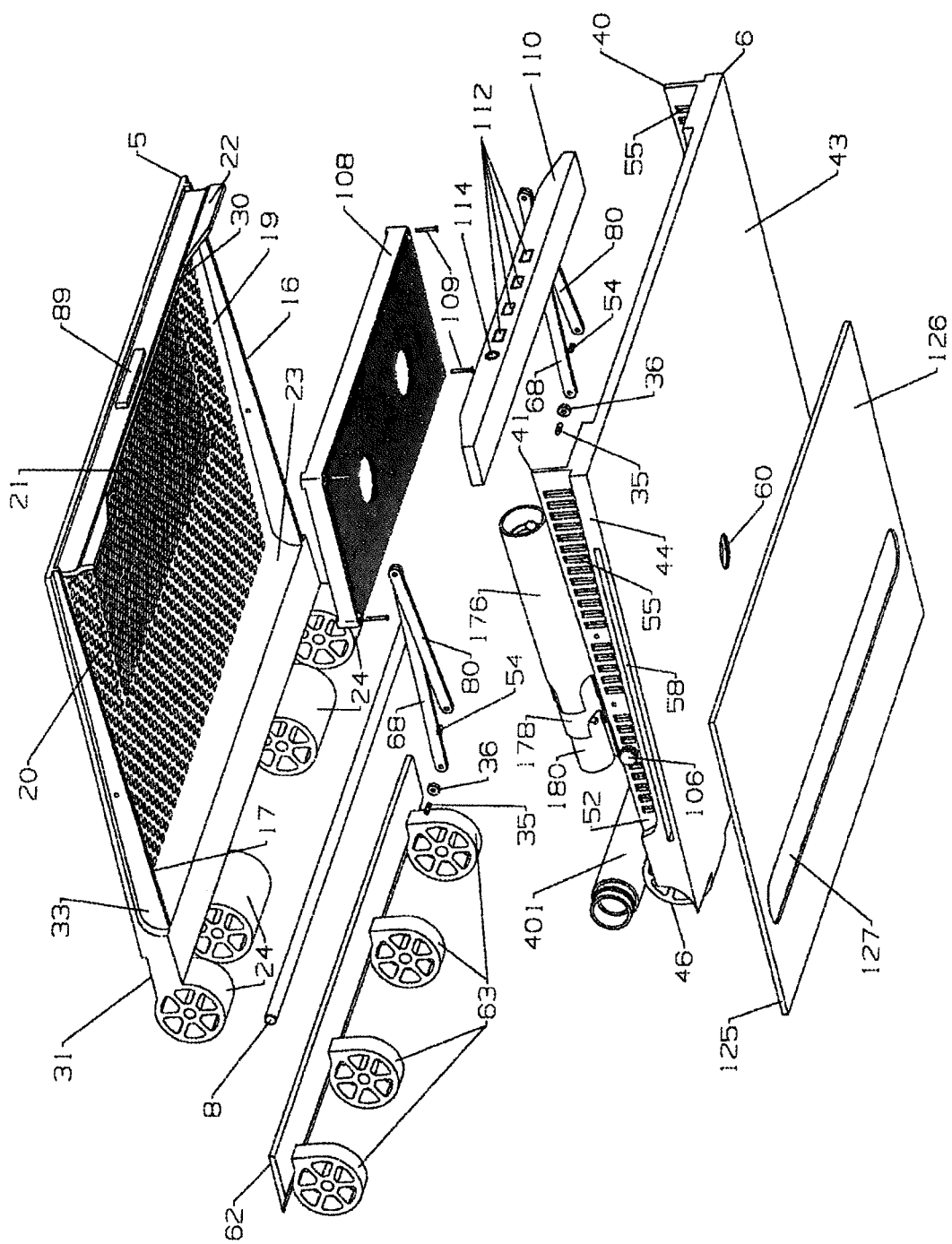
FIG. 9C shows an exploded perspective view of FIG. 8 showing the annular snap cavity.

With continued reference to FIGS. 8-10, upper housing 5 may comprise front and back ends 14 and 15, opposite side walls 16 and 17, top and bottom surfaces 18 and 19, first and second group ventilation cooling holes 20 and 21 ("cooling holes 20" and "cooling holes 21"), and end flange 22. Opposite side walls 16 and 17 may be rigidly attached to or integrally formed with upper housing 5. Front 14 end positions adjacent to a user. Front end 14, opposite side walls 16 and 17, bottom surface 19, and the end flange 22 together define a trough-like or open interior cavity 23 ("cavity 23"). Cavity 23 houses grated fan cover 108 within which cooling fans 104 are biased. As shown in FIGS. 9A-9C and 10A, front end 14 of upper housing 5 terminates in hinge arms 24 comprising central aperture 28 through which hinge mechanism 8 (or hinge or pivot pin) can be passed. Optionally, front end 14 may comprise a hinge end. In the embodiment of FIG. 10A, each hinge arm 24 may further comprise rim-like outer ring 25 integrally connected by a plurality of radial spokes 26 to hub-like inner ring 27 comprising said central aperture 28. In the exemplary embodiment of FIG. 10A, end flange 22 has a partial S-shape and is rigidly attached to bottom surface 19 proximate the end of back end 15 of upper housing 5. Thus, back end 15 of upper housing 5 takes the form and shape of a grip (or gripping area) 29 that accommodates at least a portion of several fingers of the hand as shown in FIG. 6. End flange 22 has cut-out 30 configured to fit the top portion of power block 110. It is understood that end flange 22 may have a variety of shapes and curvatures and thus gripping area 29 accordingly. Upper housing 5 may be angularly oriented or tilted by holding grip 29 and pulling upper housing 5 upward in a counterclockwise direction. In another exemplary embodiment, end flange 22 may be rigidly attached or integrally formed with bottom surface 19 of upper housing 5. Gripping area 29 spans the entire width of upper housing 5.

With continued reference to FIGS. 8-10, top surface 18 of upper housing 5 may comprise recess 31 that nests retaining platform 62 of anti-skid mechanism 7 such that the top surface of retaining platform 62 is flush with top surface 18 of upper housing 5 when collapsed, FIGS. 5-6. Opposite side walls 16 and 17 of upper housing 5 may comprise a wedge-shaped configuration that may respectively comprise wedge-shaped recesses 32, 33. Pivot hole pair 34 for receiving pivot pins 35 are biased on opposite side walls 16 and 17 of upper housing 5 as shown in FIGS. 9A-9C and 10A. Optionally, side walls 16 and 17 may comprise vents/slots that are in fluid communication with cavity 23 of upper housing 5 to allow ejected hot air sucked from the base of an electronic system by cooling fans 104 escapes through them into the atmosphere. Upper housing 5 comprises through slot 37 which is located within end flange 22 and within gripping area 29 as shown in FIGS. 9B, 9C and 10A, and configured to receive press button 89 for disengaging pawls 74 from ratchet teeth 84 of self-locking tilt mechanism 9.

With continued reference to FIGS. 8-9, cooling holes 20 are biased in a first region such that they are in fluid communication with cavity 23 of upper housing 5, the cooling holes 20 being spaced apart according to a uniform geometric pattern and density, FIG. 6B. The first region includes all regions outside the location of cooling fans 104. Upper housing 5 may also comprise a second group of elliptically shaped through ventilation cooling holes 21 that are biased in a second region such that they are in fluid communication with the cavity 23 of upper housing 5 as well as cooling fans 104, the cooling holes 21 being spaced apart according to a uniform geometric pattern and density. Each cooling hole 21 in the second group is preferably perpendicularly orientated relative to its neighbor in the horizontal plane as shown in FIG. 6B. Such geometric arrangements promote improved cooling airflow and increase cooling air flow effectiveness to eliminate the uneven temperature distributions or undesirable temperature levels.

With continued reference to FIGS. 9 and 10, lower housing 6 comprises front and back ends 38 and 39, opposite side walls 40 and 41, inner bottom and bottom surfaces 42 and 43, and bottom portion 44. Front end 38 for positioning adjacent to a user. Opposite side walls 40 and 41 may be rigidly attached to or integrally formed with lower housing 6. Front end 37, opposite side walls 40 and 41, inner bottom surface 42, and power block 110 together define a trough-like or open interior cavity 45 ("cavity 45"). Without power block 110, cavity 45 is open at back end 39. Optionally, back end 39 is not open. As shown in FIGS. 9A-9C and 10C, front end 38 of lower housing 6 has the shape of a truncated wedge which terminates in hinge arms 46 comprising central aperture 50 through which hinge mechanism 8 (or hinge or pivot pin) can be passed. Optionally, the front end may comprise a hinge end. In the embodiment of FIG. 10C, each hinge arm 46 may further comprise rim-like outer ring 47 integrally connected by a plurality of radial spokes 48 to hub-like inner ring 49 comprising said central aperture 50 as shown in FIG. 10C.

With continued reference to FIGS. 9 and 10, opposite side walls 40 and 41 of lower housing 6 may comprise a wedge-shaped configuration that may respectively comprise wedge-shaped recesses 51, 52. Pivot hole pair 53 for receiving pivot pins 54 are biased on opposite side walls 40 and 41 of lower housing 6 as shown in FIGS. 9A-9C and 10C. Opposite side walls 40 and 41 comprise vents/slots 55 that are in fluid communication with cavity 45 of lower housing 6 such that ejected hot air sucked from the base of an electronic system by cooling fans 104 escapes through them into the atmosphere. In one embodiment, the vents may be louvered vents, or the slots may have fins. The vents/slots 55 define the greater portion of the length of opposite side walls 40 and 41 of lower housing 6. As shown in FIGS. 9A and 9B, cavity 45 may have several form-fitted storage cavities 56 for components, component assemblies and/or other peripherals depending on user preferences. It should be understood that any number of form-fitted storage cavities 56 may be defined within cavity 45 of lower housing 6 for storing any number of components or products depending on preferences. In some embodiments an insert or tray comprising a plurality of sections that are form-fitted openings for component assemblies such as telescopic rod 3, tripod 4 and/or other peripherals of use may be situated within lower housing 6 so that the components or products are secured in position within the sections when support unit 2 is closed.

With continued reference to FIGS. 9-10, back end 39 of lower housing 6 may comprise recess (or cutout) 57 configured to receive power management block 12. As shown in FIG. 10C, bottom portion 44 of lower housing 6 may comprise through slot 58 ("slot 58") spanning the entire width of lower housing 6 (from left to right) configured to receive retractable mouse pad 11. Alternatively, bottom portion 44 may have a pocket, a recess or an opening configured to receive retractable mouse pad 11. As shown in FIG. 10C, projection 59 inside slot 58 engages with shallow slot 127 in the bottom surface of retractable mouse pad 11. Projection 59 guides retractable mouse pad 11. Projection 59 also acts as a stop to prevent retractable mouse pad 11 completely detaching from or falling out of the slot 58 when retractable mouse pad 11 slides in and out of slot 58. As shown in FIGS. 9C and 10D, annular snap-fit cavity 60 integrally formed within a shallow hollow region extending from bottom surface 43 inward into projection 59 of lower housing 6 is configured to receive snap fit connector 146 of telescopic rod 3 so that support unit 2 and telescopic rod 3 are in fluid communication. As shown in FIGS. 1-4, snap-fit cavity 60 is biased in lower housing 6 such that it will not tip over when removably connected to snap-fit connector 146 while upper housing 5 is deployed at an angle greater than 0 degree but less or equal to 75 degrees, whether in a sitting or standing position, support unit 2. Alternatively, the shallow hollow region of support unit 2 may be adapted for fitting an adapter attachment that may comprise a snap-fit cavity or some other appropriate adapter device attachment such that the adapter attachment will establish fluid communication between support unit 2 and telescopic rod 3. Further appropriate locking mechanisms for locking the adapter device attachment onto telescopic rod 3 end and then connecting telescoping rod 3 to support unit 2 are provided. Snap-fit cavity 60 or other adapter device attachment serves as a pre-equipped mating connector for support unit 2. Alternatively, bottom portion 44 may comprise a detachable modular unit that is configured to house mouse pad 11 and snap-fit cavity 60 or other adapter device attachment.

Referring to FIGS. 8-10 anti-skid mechanism 7 may comprise a substantially planar retaining platform 62 comprising a front end for positioning adjacent to a user, a back end opposite said front end, top and bottom surfaces, and opposite side ends. The front end of said retaining platform 62 terminates in hinge arms 63 comprising a central aperture 67 through which hinge mechanism 8 (or hinge or pivot pin) can be passed while the other back end is free. Optionally, the front end may comprise a hinge end. In the embodiment of FIG. 10B, each hinge arm 63 may further comprise rim-like outer ring 64 integrally connected by a plurality of radial spokes 65 to hub-like inner ring 66 comprising said central aperture 67. As shown FIG. 10B, anti-skid mechanism 7 is whistle-shaped when viewed from the right side. In operation, anti-skid mechanism 7 is pivotally movable between collapsed and deployed positions and prevents an electronic system or reading material on top surface 18 of upper housing 5 from sliding, slipping or falling. Further, in operation, anti-skid mechanism 7 has two lock positions: a deployed-lock position which is a position when platform 62 is at 90 degrees relative to top surface 18 of upper housing 5, and a collapsed-lock position which is a position when platform 62 is at 0 (zero) degrees relative to, and substantially parallel to top surface 18 of upper housing 5 as shown in FIGS. 5 and 6. In the collapsed-lock position, anti-skid mechanism 7 nests in recess 31 such that its top surface is flush with top surface 18 of upper housing 5 as shown in FIGS. 5 and 6. In the deployed-lock position, anti-skid mechanism 7 rotates counterclockwise away from upper housing 5, outwardly projects at 90 degrees relative to and substantially perpendicular to top surface 18 of upper housing 5 such that platform 62 and upper housing 5 form an L-shape as shown in FIG. 8. In the embodiment of FIG. 8, anti-skid mechanism 7 spans the entire width (left to right) of upper housing 5 as shown in FIG. 5. In addition to anti-skid mechanism 7, a skid or slip resistant material may be applied to top surface 18 of upper housing 5 to prevent sliding of an electronic system or reading material that may be resting on top surface 18 of upper housing 5. Further, anti-skid mechanism 7 may be configured with various other changes and modifications without departing from the spirit and scope of the invention. In the deployed position, anti-skid mechanism 7 provides an ergonomic wrist support for and prevents an electronic system or reading material from sliding or falling along top surface 18 of upper housing while being used by a user.

Upper housing 5, lower housing 6 and antiskid mechanism 7 are hinge or pivotally connected, via hinge arms 24, 46 and 63 by hinge mechanism 8. The hinge mounting allows upper housing 5 to be adjustable and tilted pivotally between collapsed and deployed positions as shown in FIGS. 5 and 8. In the collapsed position, the top surface 18 of upper housing 5 is substantially parallel to bottom surface 43 of lower housing 6. In the deployed position, top surface 18 of upper housing may angularly be oriented at an angle of ø relative to bottom surface 43 of lower housing 6, where ø>0°. In the embodiment of FIG. 12, $0° \le ø \le 75°$ (i.e., is from ø to 75 degrees). The angular orientation of upper housing 5 is user selected for comfortable viewing of (1) the screen of an electronic system, or (2) reading material, or (3) for working, by a user.

Referring to FIG. 9 of the exemplary embodiments of support unit 2, hinge mechanism 8 may comprise a hinge or pivot pin mounted in central apertures 28, 50 and 67 respectively of upper housing 5, lower housing 6 and anti-skid mechanism 7. Alternately, hinge mechanism 8 may be a hinge apparatus which interconnects upper housing 5, lower housing 6, and anti-skid mechanism 7 in such a manner that upper housing 5 is capable of rotating toward or away from lower housing 6; anti-skid mechanism 7 is capable of rotating toward or away from upper housing 5. A further alternate embodiment of hinge mechanism 8 may comprise two separate hinge mechanisms, one interconnecting or coupling upper and lower housings 5 and 6, the second interconnecting or coupling upper housing and anti-skid mechanism 5 and 7.

Referring to FIG. 11, an exemplary embodiment of a self-locking tilt mechanism configured to angularly orient upper housing 5 relative to lower housing 6 from a collapsed substantially horizontal position to any angular position or from one angular position to another angular position or from any angular position to a horizontal position is generally shown as 9. Self-locking tilt mechanism 9 may comprise tilt mechanism 78A and self-locking mechanism 78B. Tilt mechanism 78A comprises four-bar linkage 79, actuator 85, and press-to-release mechanism 88. Four-bar linkage 79 comprises a first link being pivotally connected to a second link at a first connection point, the second link being pivotally connected to a third link at a second connection point, the third link being pivotally connected to a fourth at a third connection point, the fourth link being pivotally connected to said first link at a fourth connection point, such that the four links faint four connection joints with a predetermined one degree of freedom. Further, the four-bar linkage includes a drive link and a link which maintains a substantially fixed attitude relative to the other links in space during movement. The four-bar linkage herein referred to is a locked chain linkage with four links, each link being binary, is pivotally connected to the other in a selected manner to have a predetermined one degree of freedom and four joints. In the exemplary embodiment of self-locking tilt mechanism 9 shown, a four-bar chain linkage is formed by taking upper and lower housings 5 and 6 as a links housing, and combining them with two binary links comprising pawl link 68 and ratchet hub link 80. In the exemplary embodiment of self-locking tilt mechanism 9 shown in FIG. 11, upper housing 5 being a drive link (first link) pivotally connects to lower housing 6 being a fixed link (second link) at pivot O (first connection point), lower housing 6 is pivotally connected to ratchet hub link 80 at pivot L (second connection point), ratchet hub link 80 is pivotally connected to pawl link 68 at pivot M (third connection point), pawl link 68 is pivotally connected to upper housing 5 at pivot N (fourth connection point).

With continued reference to FIG. 11, self-locking mechanism 78B comprises pawl-ratchet link pair 86. Pawl-ratchet link pair 86 comprises pawl link 68 and ratchet hub link 80. Referring to FIGS. 12-13, exemplary embodiments of a pawl and ratchet hub links of the present invention are generally shown respectively as 68 and 80. As shown in FIG. 12A, pawl link 68 may comprise pawl head 69 integrally formed with bar 70. In another embodiment, pawl head 69 and bar 70 may be separate parts or components which are connected together. In the exemplary embodiments of FIGS. 12-13, pawl end 71 comprises a pawl disc integrally formed with pawl head 69. Pawl end 71 comprises three cut-out or pawl pockets 72 circumferentially spaced apart from each other at 120 degree equal angular intervals about its periphery for receiving three locking pawls 74 and three pawl spring recesses 75 adjacent pawl pockets 72 for receiving three pawl springs 76. Further, pawl head 69 comprises pawl pivot posts 73 biased in pawl pockets 72 for pivotally mounting locking pawls 74 and pawl spring pivot pins 77 for pivotally mounting pawl springs 76 that are integrally formed with pawl head 69. Each pawl pocket 72 comprises an abutment surface 72A configured to prevent movement of locking pawl 74 in one direction while permitting movement in the opposite direction. Locking pawl 74 which is pivotally mounted within pawl pocket 72 is configured to move between a locked position against abutment surface 72A and a disengaged position away from abutment surface 72A. Each pawl spring 76 has one end coiled that pivotally mounts on pivot pin 75 within pawl spring recess 75 while the other end engages and exerts a biasing force on locking pawl 74 urging locking pawl 74 toward said locked position when locking pawl 74 is in said disengaged position. Optionally, pawl head 69 and pawl end 71 may be separate parts or components connected together.

Figure 12B:
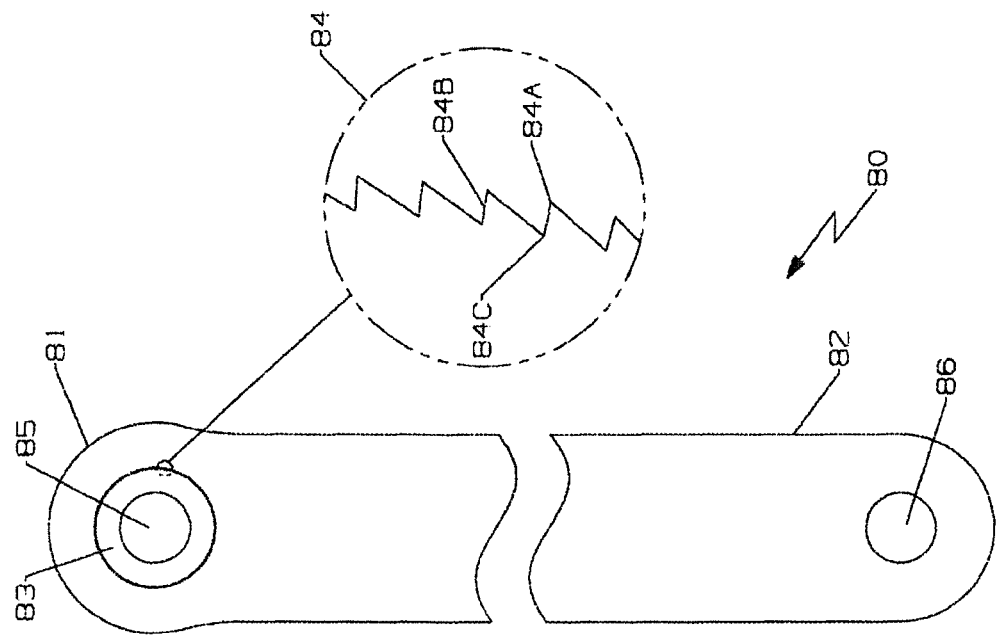
FIG. 12B shows an exemplary ratchet hub link according to the present invention.
Figure 12A:
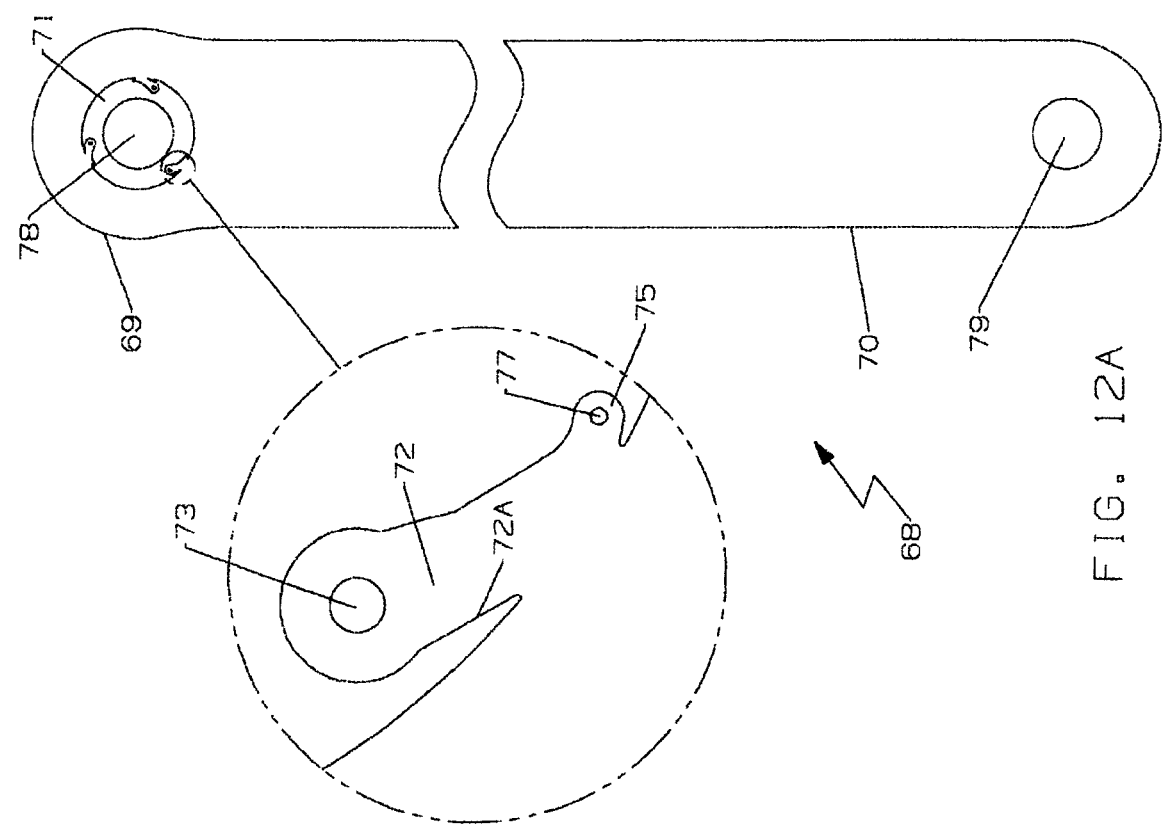
FIG. 12A shows an exemplary pawl link according to the present invention.
Figure 13A:
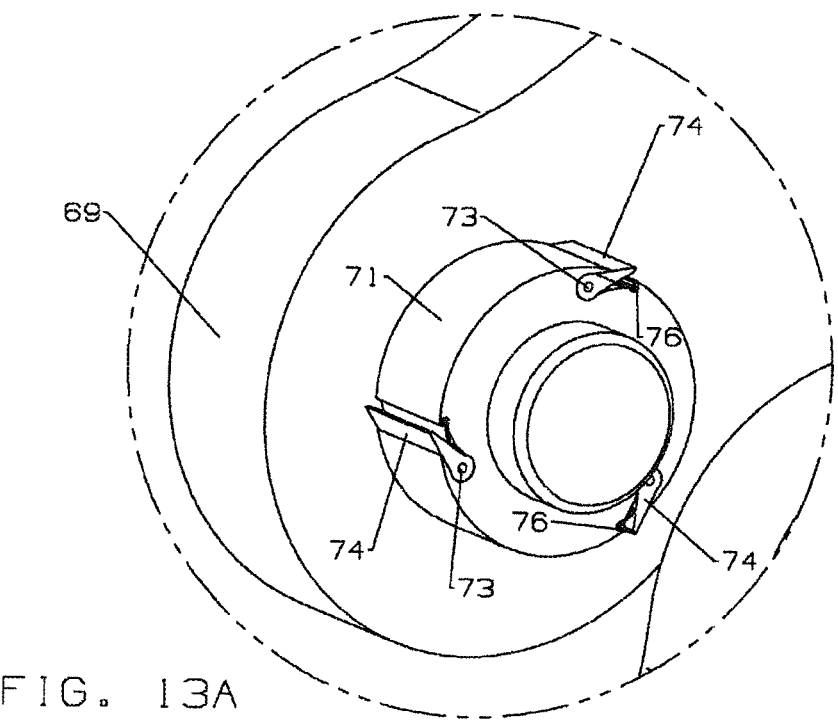
FIG. 13A shows an exemplary pawl link head according to the present invention.
Figure 13B:
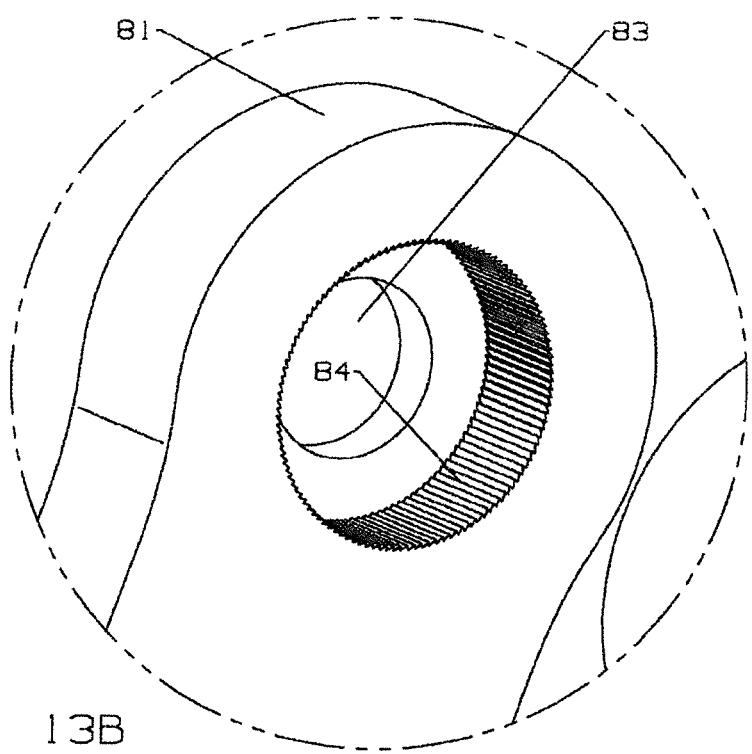
FIG. 13B shows an exemplary ratchet hub link head according to the present invention.
Figure 14A:
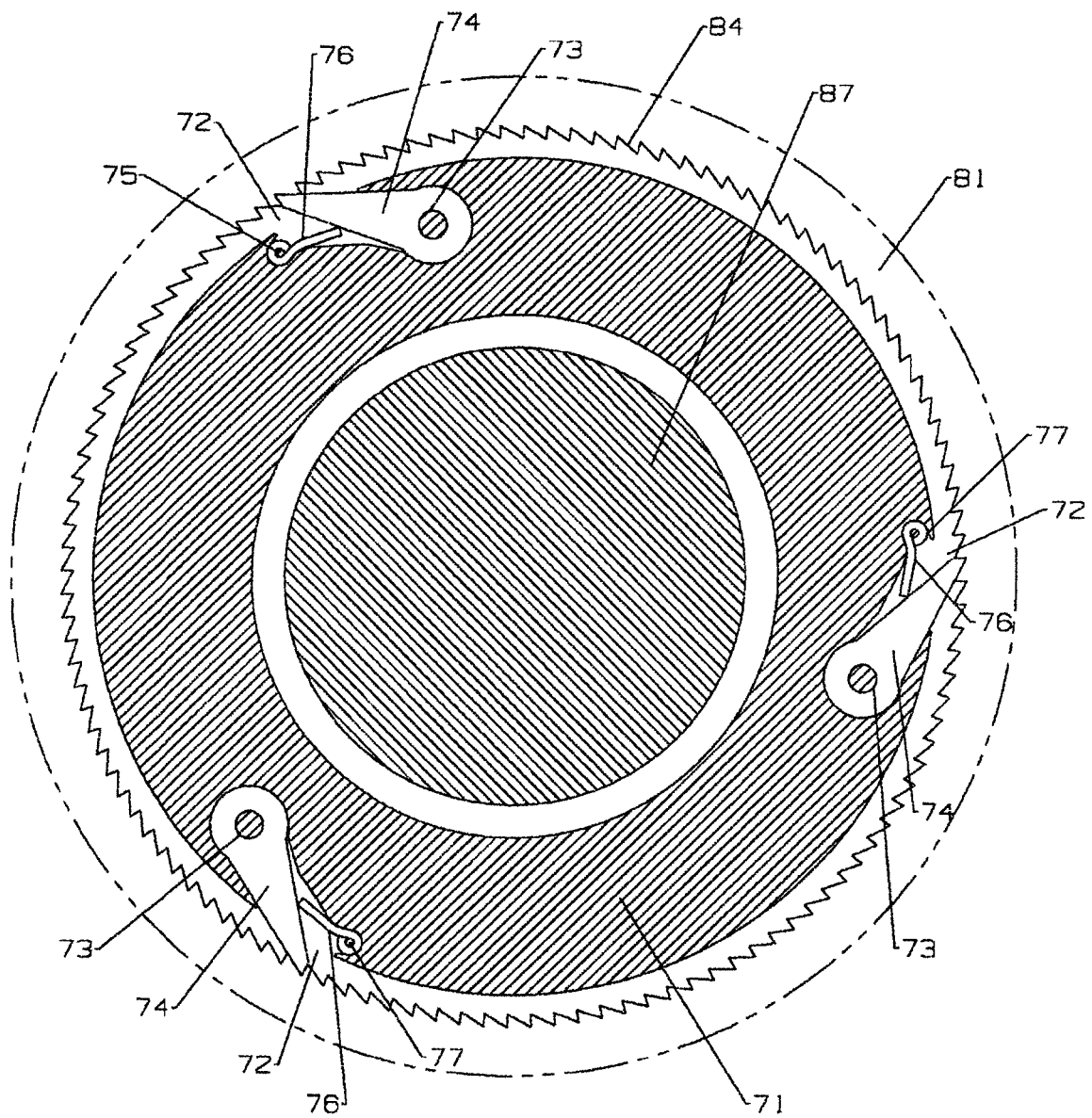
FIG. 14A shows an exemplary interactive pawls-ratchet pair relationship between the pawls, ratchet and pawl spring according to the present invention.

As shown in FIG. 12B, ratchet hub link 80 may comprise ratchet head 81 integrally formed with bar 82. Ratchet head 81 comprises ratchet cavity 83 which comprises an inner circumferential surface defined by ratchet teeth 84 integrally formed with said inner circumferential surface. Ratchet teeth 84 engage pawls 74. Ratchet tooth 84 comprises convex top 84A, side 84B and concave root 84C. Convex top 84A, side 84B and concave root 84C smoothly transition into each other. In another embodiment, ratchet head 81 and bar 82 are separate parts or components which are connected together. In the exemplary embodiment of FIG. 13B, ratchet cavity 83 comprises 120 ratchet teeth arranged in three (3) degree increments around its inner circumferential surface. This allows upper housing 5 to be tilted or angularly oriented and locked into place in 3 degree increments in a counterclockwise direction relative to lower housing 6. In action, and at any time, pawls 74 simultaneously engage with a set of ratchet teeth 84 as shown in FIG. 14A. In another embodiment, ratchet teeth 84 may have any number of teeth that allows upper housing 5 to be angularly oriented in one (1) degree increments relative to lower housing 6.

With continued reference to FIGS. 11-13, a pawl-ratchet link pair joint 86A is formed at joint M of the pawl-ratchet link pair 86 between pawl head 69 of pawl link 68 and ratchet head 81 of ratchet hub link 80. Pawl-ratchet hub link joint 86A comprises a pawl-ratchet joint 86B formed by engagement of locking pawl 74 and ratchet tooth 84 such that in operation locking pawl 74 slides over or snaps against ratchet tooth 84. Optionally, pawl-ratchet joint 86B may be configured to produce an audible signal to indicate three (3) degrees of movement when locking pawl 74 slides over or snaps against ratchet tooth 84. Self-locking is activated when locking pawl 74 engages abutment surface 72A of pawl pocket 72 preventing reverse movement of locking pawl 74 causing locking pawl 74 to engage ratchet tooth root 86C and thus prevent the reverse movement of ratchet tooth 86C. Consequently, self-locking at pawl-ratchet joint 86B is achieved by the wedging of locking pawl 74 into ratchet tooth root 84C.

Figure 14B:
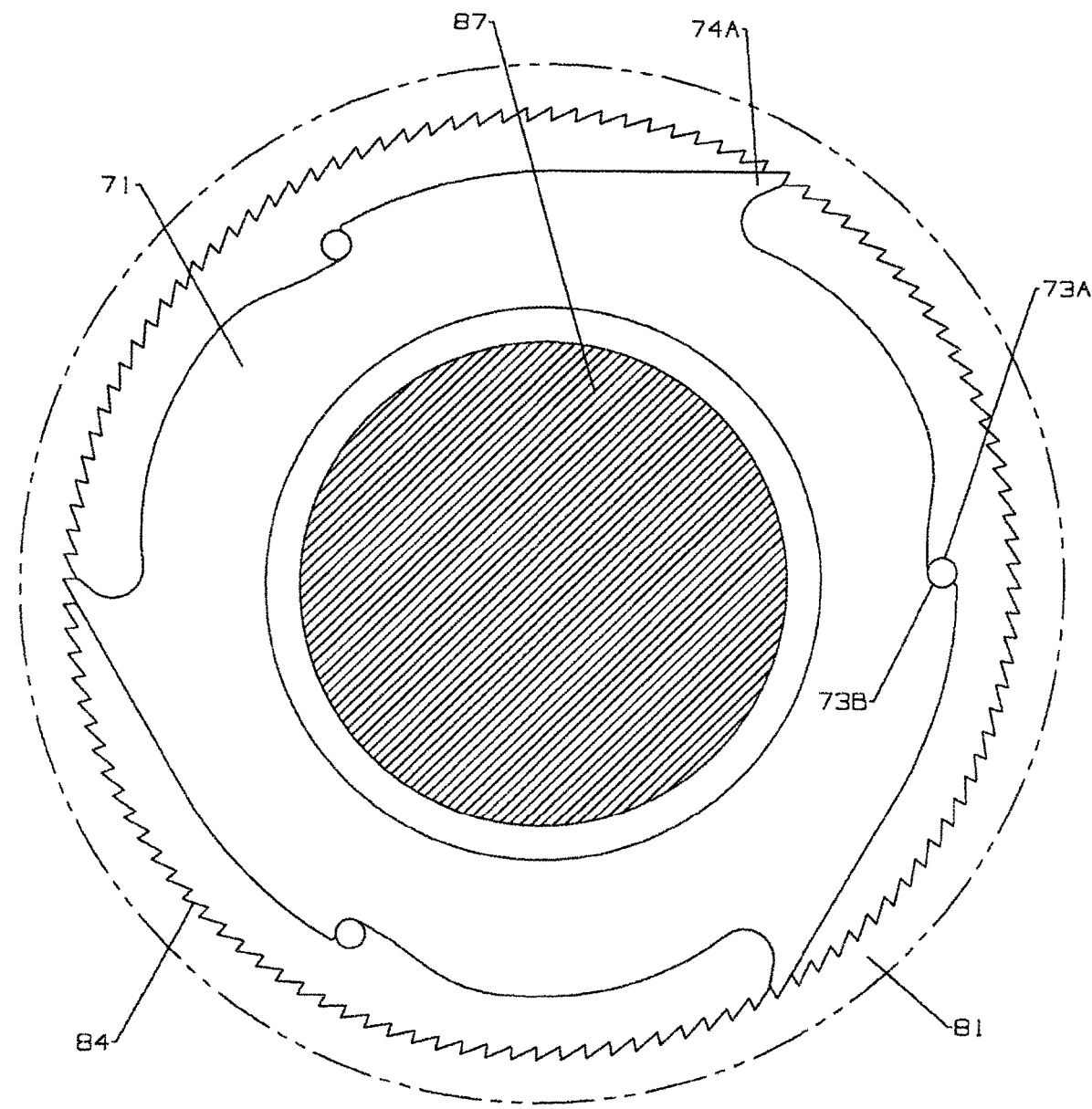
FIG. 14B shows an exemplary self-locking pawl-ratchet pair mechanism of FIG. 14A.
Figure 14C:
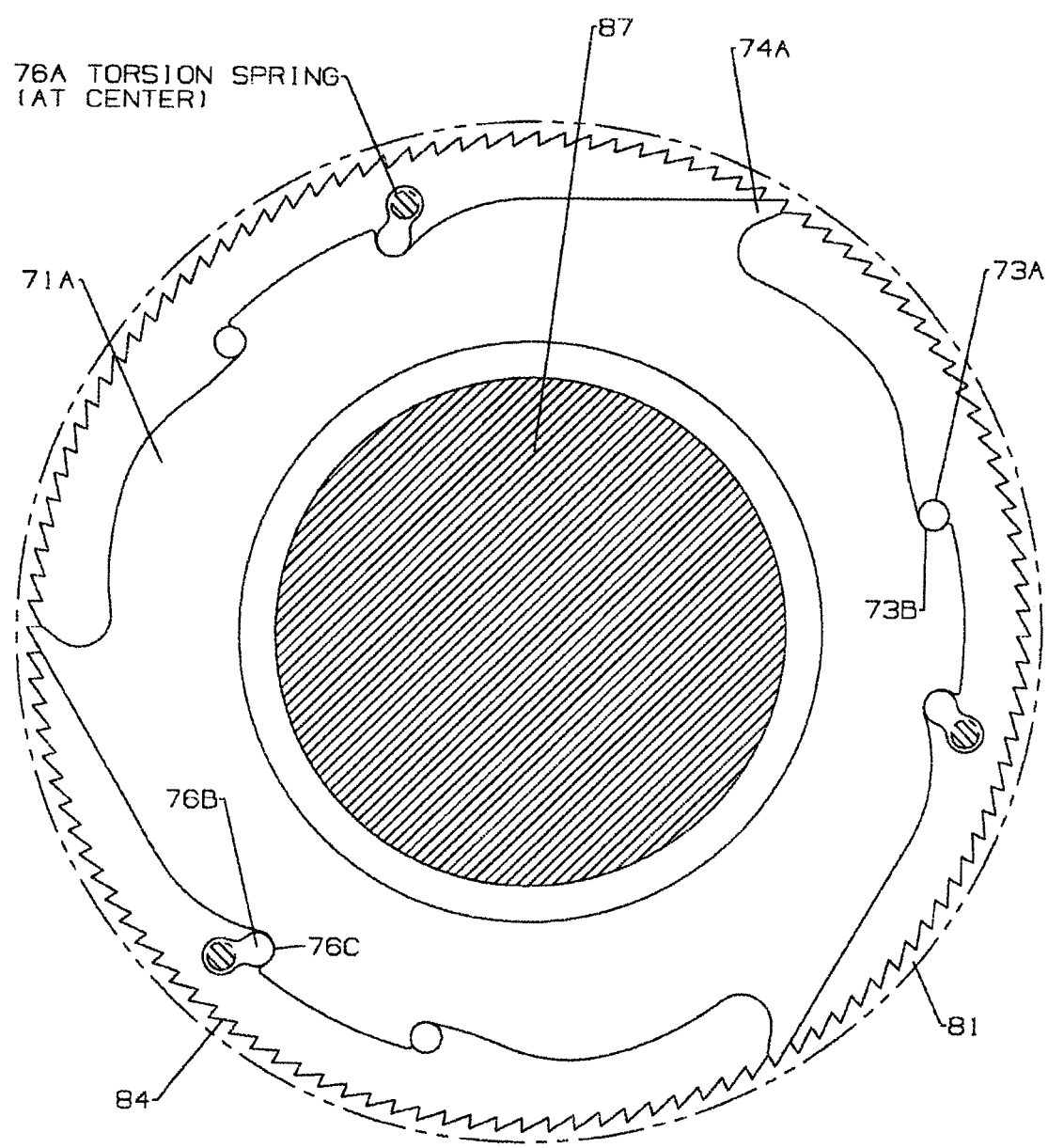
FIG. 14C shows another alternate self-locking pawl-ratchet pair mechanism of FIG. 14A.
Figure 15:
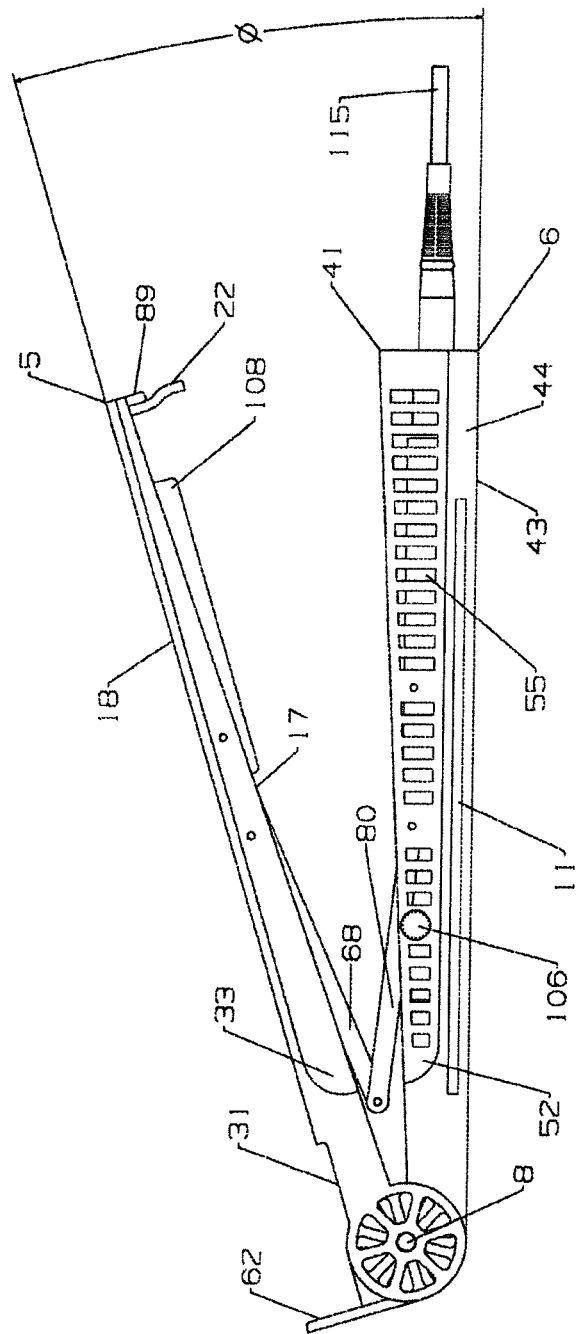
FIG. 15 shows an alternate four-bar self-locking tilt mechanism of the support unit according to the present invention.

In another embodiment as shown in FIG. 14B, pawl head 69 may comprise locking pawl ring 71A, torsion spring 76A, at least one return stop 73A. Locking pawl ring 71A comprises at least one pawl 74A and at least one return stop seat 73B integrally formed on the outer periphery of locking pawl ring 71A. Return stop 73A is configured to engage return stop seat 73B to prevent movement of locking pawl ring 71A in one direction while permitting movement in the opposite direction. Torsion spring 76A is configured to urge locking pawl ring 71A to cause return stop seat 73B to engage return stop 73A. Locking pawl ring 71A is pivotally mounted on pawl head 69 and is configured to move between a locked position such that return stop seat 73B is against return stop 73A and a disengaged position such that return stop seat 73B is away from return stop 73A. In yet another embodiment as shown in FIG. 14C, pawl head 69 may comprise locking pawl ring 71B, at least one return stop 73C, and at least one pawl return element 76B. Locking pawl ring 71B comprises at least one pawl 74B, at least one pawl return element seat 76C, and at least one return stop seat 73D integrally formed on its outer periphery. Return stop 73C is configured to engage return stop seat 73D to prevent movement of locking pawl ring 71B in one direction while permitting movement in the opposite direction. Pawl return element 76B is configured to engage and exert a biasing force on pawl return element seat 76C urging locking pawl ring 71B to cause return stop seat 73D to engage return stop 73C. Locking pawl ring 71B is pivotally mounted on pawl head 69 and configured to move between a locked position such that return stop seat 73D is against return stop 73C and a disengaged position such that return stop seat 73D is away from return stop 73C. In both embodiments of FIGS. 14B-14C, when locking pawl rings 71A and 71B are used, self-locking is activated when return seats 73B and 73D respectively engage return stops 73A and 73C preventing reverse movement of locking pawl rings 71A and 71B causing respectively pawls 74A and 74B of locking pawl rings 71A and 71B to respectively engage ratchet tooth root 86C and thus prevent reverse movement of ratchet tooth 86C. Similarly, when locking pawl rings 71A and 71B are used, self-locking comprises similar wedging action between a locking pawl ring and ratchet tooth root.

With continued reference to FIG. 11, actuator 85 comprises a hand (not shown) comprising a few fingers that can be inserted into grip 29. Press-to-release mechanism 88 comprises press button 89 and at least one release cable 90 (not shown). Release cable 90 is generally connected to locking pawl 74 or locking pawl ring 71A or locking pawl ring 71B in such a way that when press button 89 is pressed, the actuating push force is converted into a pull force on release cable 90 such that locking pawl 74 or locking pawl ring 71A or locking pawl ring 71B disengages from ratchet teeth 84 to permit reverse movement of ratchet teeth 84. In the exemplary embodiment of self-locking tilt mechanism 9 shown in FIG. 11, press-to-release mechanism 88 is operable upon inserting a few fingers of actuator 85 into grip 29, slightly pulling upper housing 5 upward in a counterclockwise direction and depressing press button 89. Press button 89 links release cable 90 and pawls 74 such that pawls 74 can be selectively disengaged from ratchet teeth 84. Further, rotational power is transmitted to upper housing 5 by putting a few fingers in grip 29 of upper housing 5 and pulling upward in a counterclockwise direction away from lower housing 6 to angularly deploy upper housing 5 or pushing upper housing 5 downward in a clockwise direction towards lower housing 6 to collapse upper housing 5. The pawl-ratchet joint 86B of pawl-ratchet hub link joint 86A provides a quick-acting self-locking mechanism that allows upper housing 5 to be adjusted to any desired inclination by merely gripping grip 29 and angularly orienting upper housing 5 to the desired angle, which when released automatically locks upper housing 5 in the instant adjusted position. Self-locking tilt mechanism 9 allows a user to selectively and angularly deploy upper housing 5 for comfortable viewing and working in a counterclockwise direction or collapse upper housing 5 in a clockwise direction so as to store support unit 2. In the exemplary embodiment of self-locking tilt mechanism 9 shown in FIG. 11, the minimum and maximum angular orientation of the upper housing 5 relative to the lower housing 6 between collapsed and deployed positions is respectively 0 (zero) and 75 degrees. Further, self-locking tilt mechanism 9 does not prevent the surface 18 of upper housing 5 from being substantially parallel to bottom surface 43 of lower housing 6 when upper housing 5 is in a collapsed state.

In the deployed position, the weight of upper housing 5 or the combined weight of an electronic system or reading material and upper housing 5 produces a downward force that tends to rotate ratchet hub and pawl links 80 and 68 respectively in a clockwise and counterclockwise directions. This causes a reaction force in opposition, but equal, to the downward force on pawls 74, and consequently prevents the rotation of links 80 and 68. Holding grip 29 and slightly pulling upper housing 5 upward in a counterclockwise direction temporarily removes the downward reaction force so that press button 89 may be actuated by being depressed. The actuating force on press button 89 is converted into a pull force on release cable 90. This pull force in turn is converted into a clockwise rotating force on locking pawls 74 to disengage locking pawls 74 simultaneously from ratchet teeth 84. In the released position, locking pawl 74 and ratchet teeth 84 are not engaged with each other and upper housing 5 is free to move in a clockwise direction about pivot O to orient upper housing 5 toward a collapsed position. Press-to-release mechanism 88 is configured such that its accidental depression cannot cause disengagement of pawls 74 from ratchet teeth 84 while the pawls-ratchet pair is in a locked position.

Figure 16A:
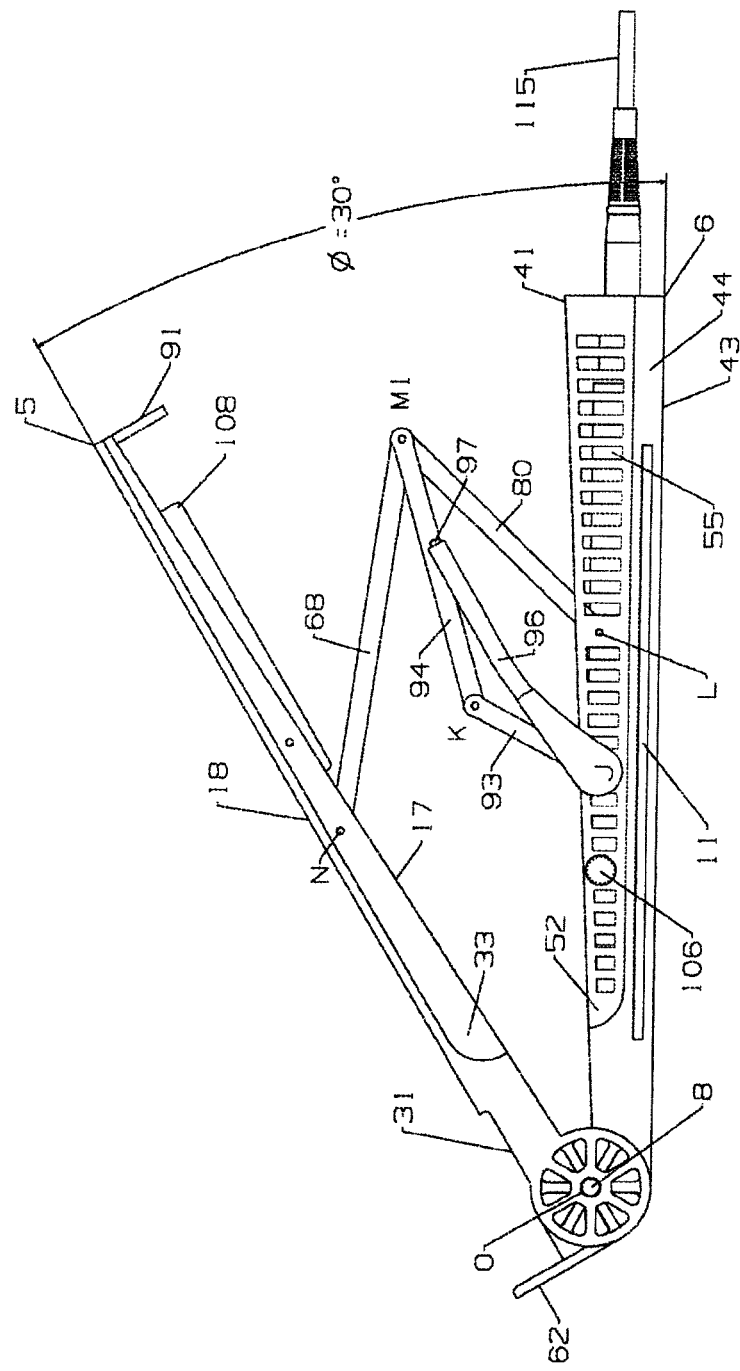
FIG. 16A shows an exemplary six-bar linkage self-locking tilt mechanism showing the upper housing having a planar end flange according to the present invention.

With reference to FIG. 16A, tilt mechanism 78A may optionally comprise a six-bar linkage and a hand fever actuator mechanism. The six-bar linkage herein referred to is a locked chain linkage with six links, each link being binary and pivotally connected to one another in a selected manner to have a predetermined degree of freedom with a total of six links and seven joints. The six-bar chain linkage is formed by taking upper and lower housings 5 and 6 as links, and combining them with four binary links comprising pawl link 68, ratchet hub link 80, link 93 and link 94. Link 93 is the drive link and has one end pivotally connected to lower housing 6 at pivot J via crank pin 95 (not shown). The free end of link 93 is pivotally connected to link 94 at pivot K. The free end of link 93 is pivotally connected to links 68 and 81 at shared pivot $M_1$. Pivot $M_1$ is considered to be a special case of two joints that are located in the same place. Bar 82 of ratchet hub link 69 connects to lower housing 6 at pivot L, ratchet head 81 of ratchet hub link 80 connects to pawl head 69 of pawl link 68 at pivot M, bar 70 of pawl link 68 connects to upper housing 5 at pivot N and upper housing 5 pivotally connects to lower housing 6 at pivot O. Lever actuator mechanism 91 provides driving power to link 93 to activate a rotation to drive the six-bar linkage mechanism to tilt upper housing 5. Alternatively, the self-locking tilt mechanism of FIG. 16A may be thought of as a combination of two four-bar linkages, with lower housing 6, ratchet hub link pair 80, joint J, joint M and joint L shared.

With continued reference FIG. 16A, hand lever actuator mechanism 92 comprises hand lever 96 having free and fixed ends, press button 97 located at the free end of hand lever 96, hand grip 98 (not shown) at the free end of the hand lever 96, a release cable 99 (not shown), a push-to-release rod 100 (not shown) disposed between release cable 99 and press button 97, and return spring 101 (not shown) disposed inside hand grip 98. Hand lever 96 is pivotally connected to drive link 93 via crank pin 95 such that hand lever 96 may oscillate with respect to lower housing 6. Push-to-release rod 100 converts the actuating force of press button 97 into a pull force on release cable 99 such that pawls 74 may selectively be disengaged from ratchet teeth 84. Cooperation between ratchet teeth 84 and pawls 74 of pawl and ratchet hub links 68 and 80 is such that hand lever 96 can only move in a counterclockwise direction to angularly orient upper housing 5 to a deployed position from a collapsed position or in a clockwise direction to a collapsed position from a deployed position. Drive link 93 is driven by the actuation of hand lever mechanism 92. The six-bar linkage self-locking tilt mechanism 9 of FIG. 16A essentially functions similarly as the four-bar linkage self-locking tilt mechanism 9 of FIG. 11. While self-locking tilt mechanism 9 of FIG. 11 is operable by holding and pulling grip 29 of upper housing 5 upward in a counterclockwise direction, self-locking tilt mechanism 9 of FIG. 16A is operable by holding and pulling hand lever actuator mechanism 92 upward in a counterclockwise direction. It should be understood that the pawl-ratchet joint of the pawl-ratchet hub link joint of the four-bar of the six-bar linkage of the self-locking tilt mechanism 9 of FIG. 16A is similar in configuration and function as the pawl-ratchet joint of the pawl-ratchet hub fink joint of the four bar linkage of self-locking tilt mechanism 9 of FIG. 11, both providing a quick-acting self-locking mechanism that allows upper housing 5 to be adjusted to any desired inclination or position, which when released automatically locks upper housing 5 in the instant adjusted inclination or position.

In operation, a reaction force equal to the downward force at the teeth of pawls 74 of the self-locking tilt mechanism of FIG. 16A in opposition to the downward force caused by the weight of upper housing 5 or the combined weight of an electronic system or reading material and upper housing 5 prevents hand lever 96 from rotating clockwise. Thus, hand lever 96 is held in position by the reaction force and is configured such that it is prevented from being accidentally released from the locked position by the accidental depression of press button 97. By slightly pulling hand lever 96 upward in a counterclockwise direction, the reaction force is temporarily removed and press button 97 can be depressed to transmit a clockwise rotating force to pawls 74, through push-to-release rod 100, to disengage them from ratchet teeth 84 and bring hand lever 96 into a released position.

Thus, hand lever 96 is free to move in a clockwise direction about pivot J to orient upper housing 5 toward a collapsed position.

Figure 17:
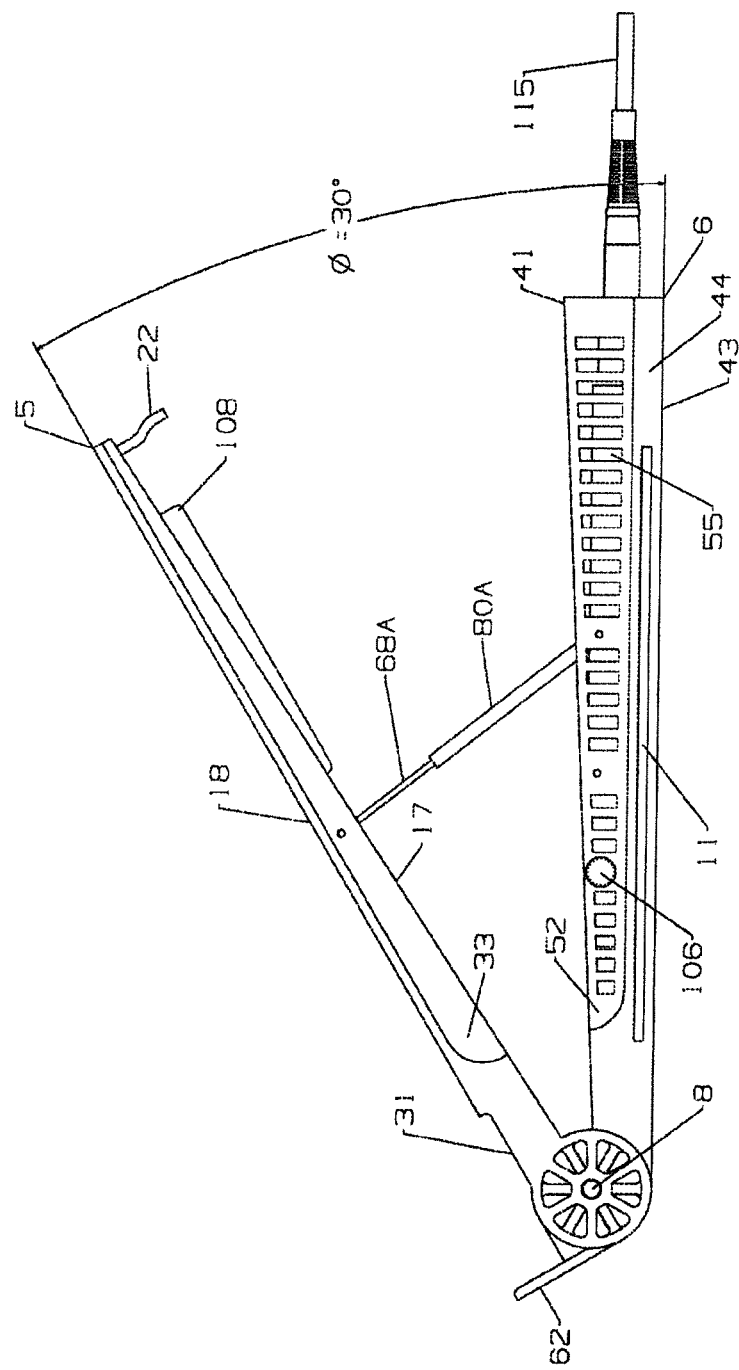
FIG. 17 shows an exemplary gas spring self-locking tilt mechanism.

As shown in FIG. 17, self-locking tilt mechanism 9 may optionally comprise a pair of hand or reversible motor actuated gas spring assisted system 91 ("gas spring 91") for angularly orienting upper housing 5 relative to lower housing 6. Gas spring 91 comprises cylinder 80A, piston 68A, a device 91A (not shown) to hold piston 68A in its extended position when upper housing 5 is angularly oriented, and/or a reversible motor (not shown) for actuating gas spring 91. The system is arranged so that gas spring 91 reaches its fully retracted position when upper housing 5 is horizontal. Gas spring 91 is pivotally operably connected to upper and lower housings 5 and 6 such that upper housing 5 can be moved between deployed and collapsed positions. As used herein, the term gas spring can refer to a conventional gas spring system, hydraulic gas cylinder system, lift support system, gas cylinder system, or damper system. Alternative self-locking tilt mechanism arrangements may be a motorized mechanism, an adjustable reciprocating mechanism, user adjustable tilt adjustment apparatus having a number of discrete positions, an activation device in operative communication with upper housing 5, or other rotational, tilting or lifting devices that permit upper housing 5 to be angularly oriented to the desired angular orientation. In any event, various tilting arrangements and support configurations may be used depending on desired characteristics.

Heat dissipating features such as cooling and ventilation system 10 of support unit 2 are configured to reduce heat transfer from an electronic system that rests on upper surface 18 of upper housing 5. Cooling and ventilation system 10 may include active 102 and/or passive 103 cooling mechanisms. The embodiment of cooling and ventilation system 10 may comprise user controlled cooling fans 104, cooling holes 20 and 21 in upper housing 5 as shown in FIGS. 5 to 6B, vents/slots 55 on opposite side walls 40 and 41 of lower housing 6, on/off user actuated switch 105 and fan speed control device 106.

In the illustrated embodiment of support unit 2, active cooling mechanism 102 may comprise cooling fans 104 which are powered by a hardwired USB cable 107 (not shown) connected to an electronic system or by power block 110 or an external power apparatus pluggable to the mains (AC). Cooling fans 104 are biased in grated fan cover 108 to protect a user and limit foreign objects contacting the rotating fan vanes. Grated fan cover 108 biased within cavity 23 of upper housing 5 is secured to bottom surface 19 by screws 109 such that cooling fans 104 are able to suck or draw hot air entering through cooling holes 21 into cavity 23 and expel the air through the grating of grated fan cover 108 directly into the atmosphere. Thus, direct cooling by active cooling mechanism 102 is achieved this way. Active cooling mechanism 102 may also be coupled with cooling holes 20 and vents/slots 55 on opposite side walls 40 and 41 of lower housing 6 to enhance airflow through support unit 2. Alternatively, any number of cooling fans or a variety of suitable devices such as air flow turbines may be utilized depending on user cooling needs. In the embodiment of the present invention, on/off user actuated switch 105 also serves as fans speed control device 106. Though fan speed control device 106 is biased on right side wall 41 of lower housing 6 in the illustrated embodiment of support unit 2, it could well be biased on left side wall 40 of lower housing 6 or any of opposite side walls 16 and 17 of upper housing 5. The passive cooling mechanism 103 may comprise first group ventilation cooling holes 20 and vents/slots 55 on opposite side walls 40 and 41 of lower housing 6. In another embodiment, passive cooling mechanism 103 may comprise holes 20 and 21 in upper housing 5, vents/slots 55 on opposite side walls 40 and 41 of lower housing 6.

Each cooling hole 21 in the second group is preferably perpendicularly orientated relative to its neighbor in the horizontal plane as shown in FIG. 6B. In one embodiment, these cooling holes 21 are generally of the same configuration and size and are arranged in a spacing the size of the major diameter of one elliptical cooling hole, FIG. 6B. Such arrangement promotes improved cooling airflow and increases the effectiveness of the cooling air flow to eliminate the uneven temperature distributions or undesirable temperature levels. In some embodiments, cooling holes 21 may be of varying sizes with the holes being spaced apart according to varying, but uniform, geometric patterns and densities to achieve the desired cooling effect.

The large number of cooling holes 20 surrounding cooling holes 21 increase the airflow preferentially around cooling holes 21 and are somewhat effective in maintaining the desired cooling airflow. When upper housing 5 is angularly oriented, the ejected hot air sucked from the base of an electronic system by cooling fans 104 expelled through the grating of grated fan cover 108 is expelled directly into the atmosphere. When upper housing 5 is in a collapsed position and is in fluid communication with lower housing 6, the sucked ejected hot air from the base of the electronic system expelled by the cooling fans 104 through the grating of the grated fan cover 108 and trapped between cavity 23 of upper housing 5 and cavity 45 of lower housing 6 is simultaneously expelled into the atmosphere through cooling holes 20 in upper housing 5 and vents/slots 5 on opposite side walls 40 and 41 of lower housing 6. The plurality of cooling holes provide extra ventilation for cooling and dissipating the heat generated by the electronic system in order to keep it from becoming too warm. Further, elliptical cooling holes are superior to cylindrical cooling holes in cooling performance along a flat surface and require fewer holes than cylindrical holes for the same surface area in accomplishing the required cooling performance.

Fans 104, cooling holes 20 and 21 in upper housing 5 and vents/slots 55 on opposite side walls 40 and 41 of lower housing 6 allow greater and optimal airflow for increased heat dissipation and cooling of the heat generated by an electronic system during use. Air flow is further increased when upper housing 5 is angularly orientated. Additionally, other permeable materials may be used on the surface of upper housing 5 of support unit 2 to further increase heat dissipation from the electronic system, Support unit 2 has a variety of power management systems and management states. The power management system 12 and its power management method comprises power block 110 that comprises rechargeable battery 111 (not shown) biased inside power block 110, USB interface mechanism 112 comprises a plurality of USB hubs configured for connecting electronic devices and other peripherals such that USB cable 113 may be connected to draw power, AC power input source 114 into which an external power apparatus 115 could be connected to provide a power source for support unit 2, and a control unit 116 (not shown) and an on/off switch 117 (not shown) disposed conveniently in or around support unit 2 for managing the power sources. Power consumption of support unit 2 is managed in accordance with a plurality of defined active power management states 118. Three possible active power management states 118 for powering support unit 2 are defined: a "normal" state 119 where power is provided to the support unit 2 by the hardwired USB-out connector and pluggable into an electronic system's USB port to draw power, a "battery" state 120 where power is provided to support unit 2 by a rechargeable battery (DC) 111 source inside power block 110, and a "mains" state 121 where power is provided to support unit 2 by the mains (AC) source from external power apparatus 115. The external power apparatus 115 is pluggable to the mains (AC) and supplies current directly to support unit 2 as well as charges rechargeable battery 111 inside power block 110. Active power status 122 (not shown) and battery level indicator 123 (not shown) may also be incorporated into the support unit 2. The active power management state 118 is user selectable. A user can only select one power state to be active at a time since one active power management state precludes other power management states from becoming active. These active power management states 118 are determined by a user context—such as use at the user's office, at home, in a meeting, or during travel. In one embodiment, a set of control buttons that may include power switch 124 (not shown) configured to change a power state (normal state, battery state, or mains state) of the support unit 2 may be provided.

Cable management system 13 may comprise cable-routing guides, straps or clips for neatly organizing the service cables that power the active cooling mechanism 102, the "mains" cable when not in use or other USB cables. Alternately, cable management system 13 may comprise or include a receptacle where power and/or cables for the support unit 2 may be concealed or hidden from view when the support unit 2 is in use. Further, support unit 2 may include a structure that facilitates cable management.

Figure 18:
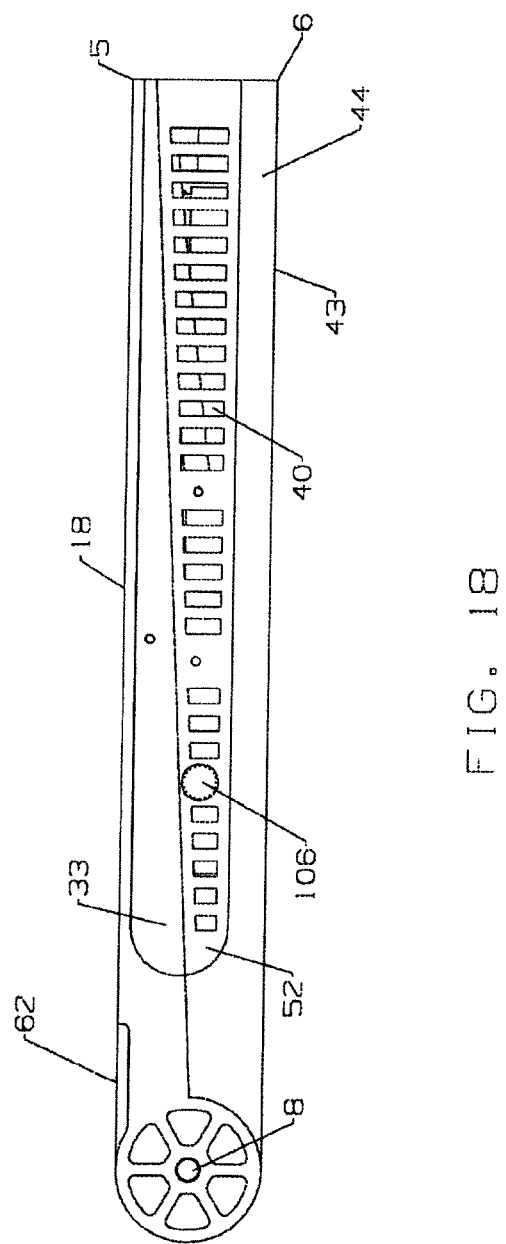
FIG. 18 shows an exemplary support unit with no retractable mouse pad.

As shown in the exemplary embodiments of support unit 2, retractable mouse pad 11 may comprise top and bottom surface 125 and 126 that slides in and out of slot 58 of lower housing 6. A user may use a mouse on top surface 125 or as a writing surface if desired. Bottom surface 126 may comprise shallow slot 127 configured to engage projection 59 inside slot 58 of lower housing 6 and prevents retractable mouse pad 11 from detaching from or falling off support unit 2 when retractable mouse pad 11 slides in and out of slot 58. Retractable mouse pad 11 can readily be extended or pulled out from either side of support unit 2 by a left-handed or right-handed user into an operating position for use with a mouse or to write on. Appropriate locking device is provided for locking retractable mouse pad 11 in place when in use or completely retracted into lower housing 6. In another embodiment, lower housing 6 may be configured to exclude retractable mouse pad 11 as shown in FIG. 18 as not all users may have need or use for a mouse pad. Inner bottom surface 42 of lower housing 6 may be configured to have insulation such that heat emitted from an electronic system on surface 18 of upper housing 5 and expelled through grated fan cover 108 into cavities 23 and 45 is prevented from passing through to retractable mouse pad 11. In some embodiments, lower housing 6 may not have projection 59 and therefore retractable mouse pad 11 will not have shallow slot 127. In this case an appropriate mechanism for guiding and stopping retractable mouse pad 11 from detaching from or falling off support unit 2 when retractable mouse pad 11 slides in and out of slot 58 will be provided.

Support unit 2 may further comprise a carrying handle (not shown) that is partially defined by upper and lower housings 5 and 6 to allow workstation 1 or support unit 2 to be carried with relative ease. Alternatively, the carrying handle may comprise a separate carrying handle that may be attached to the outside of the support unit 2: the back end of support unit 2 for example. Other suitable handle arrangements are also possible. As mentioned above, upper housing 5, lower housing 6 and anti-skid mechanism 7 provide an aesthetic appearance. As such, other alternative configurations of the support unit 2 are also possible. For example, support unit 2 may have a substantially rectangular shaped appearance as shown in FIGS. 33 and 34, with upper and lower housings 5 and 6 being casing halves respectively, each comprising a substantially shallow rectangular pan which is hinged together to one another to allow movement between collapsed and deployed positions.

Figures 19A, 19B:
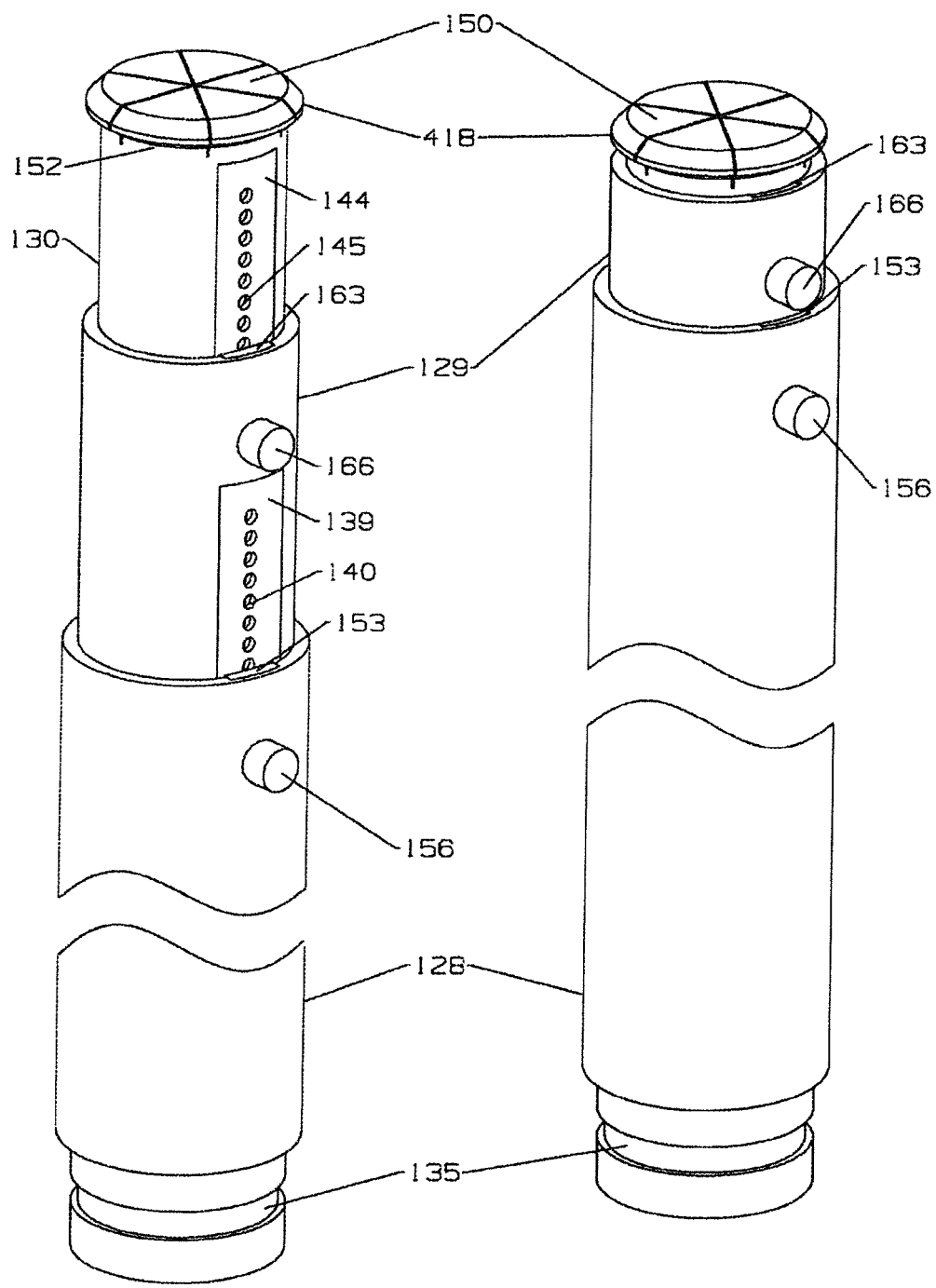
FIG. 19A shows a perspective view of an exemplary embodiment of a partially deployed telescopic rod according to the present invention.
FIG. 19B shows a perspective view of an exemplary embodiment of a collapsed telescopic rod according to the present invention.

Referring to FIGS. 19A and 19B, exemplary perspective views of the embodiments of partially deployed and collapsed telescopic rods 3 are illustrated. Telescopic rod 3 comprises a plurality of tubular telescoping members comprising a top, base, and several intermediate telescoping members of differing diameters such that they can be nested in one another in a telescopically coupled manner and movable longitudinally with respect to one another between extended and retracted positions. Each telescoping member comprises tube walls and longitudinal axis. In the exemplary embodiments shown in FIGS. 19A and 19B, telescopic rod 3 consists of base 128, intermediate 129 and top 130 members, first and second positive locking mechanisms 131 and 132, and first and second springs (not shown) 133 and 134. Springs 133 and 134 are suitably sized and biased between two adjacent telescoping members and configured to assist the extension of an intermediate or top telescoping member to its fullest extended capacity or a user desired length. In the exemplary embodiment of telescopic rod 3, intermediate and top telescoping members 129 and 130 are two adjacent telescoping. Further, springs 133 and 134 are configured to reduce the force needed to extend an intermediate or lop telescoping member. Telescoping members 128, 129 and 130 may be readily extended or adjusted to the required height or encased into one another in a collapsed or retracted position for storage out of the way when not in use. Springs 133 and 134 respectively allow intermediate and top telescoping members 129 and 130 to be automatically drawn out upwards when respective push button actuators 156 and 166 of first and second positive locking mechanism 131 and 132 are depressed. Telescopic rod 3 has a simple, strong, light, durable and efficient construction, rigid in support, and capable of sustaining the adjustment against the combined weight of an electronic system or reading material and support unit 2.

Figure 20:
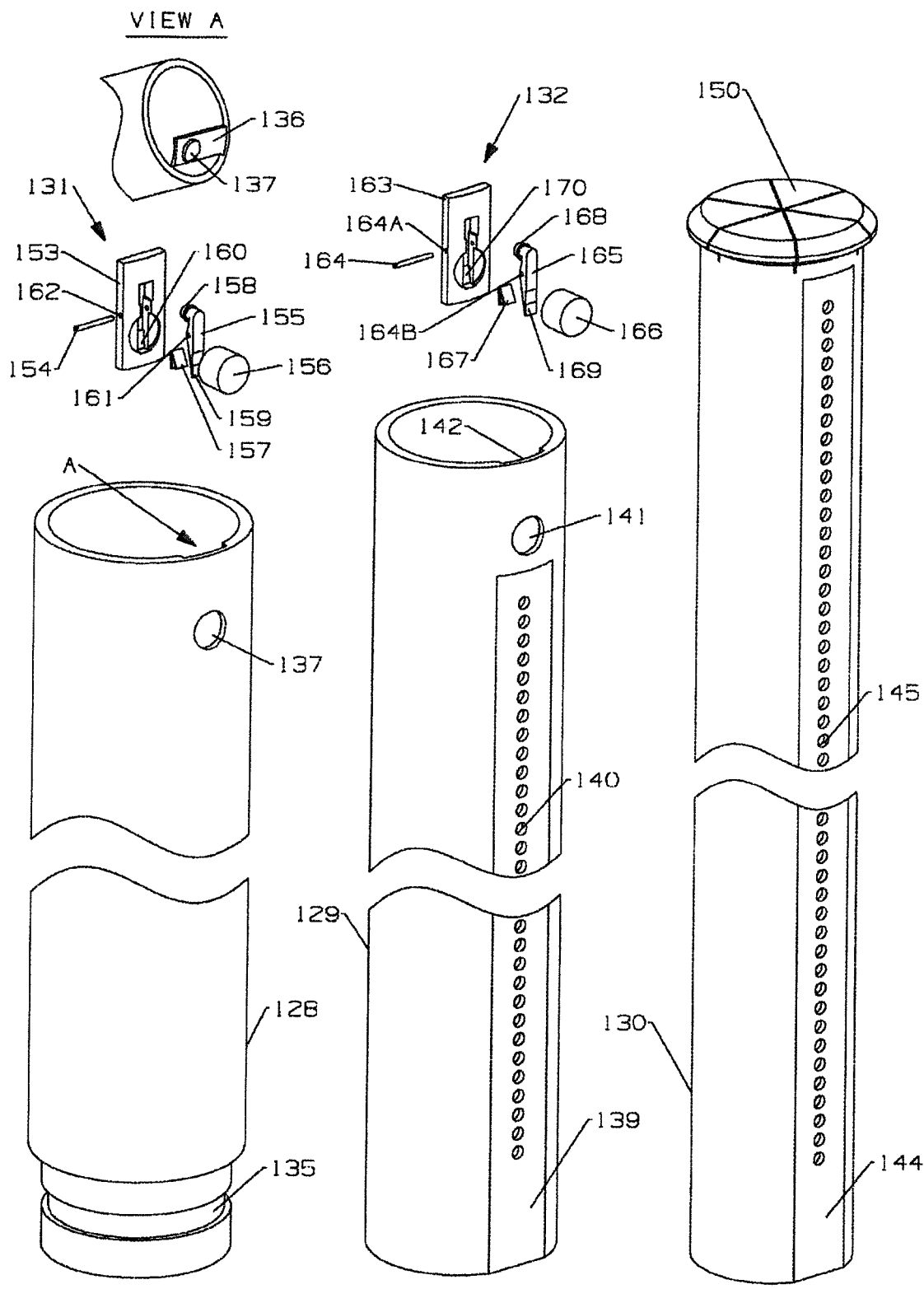
FIG. 20 shows an exploded perspective view of an exemplary embodiment of a telescopic rod revealing the major elements of a positive locking mechanism and a view of the top portion of the base telescoping member recess for receiving a positive locking mechanism as viewed by the reference arrow A according to the present invention.

As illustrated in FIG. 20 of the exploded perspective view of an exemplary embodiment of telescopic rod 3, base and intermediate telescoping members 128 and 129 have top and bottom ends. The lower portion of base telescoping member 128 has a reduced diameter, the reduced diameter having a U-shaped race-like external annular groove 135 ("groove 135") for receiving quick connect-disconnect device 175. The inner surfaces of the top ends of base and intermediate telescoping members 128 and 129 have recesses 136 (view A of FIG. 20) and 142 configured to receive respectively housings 153 and 163 of first and second positive locking mechanisms 131 and 132. Proximate the respective bottom portions of recesses 136 and 142 are through holes 137 and 141 extending from the surfaces of recesses 136 and 142 to the respective outer surfaces of base and intermediate telescoping members 128 and 129 configured to receive push button actuators 156 and 166 of first and second positive locking mechanisms 131 and 132. Proximate the respective top portions of recesses 134 and 142 are through holes 138 and 143 (not shown) extending from the respective surface of recesses 136 and 142 to the respective outer surfaces of base and intermediate telescoping members 128 and 129 configured to receive screws 138 (not shown) for locking respective first and second positive locking mechanism 131 and 132.

As shown in FIG. 20, intermediate and top telescoping members 129 and 130 have flat rotation prevention engagement surfaces 139 and 144 that extend from their bottom ends upward and toward their top ends but not the entire distance for respectively engaging the flat backs of housings 431 and 436 of first and second positive locking mechanisms 131 and 132 and prevent rotation of the intermediate and top telescoping members 129 and 130 respectively relative to base telescoping member 128 and intermediate telescoping member 129. Flat rotation prevention engagement surfaces 139 and 144 each have a plurality of pin locking holes 140 and 145 that engage with the respective fore ends or locking pins 158 and 168 of rocker arms 155 and 165 of first and second positive locking mechanisms 131 and 132 to lock intermediate and top telescoping members 129 and 130 in the desired fully deployed or extended, partially deployed or extended, or retracted positions. It is understood that several intermediate telescoping members may be employed based on user need. Each new intermediate telescoping member added would comprise a rotation prevention engagement surface and a plurality of holes on the rotation prevention engagement surface.

As further illustrated in FIG. 20, top telescoping member 130 has a bottom end. The top end of telescoping member 130 optimally terminates in a discontinuous annular snap-fit connector 146. The top telescoping member 130 is configured to nest inside intermediate telescoping member 129 and movable longitudinally in a telescoping manner between extended or deployed and collapsed or retracted positions. As shown in view B-B along reference line B-B of FIG. 21, snap-fit connector 146 may comprise a discontinuous annular snap-fit joint or an annular snap-fit joint or the like. The snap-fit connector includes at least one snap-fit protrusion 147. Snap-fit protrusion 147 interlocks with snap-fit cavity 60 of lower housing 6 to form a releasable annular snap joint lock 60A as shown in FIG. 22. To connect telescopic rod 3 to support unit 2, snap-fit protrusion 147 is slid through the hollow region of cavity 60 in lower housing 6 to engage snap-fit cavity 60. Snap-fit protrusion 147 contracts while being slid through the hollow region, encounters snap-fit cavity 60 and resiliently expands to form snap joint lock 60A and connector. Snap-fit protrusion 147, snap-fit cavity 60, or both snap-fit protrusion 147 and snap-fit cavity 60 temporarily deform during the assembly process. The dimensions, geometry, and material of snap-fit protrusion 147 are selected to deform without significant strain damage during the assembly process. Once assembled, at least one snap-fit protrusion 147 engages snap-fit cavity 60 in lower housing 6 in a stress-free manner. Alternatively, the top end of top telescoping member 130 may be adapted for fitting an adapter attachment that may comprise a snap-fit connector end or some other appropriate adapter device attachment such that the adapter attachment will establish fluid communication between telescopic rod 3 and support unit 2. Further appropriate locking mechanisms for locking the adapter device attachment onto telescopic rod 3 end and then connecting telescoping rod 3 to support unit 2 are provided. Snap-fit connector 146 or other adapter device attachment serves as a pre-equipped mating connector for telescopic rod assembly 3. Snap joint lock 60A allows telescopic rod 3 to be easily and quickly connected to and disconnected from the base of lower housing 6 of support unit 2 without having to thread and unthread telescopic rod 3 each time telescopic rod 3 is connected to or disconnected from the base of lower housing 6 of support unit 2 and without the aid of tools. Annular snap joint 60A is designed to prevent telescopic rod 3 from separating from the base of lower housing 6 of support unit 2 when deployed in the connected state by a user and allow ready disconnection from the base of lower housing 6 of support unit 2 when desired.

Figure 21:
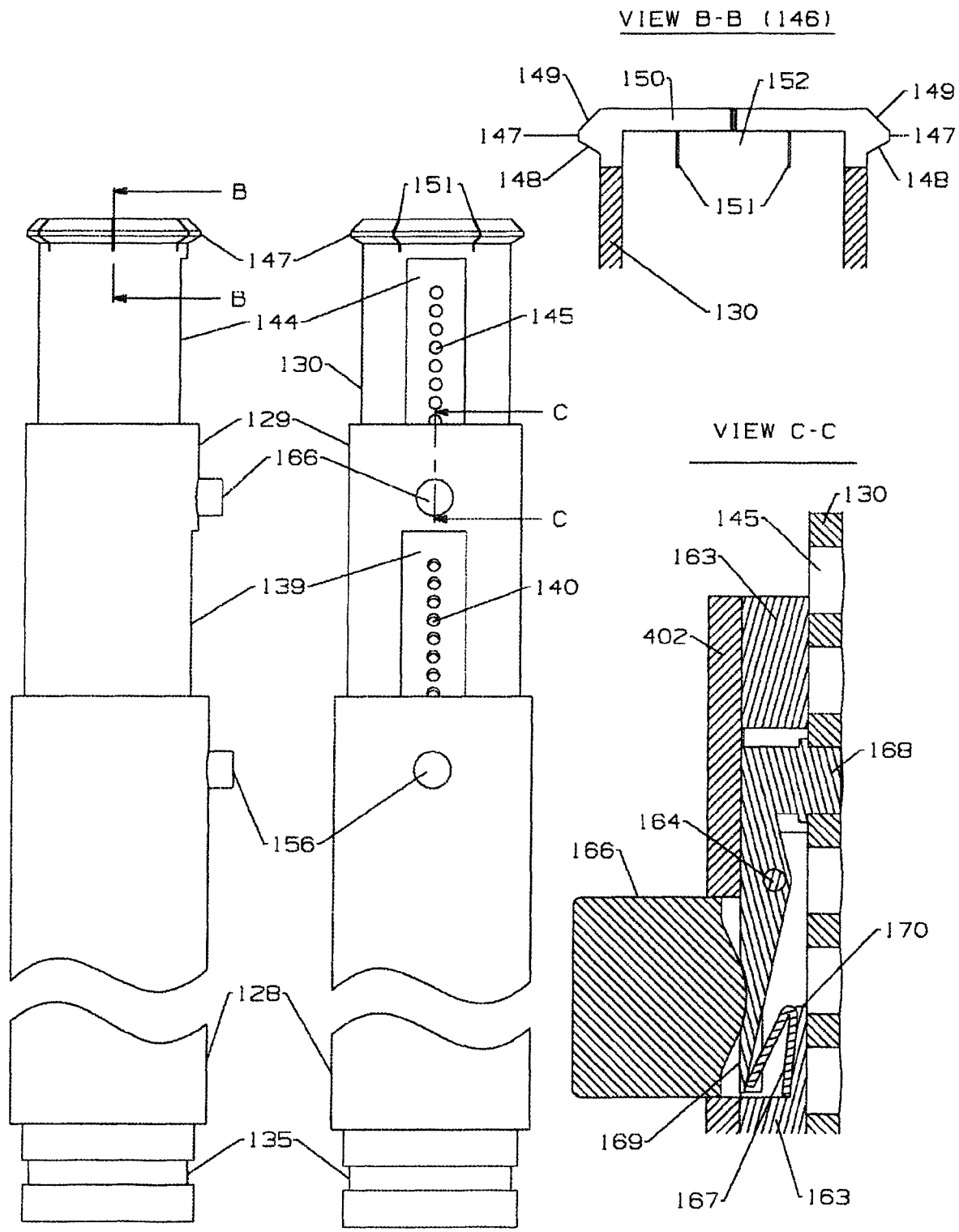
FIG. 21 shows side and front views of an exemplary embodiment of a partially deployed telescopic rod, a cross-sectional view of an exemplary discontinuous annular snap-fit protrusion of the top telescoping member as viewed along reference line B-B and a cross-sectional view of an exemplary positive locking mechanism as viewed along reference line C-C according to the present invention.
Figure 22:
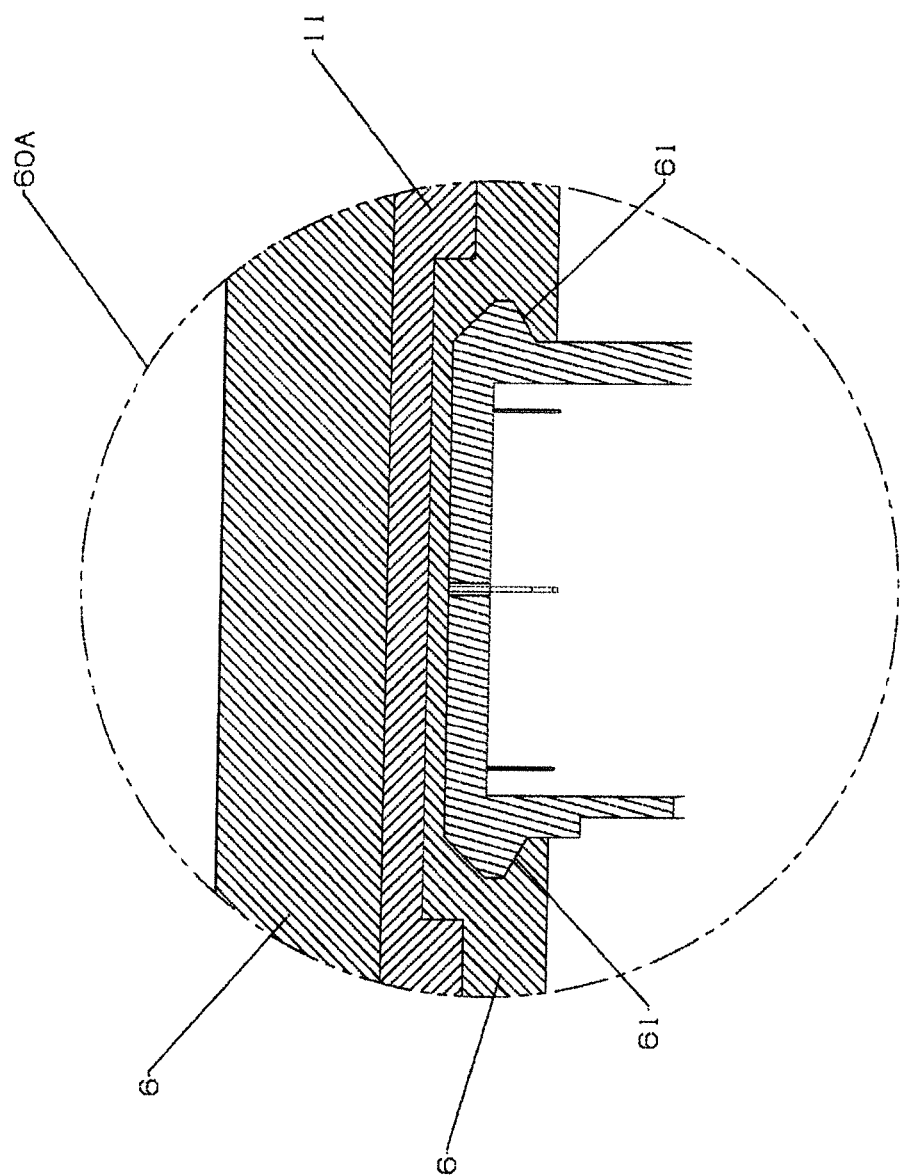
FIG. 22 shows an exemplary embodiment of a cross-sectional view of a releasable annular snap joint lock according to the present invention.

Referring to FIG. 21, snap-fit connector 146 may comprise radial group of snap-fit protrusions 147. Each snap-fit protrusion 147 is an arched or semi-annular ridge that extends radially from the top of top telescoping member 130. As illustrated by view B-B along reference line B-B of FIG. 21, snap-fit connector 146 preferably has tapered edge 148 which rests against or near a snap-fit ledge 61 (FIG. 10D) of snap-fit cavity 60 in lower housing 6 when assembled. Tapered edge 148 permits snap-fit protrusion 147 to be disengaged and removed from snap-fit cavity 60 when desired. Snap-fit protrusion 147 optimally has a triangular-shaped head 150 and a beveled exterior 149. The triangular head is designed to allow enough radial movement yet prevent radial flexing of at least one snap-fit protrusion 147 to prevent disassembly of telescopic rod 3 from the base of lower housing 6 of support unit 2 in the connected state while deployed in use. The beveled exterior 149 is sloped to allow the top portion of top telescopic member 130 to be easily inserted into the snap-fit cavity 60. Alternatively, a locking means (not shown) may be provided to prevent radial flexing of at least one snap-fit protrusion 147 of telescopic rod 3 and thus prevents disassembly of the telescopic rod 3 from the base of lower housing 3 of support unit 2 in the connected state while deployed in use. As illustrated in view B-B along reference line B-B of FIG. 21, the top portion of top telescopic member 130 has axial slots 151 that divide the top portion of top telescopic member 130 into a series of semi-annular arms 152 with arched cross-sections. Semi-annular arms 152 have top and bottom ends, the top end biased near or coextensive with snap-fit protrusion 147 and the bottom end biased near the lowest point of the axial slot 152. Snap-fit connector 146 has a locking means (not shown) for locking snap-fit connector 146 in a connected state, the locking means being part of, or distinct from top telescoping member 130. When in a locked connected state, snap-fit protrusion 147 engages and interlocks with snap-fit cavity 60 and the locking means substantially restricts radial movement of snap-fit protrusion 147 within the snap-fit cavity 60.

Referring to FIG. 20, first and second positive locking mechanisms 131 and 132 may comprise major elements first and second housings 153 and 163, first and second pivot pins 154 and 164, first and second rigid rocker arms 155 and 165, first and second push button actuators 156 and 166, and first and second energized cantilever springs 157 and 164 (or finger springs). Preferably, the major elements of first and second positive locking mechanisms 131 and 132 have similar configurations and dimensions. Whether fully extended, partially extended or collapsed, telescoping members 128, 129 and 130 need to stay affixed in some manner to the adjoining members so telescopic rod 3 will remain in place once positioned to a desired length. First and second positive locking mechanisms 131 and 132 respectively located at the top ends of base and intermediate telescoping members 128 and 129 are used to achieve this when activated and respectively lock intermediate and top telescoping members 129 and 130 in a continuum of positions along their respective lengths to effectively and securely engage it to intermediate and top telescoping members 129 and 130 in a partially extended, fully extended or collapsed positions. This provides a solid predictable load bearing lock mechanism that locks and interconnects the base and intermediate telescoping members 128 and 129 or the intermediate and top telescoping members 129 and 130 between extended and retracted positions and makes it possible to maintain the telescoping members in any desired longitudinal relationships relative to each other. When fully retracted and collapsed, telescopic rod 3 is in a compact form and is stored in form-fitted storage cavity 56 in lower housing 6 of support unit 2.

Referring to view C-C along reference line C-C of FIG. 21, first and second rocker arms 155 and 165 are pivotally mounted intermediate between their fore and aft ends to provide a rocking movement. The fore ends of first and second rocker arms 131 and 132 respectively terminate in first and second locking pins 158 and 168. First and second energized cantilever springs 157 and 167 are respectively biased inside first and second housings 153 and 163 such that one end of each spring is in engagement respectively with first and second abutments 160 and 170, the other ends being in engagement respectively with first and second aft ends 159 and 169 of first and second rocker arms 155 and 165 to energize and urge first and second aft ends 159 and 169 by applying respective forces directly against first and second aft ends 159 and 169 of first and second rocker arms 155 and 165, in respective directions outwardly of intermediate and top telescoping members 128 and 129 to force respective first and second locking pins 158 and 168 of first and second rocker arms 155 and 165 inwardly respectively of intermediate and top telescoping members 128 and 129 into locking engagement respectively with any of the plurality of pin locking holes 140 and 145 on intermediate and top telescoping members 129 and 130. Thus, telescoping members 129 and 130 are locked in the desired extended longitudinal configuration when first and second locking pins 158 and 168 of first and second rocker arms 155 and 165 respectively engage any of the respective plurality of pin locking holes 140 and 145 respectively on respective rotation prevention engagement surfaces 139 and 144. First and second positive locking mechanisms 131 and 132 are designed to prevent unintended unlocking caused by accidental depression of first and second push buttons 156 and 166.

The desired longitudinal relationship between the telescoping members 128, 129 and 130 can be changed by depressing either of first or second push button 156 or 166. Depression of either first or second push button 156 or 166 pushes first and second aft ends 159 and 169 of first and second rocker arms 155 and 165 respectively inwardly of base and intermediate telescoping members 128 and 129, rotates respectively first and second rocker arms 155 and 165 about pivot pins 154 and 164 and compresses respectively first and second cantilever springs 157 and 167 inwardly of base and intermediate telescoping members 128 and 129 forcing locking pins 158 and 168 respectively outwardly of intermediate and top telescoping members 129 and 130 to force disengagement of locking pins 158 and 168 from respective pin locking holes 140 and 145 of the intermediate and top telescoping members 129 and 130, thus unlocking the intermediate and top telescoping members 129 and 130. Whilst either of first or second push button 156 and 166 is in a depressed state, intermediate and top telescoping members 129 and 130 can be extended or collapsed by moving them telescopically against each other. When either of first or second push button 156 or 166 is released, the respective locking pins 158 and 168 of first and second rocker arms 155 and 165 engage any of the respective plurality of pin locking holes 140 and 145 on intermediate and top telescoping members 129 and 130 to lock and keep telescopic rod 3 in the new desired longitudinal relationship.

Further, the reactionary force caused by the combined weight of an electronic system or reading material and support unit 2 from the locking pins 158 and 168 during prolonged usage may deform or enlarge pin locking holes 140 and 145 which are in direct engagement with the locking pins 158 and 168. This may cause instability in the telescopic rod 3 and may render it inoperable. This can be prevented and telescoping rod 3 made to withstand these forces and survive prolonged use before failing by doing any of the following: using similar materials for both locking pins 158 and 168 and intermediate and top telescoping members 129 and 130, inserting a stronger reinforcing material than that of the locking pins 158 and 168 into pin locking holes 140 and 145, or hardening intermediate and top telescoping members 129 and 130 sufficiently to resist deformation from the forces of respective locking pins 158 and 168.

Figure 23:
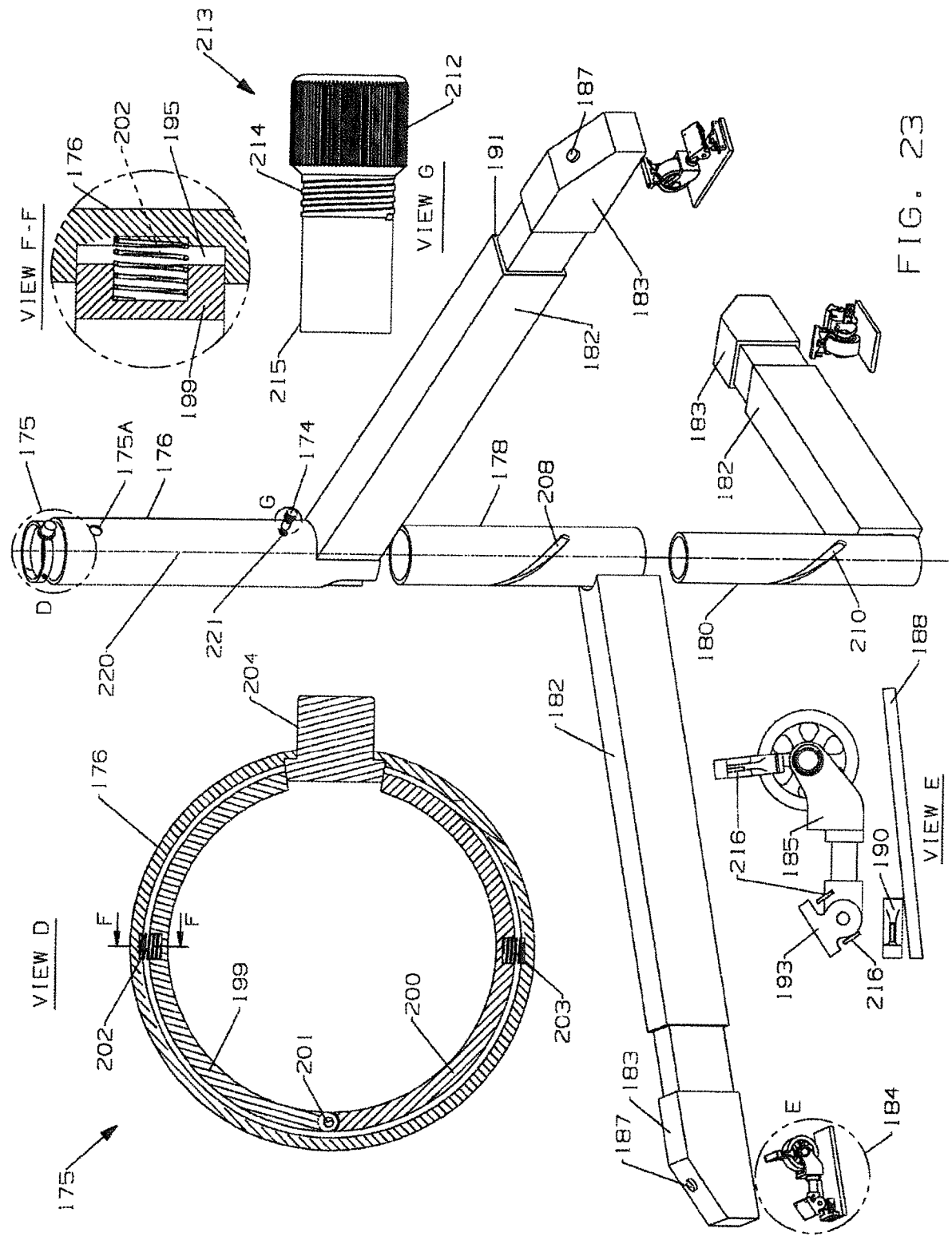
FIG. 23 shows an exploded perspective view of an exemplary embodiment of a tripod according to the present invention.

Referring to FIGS. 23-27, tripod 4 may comprise stationary leg assembly 171 ("leg 171"), first moveable leg 172 ("leg 172") and second moveable leg 173 ("leg 173"), guide pin 174, and quick connect-disconnect device 175. Leg 171 may comprise circular tubular housing 176 ("tubular housing 176") and telescopic leg assembly 177. Leg 172 may comprise first tubular barrel cam 178 ("barrel cam 178"), first circular tubular connector 179 ("connector 179") and telescopic leg assembly 177. Leg 173 may comprise second tubular barrel cam 180 ("barrel cam 180"), second circular tubular connector 181 ("connector 181") and telescopic leg assembly 177. Telescopic leg assembly 177 is the same for and used with legs 171, 172 and 173. As shown in FIG. 23, telescopic leg assembly 177 may comprise leg elements 182 and 183, locking device 184 (not shown) which serve to releasably lock leg elements 182 and 183 together, retractable non-marking stem swivel caster wheel 185 ("caster wheel 185"), press button actuator 187, wheel well door 188 ("wheel door 188"), storage clip holder 189 and snap-in holder 190.

With continued reference to FIGS. 23-27, leg element 183 is configured to nest in leg element 182. Leg element 183 is a stepped tube that is constructed from two rectangular tubes, the first having a cross-sectional dimension slightly smaller than the cross-sectional dimension of the second. The first and second rectangular tubes have free and fixed ends. The fixed ends of the first and second rectangular tubes are rigidly attached together so that the joint between them creates an abutment 191 (or stop). Thus, a stepped tube, which is leg element 183, is created. Leg element 183 has two free ends, one end having a slightly smaller dimension than the other. The free end of the first rectangular tube of leg element 183 nests into leg element 182, and the free end of the second rectangular tube of leg element 183 has a beveled exterior. Leg element 182 has fixed and free ends. The free end of leg element 182 is configured to receive the smaller free end of leg element 183. Together, they form a telescopic leg assembly 177. To increase the stability of tripod 4, press button 187 is depressed and locking device 184 unlocks and releases leg element 183 for it to be telescopically extended.

Figure 24:
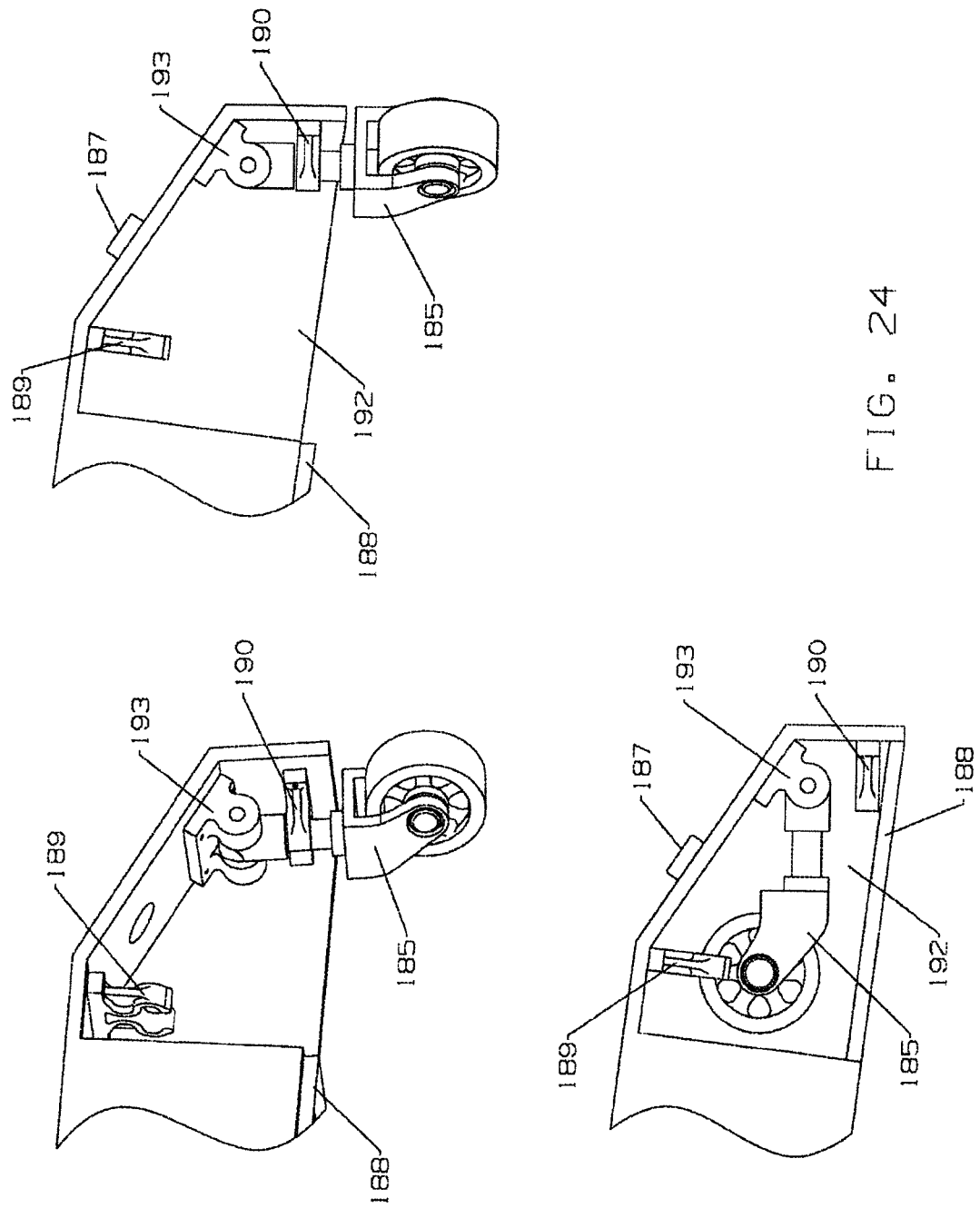
FIG. 24 shows a cut-away perspective and side views of embodiments of the free end of leg element 183 exposing an exemplary swivel caster wheel assembly in deployed and collapsed positions according to the present invention.

As shown in FIG. 24 and view E of FIG. 23, the free end of leg element 183 may comprise wheel well 192 that houses caster wheel 185 that is movable between deployed and retracted positions, socket hinge 193, storage clip holder 189 for holding caster wheel 185 in a collapsed or stowed position and snap-in holder 190 for locking caster wheel 185 when said caster wheel 185 is in a deployed position. Wheel well 192 is provided wheel door 188 that is adapted to slide open and close between collapsed and deployed positions of caster wheel 185. Appropriate locking mechanism 194 (not shown) to hold wheel door 188 in position when open or closed is provided. Further, leg element 183 is configured to have a skid-proof sole to keep tripod 4 from sliding on smooth surfaces when caster wheel 185 is retracted or stowed away.

As illustrated in FIG. 23, tubular housing 176 of leg 171 has top and bottom ends. Disposed coaxially inside, to a proximal end of top end of tubular housing 175 of leg 171, is a U-shaped race-like internal annular channel 195 ("U channel 195") circumscribing the inner diameter of tubular housing 175 for receiving quick connect-disconnect device 196 as shown in view F-F of FIG. 23. Quick connect-disconnect device 196, operably positioned inside U channel 195 locks and coaxially couples telescopic rod 3 to tripod 4 such that telescopic rod 3 is placed in fluid communication with tripod 4. Quick connect-disconnect device 196 permits the easy and quick connection and disconnection of telescopic rod 3 to or from tubular housing 176 of tripod 4. As used herein, "quick connect-disconnect device" 196 is defined as a device that permits the easy and quick connection and disconnection of telescopic rod 3 to and from tripod 4 without having to thread or unthread telescopic rod 3 to or from tripod 4 each time telescopic rod 3 is connected to or disconnected from tripod 4 without the aid of tools. Quick connect-disconnect device 196 may alternatively comprise conventional quick connect-disconnect device as known to one of ordinary skill in the art.

As shown in FIG. 29A, first and second inverted U-shaped notches 197 and 198 ("notch 197" and "notch 198") which are similar in configuration and size are located at the bottom end of tubular housing 176. The axis of notch 197 is oriented 120 degrees clockwise from the axis of leg element 182 of leg 171. The axis of notch 198 is oriented 120 degrees clockwise from the axis of notch 197 and 120 degrees counterclockwise from the axis of leg element 182 of leg 171. As shown in FIGS. 29B-29C, notches 197 and 198 respectively engage connectors 179 and 181 of legs 172 and 173. As shown in FIG. 29A, the fixed end of leg element 182 of leg 171 is rigidly attached to the bottom end of tubular housing 176. Further, telescopic leg assembly 177 is angularly oriented to the vertical axis of tubular housing 176 of leg 171 at angle $\varnothing_1$.

As illustrated in VIEW D of FIG. 23, quick connect-disconnect device 175 may comprise first and second semi-circular cam locking devices 199 ("cam lock 199") and 200 ("cam lock 200"), pivot pin 201, first and second springs 202 and 203, and actuator 204. Cam locks 199 and 200 each have a free end and inner end, the inner end having a pivot hole through which a pivot pin can be passed. The inner ends of cam locks 199 and 200 are pivotally connected to each other by pivot pin 201 such that cam locks 199 and 200 are oppositely disposed to each other, and the free ends of cam locks 199 and 200 are in contact with actuator 204. Cam locks 199 and 200 are positioned in U channel 195 of tubular housing 176 such that the cam surface of cam lock 199 is adjacent to the cam surface of cam lock 200 as shown in view F-F of FIG. 23. In operation, first and second springs 202 and 203 respectively press against and force cam locks 199 and 200 inwardly into a lock position 205 within groove 135 such that cam locks 199 and 200 completely circumscribe the inner surface of groove 135 and thus lock telescopic rod 3 in tripod 4. In the locking position 205, as shown in VIEW F-F of FIG. 23, cam locks 199 and 200 partially protrude into channel 195 of tubular hosing 176 of leg 171. Quick connect-disconnect device 175 serves as a pre-equipped mating connector for tripod 4.

Actuator 204 having axis perpendicular to the axis of tubular housing 176 may be positioned between the free ends of cam locks 199 and 200. When a user pushes inwardly on actuator 204 in operation, actuator 204 engages and moves the free ends of cam locks 199 and 200 outwardly about the pivot into an unlock position 206 within U channel 195 of tubular housing 176. In the unlock position 206, cam locks 199 and 200 are disposed such that they do not protrude into groove 135 of tubular housing 176, thus permitting bottom end of telescopic rod 3 to be inserted into tubular housing 176 of tripod 4. As the end of telescopic rod 3 is inserted further into tubular housing 176 of tripod 4, cam locks 199 and 200 move adjacent to groove 135 in a circumscribing manner at the bottom end of telescopic rod 3. When the user releases the inward force applied to actuator 204, cam locks 199 and 200 are forced inwardly respectively by first and second springs 202 and 203 into contact with the inner surface of groove 135 at the bottom end of telescopic rod 3. As such, telescopic rod 3 is locked, connected, and/or mounted onto tripod 4.

As illustrated in FIG. 23, barrel cam 178 of leg 172 has top and bottom ends. The diameter of barrel cam 178 of leg 172 is adapted to nest inside tubular housing 176 of leg 171. One end of connector 179 is rigidly attached to the fixed end of leg element 182 of telescopic leg assembly 177. The other end of connector 179 is rigidly connected to the lower end of barrel cam 178 of leg 172. Telescopic leg assembly 177 of leg 172 is angularly oriented to the vertical axis of the barrel cam 178 of leg 172 at angle $\varnothing_1$. As shown in FIG. 29B, third inverted U-shaped notch 207 ("notch 207"), preferably having similar configuration and size as that of notches 197 and 198 of tubular housing 176 of leg 171, is located at the bottom end of barrel cam 178 of leg 172. The axis of notch 207 is oriented 120 degrees clockwise from the axis of leg element 182 of telescopic leg assembly 177 of leg 172 and 240 degrees counterclockwise from the axis of leg element 182 of telescopic leg assembly 177 of leg 172. When tripod 4 is deployed in operation, notches 198 and 207 are aligned and simultaneously engage connector 181 of leg 173. Rotational power is transmitted to barrel cam 178 through rotation of telescopic leg assembly 177 of leg 172. Leg 172 is collapsible from a deployed position or deployable from a collapsed position by rotation in the same plane about common axis 220 relative to leg 171. In the collapsed position, leg 172 lies horizontally and parallel to, but beneath, leg element 182 of telescopic leg assembly 177 of leg 171 in the same plane, FIG. 28. In the deployed position, leg 172 is displaced 120 degrees clockwise from its collapsed position and engages notch 197 of tubular housing 176 of leg 171. Appropriate locking mechanisms are provided for locking leg 172 in either the deployed or collapsed position.

As illustrated in FIG. 23, barrel cam 180 of leg 173 has top and bottom ends. The diameter of barrel cam 180 of leg 173 is adapted to nest inside barrel cam 178 of leg 172. As shown in FIG. 29C, one end of connector 181 is rigidly attached to the fixed end of leg element 182 of telescopic leg assembly 177. The other end of connector 181 is rigidly connected to the lower end of barrel cam 180 of leg 173. Telescopic leg assembly 177 of leg 173 is angularly oriented to the vertical axis of barrel cam 181 of leg 173 at angle $\varnothing_1$. Rotational power is transmitted to barrel cam 180 through rotation of the telescopic leg assembly 177 of leg 173. Leg 173 is collapsible from a deployed position or deployable from a collapsed position by rotation in the same plane about common axis 220, relative to legs 171 and 172. In the collapsed position, leg 173 lies horizontally and parallel to, but beneath, leg element 182 of telescopic leg assembly 177 of leg 172 in the same plane, FIG. 28.

As shown in exploded view of FIG. 23, the nesting of barrel cam 180 in barrel cam 178 and barrel cam 178 in tubular housing 176 is such that they rotate about common axis 220. Further, as shown in FIGS. 23 and 29B, barrel cam 178 of leg 172 has a first cam track 208 and a first particular cam profile 209. First cam profile 209 is made so that its law of motion is a function of the angle of rotation of barrel cam 178. First cam profile 209 is continuous up to a 120 degree angle of rotation of barrel cam 178. When leg 172 rotates to a deployed or collapsed position, barrel cam 178 also rotates about common axis 220. When barrel cam 178 rotates, first cam track 208 interacts with guide pin 174, follows first cam profile 209 and simultaneously moves in a vertical direction, upward or downward, along common axis 220. Also, as shown in FIGS. 23 and 29C, barrel cam 180 of leg 173 has a second cam track 210 and a second particular cam profile 211. The second cam profile 211 is made so that its law of motion is a function of the angle of rotation of barrel cam 180. The second cam profile 211 is continuous up to a 240 degree angle of rotation of barrel cam 180. When leg 173 rotates to a deployed or collapsed position, barrel cam 180 also rotates about common axis 220. When barrel cam 180 rotates, the second cam track 210 interacts with guide pin 174, follows the second cam profile 211 and simultaneously moves in a vertical direction, upward or downward, along common axis 220.

As illustrated in view G of FIG. 23, guide pin 174 may comprise knurled head 212 rigidly attached to shank 213. Knurled head 212 has diameter substantially larger than the diameter of shank 213. Knurled head 212 facilitates the manual turning of the guide pin 174. Shank 213 begins with threaded portion 214 below knurled head 212 and terminates in pin end 215. Threaded portion 214 threads into threaded hole 221 ("hole 221") on tubular housing 176 of leg 171. Pin end 215 projects through, fits in, and engages cam tracks 208 and 210 respectively of barrel cams 178 and 180 of legs 172 and 173. By so placing guide pin 174, rotation of legs 172 and 173 causes respective barrel cams 178 and 180 of legs 172 and 173 about common axis 220 to move either vertically upward while being rotatably deployed or move vertically downward while being rotatably collapsed. In another alternative embodiment, guide pin 174 may be a press-in pin or other appropriate pin that guides barrel cam 178 and 180.

Figure 25:
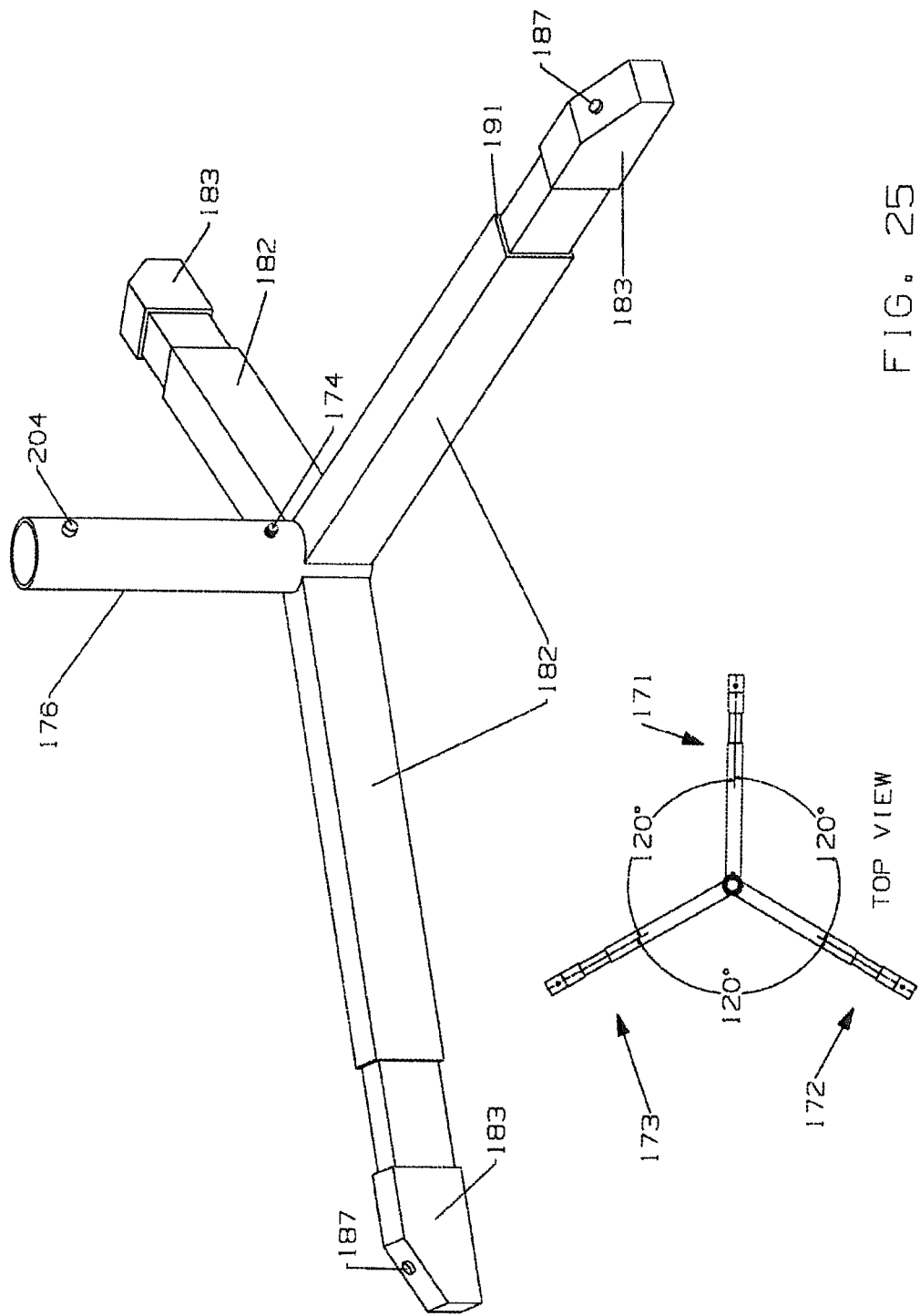
FIG. 25 shows a perspective view of an exemplary embodiment of a deployed tripod showing an extended leg element 183 of telescopic leg assembly 177 with non-deployed swivel wheel according to the present invention.
Figure 30:
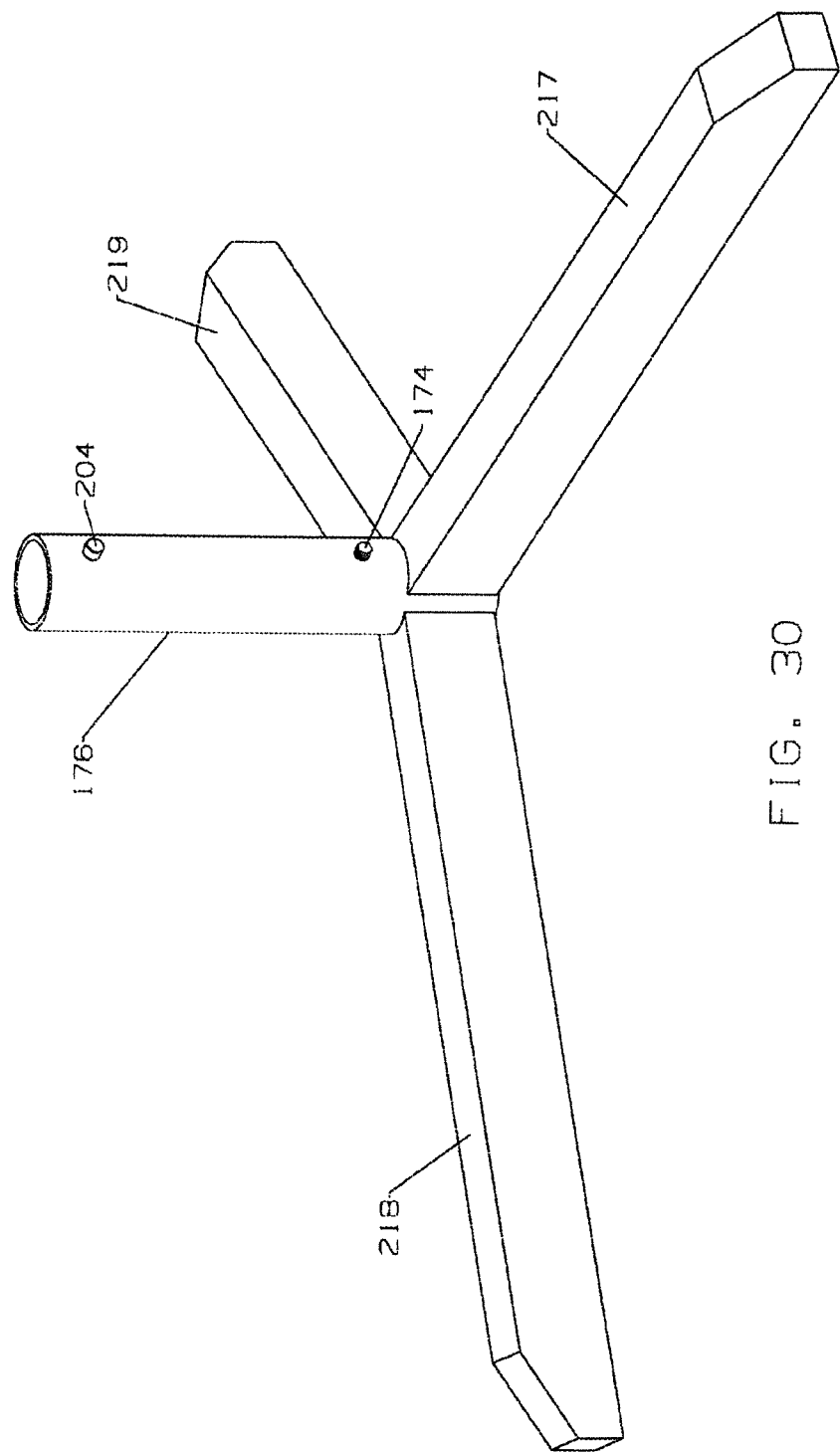
FIG. 30 shows an alternate perspective view of an exemplary embodiment of a deployed tripod with non-deployed swivel wheel according to the present invention.
Figure 31:
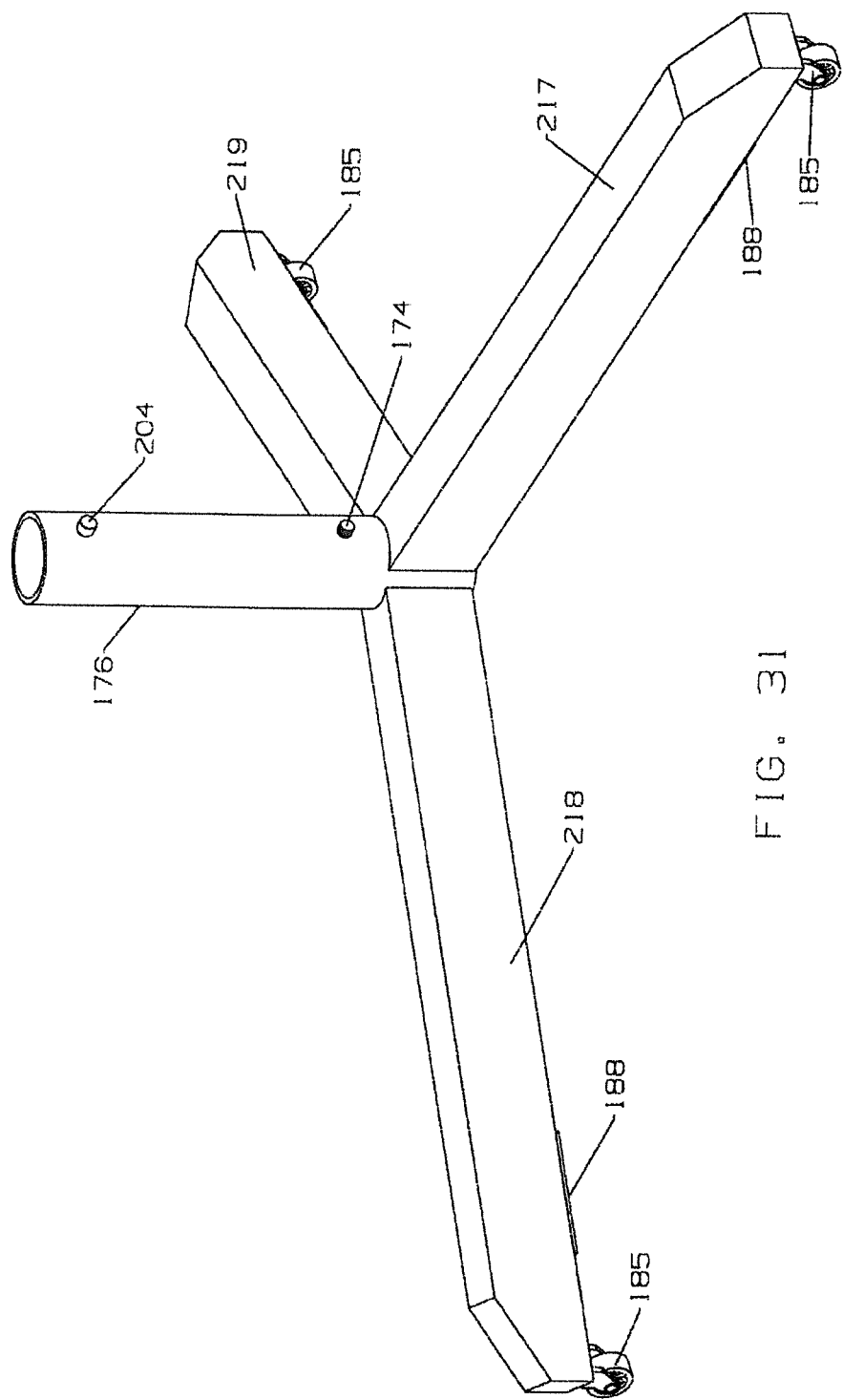
FIG. 31 shows the tripod of FIG. 30 with deployed swivel wheel according to the present invention.
Figure 32:
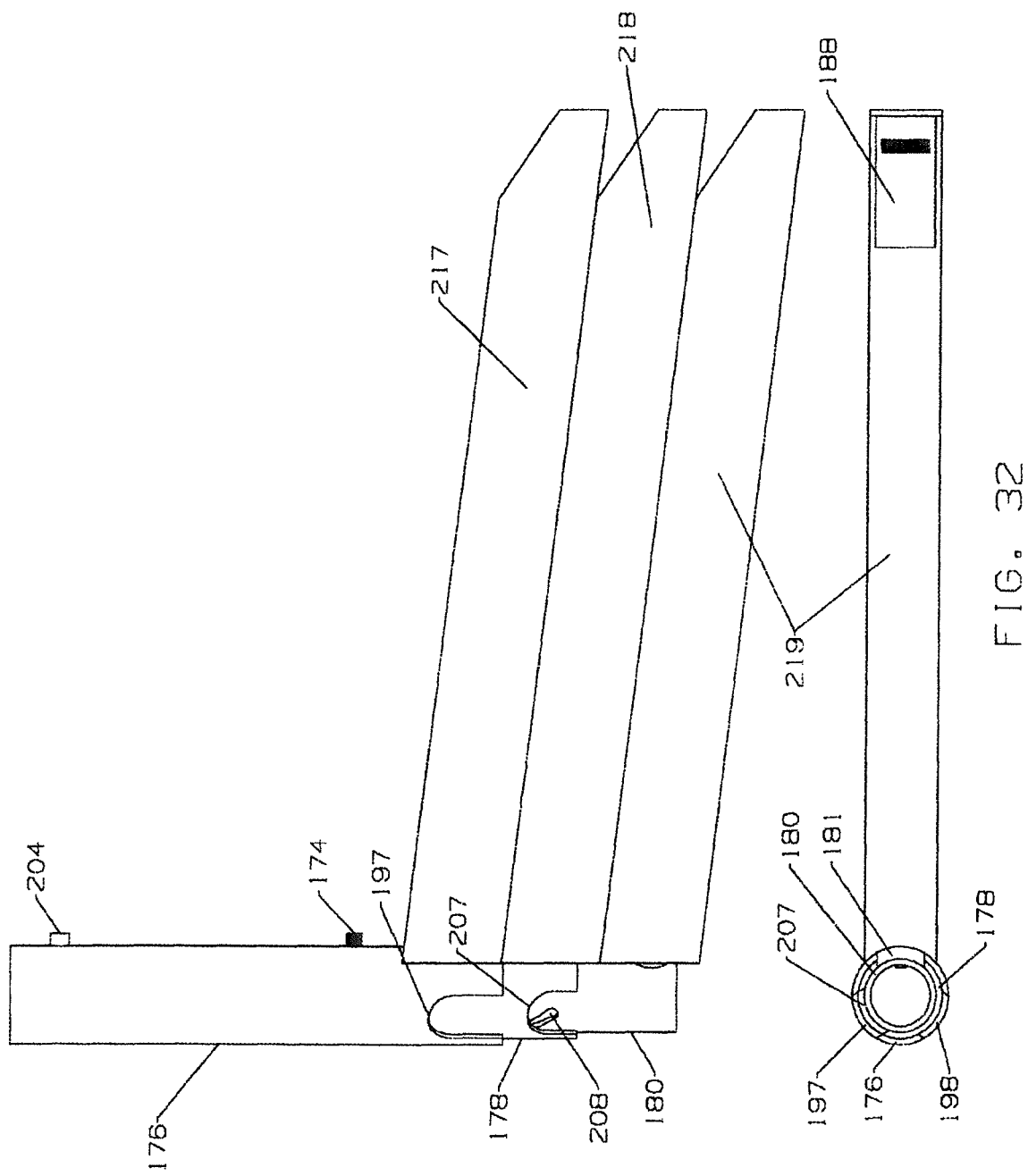
FIG. 32 shows a collapsed tripod of FIG. 30 according to the present invention.

In the deployed position, legs 171, 172 and 173 are circumferentially displaced 120 degrees from each other so that tripod 4 stably supports the combined weight of an electronic system or reading material, support unit 2 and telescopic rod 3. Each movable leg is locked in place by an appropriate locking mechanism (not shown) once it is positioned in the respective deployed or collapsed positions. Further, as shown in FIG. 27, caster wheel 185 provides mobility for workstation 1. Where the possibility of rolling must be avoided, and where it is desirable not to use caster wheel 185, each caster wheel 185 is easily and quickly retracted into wheel well 192 and caster wheel 185 remain clear of the ground or floor to permit the tripod legs to rest directly on the floor as shown in FIGS. 25 and 26. When retracted, each caster wheel 185 is housed in wheel well 192 located in each of leg element 183. For users who prefer more stability, telescoping leg assembly 177 may be extended as shown in FIGS. 25 and 27. FIGS. 30-32 show alternate embodiments tripod 4.

The invention as described is illustrative in manner and it should be understood that terminologies used are intended to be in the nature of words of description rather than of limitation. Obviously, it is apparent that many modifications and variations of the present invention are possible in light of the above descriptions and consequently, changes may be made to the details of the embodiments of the described invention above by those skilled in the art without departing from the broad inventive concept and the underlying principles thereof of the disclosure described herein. It is, therefore, to be understood that the description of this invention is not limited to the particular embodiments disclosed in any way but is intended to cover all modifications which are in the spirit and scope of the disclosed invention. It is also to be understood that the invention may be accomplished otherwise than as specifically described within the scope of the appended claim. The invention is defined by the claim.

The invention claimed is:

1. A modular workstation comprising:
    a first sub-assembly module comprising:
        an upper housing comprising an open interior cavity and a top surface;
        a lower housing; said lower housing comprising an open interior cavity and a bottom surface;
        a hinge mechanism interconnecting said upper housing and said lower housing, said hinge mechanism configured to allow said upper housing to be rotated relative to said lower housing;
        a self-locking tilt mechanism comprising a tilt mechanism and a self-locking mechanism, said self-locking tilt mechanism configured to angularly orient and lock said upper housing relative to said lower housing in a collapsed position and a plurality of angular positions;
        an anti-skid mechanism comprising a substantially planar retaining platform configured to inhibit an object resting on said upper housing from leaving said upper housing when said upper housing is in any of said plurality of additional angular positions;
        a cooling and ventilation system;
        a power management system; and
        a first module mating connector;
        wherein said upper housing and said lower housing together define an enclosed interior cavity when said support unit is in said collapsed position;
        wherein said top surface and said bottom surface are generally parallel when said support unit is in a collapsed position;
    a second sub-assembly module comprising a collapsible telescopic rod, said collapsible telescopic rod comprising;
        a base telescoping member;
        a top telescoping member configured to be slidably moveable relative to said base telescoping member, said base telescoping member;
        a load bearing positive locking mechanism assembly for locking and releasing said base telescoping member relative said top telescoping member; and
        a second module mating connector; and
    a third sub-assembly module comprising:
        a collapsible tripod including:
            a stationary leg assembly comprising: a tubular housing having top and bottom ends and a vertical axis; and a tubular telescopic leg assembly rigidly attached to said bottom end of said tubular housing;

a first moveable leg assembly comprising:
   a tubular barrel cam comprising: top and bottom ends and a vertical axis; and a cam track;
   a tubular connector; and
   a tubular telescopic leg assembly rigidly attached to said bottom end of said tubular barrel cam via said tubular connector;
a second moveable leg assembly comprising:
   a tubular barrel cam comprising: top and bottom ends and a vertical axis; and a cam track;
   a tubular connector; and
   a tubular telescopic leg assembly rigidly attached to said bottom end of said tubular barrel cam via said tubular connector; and
   a guide pin extending through a hole in said tubular housing of said stationary leg assembly and engaging said cam tracks of said first and second tubular barrel cams so that rotation of said tubular telescopic leg assemblies of said first and said second moveable leg about a common axis causes said tubular barrel cams of said first and second moveable leg to move vertically upward or downward; and
a third module mating connector;
wherein said first module mating connector, said second module mating connector, and said third module mating connector are configured to releasably interconnect said first sub-assembly, said second sub-assembly, and said third sub-assembly to form said modular workstation assembly.

2. The modular workstation of claim 1 wherein said first module mating connector, said second module mating connector, and said third module mating connector are also configured to releasably interconnect into sub-configurations comprising any two of said first sub-assembly, said second sub-assembly, and said third sub-assembly.

3. The modular workstation of claim 1 wherein said retaining platform spans an entire width of said upper housing.

4. The modular workstation of claim 1 wherein said anti-skid mechanism further comprises a front end for positioning adjacent to a user, a back end opposite said front end, top and bottom surfaces, and opposite side ends, said front end of said retaining platform comprising at least one hinge arm.

5. The modular workstation of claim 4 wherein said hinge arm comprises an outer ring connected by a plurality of radial spokes to an inner ring comprising a central aperture.

6. The modular workstation of claim 5 wherein said front end further comprises a hinge end.

7. The modular workstation of claim 1 wherein said anti-skid mechanism nests in a shallow recess on said top surface.

8. The modular workstation of claim 1 wherein said hinge mechanism is also configured to allow said anti-skid mechanism to be angularly oriented relative to at least one of said upper housing and said lower housing.

9. The modular workstation of claim 1 wherein said first sub-assembly further comprises a carrying handle.

10. The modular workstation of claim 1 wherein said first sub-assembly further comprises a retractable mouse pad.

11. The modular workstation of claim 1 wherein said power management system comprises a plurality of power sources, an active power status indicator, a battery level indicator, or combinations thereof.

12. The modular workstation of claim 1 wherein said load bearing positive locking mechanism is removably housed within a recess at a top end of said base telescoping member.

13. The modular workstation of claim 1 wherein said collapsible telescopic rod further comprises a spring configured to assist the extension of said telescopic rod.

14. The modular workstation of claim 1 wherein said third module mating connector comprises: a U-shaped race-like internal annular channel disposed coaxially inside and circumscribing an inner diameter of said tubular housing.

15. The modular workstation of claim 14 wherein said third module mating connector locks and coaxially couples said telescopic rod to said tripod such that said telescopic rod is in fluid communication with said tripod.

* * * * *